US012750329B2

(12) United States Patent
Pope et al.

(10) Patent No.: US 12,750,329 B2
(45) Date of Patent: Sep. 29, 2026

(54) NETWORK INTERFACE DEVICE

(71) Applicant: XILINX, INC., San Jose, CA (US)

(72) Inventors: Steven Leslie Pope, Cambridge (GB); Derek Edward Roberts, Cambridge (GB); Dmitri Kitariev, Newport Beach, CA (US); Neil Duncan Turton, Cambridge (GB); David James Riddoch, Cambridgeshire (GB); Ripduman Sohan, Washington, DC (US); Stephan Diestelhorst, Cambridge (GB)

(73) Assignee: XILINX, INC., San Jose, CA (US)

( * ) Notice: Subject to any disclaimer, the term of this patent is extended or adjusted under 35 U.S.C. 154(b) by 888 days.

(21) Appl. No.: 17/571,292

(22) Filed: Jan. 7, 2022

(65) Prior Publication Data

US 2023/0224261 A1 Jul. 13, 2023

(51) Int. Cl.

*H04L 49/20* (2022.01)
*G06F 13/28* (2006.01)
*G06F 13/40* (2006.01)
*H04L 49/00* (2022.01)
*H04L 49/25* (2022.01)
*H04L 49/90* (2022.01)

(52) U.S. Cl.

CPC .............. *H04L 49/30* (2013.01); *G06F 13/28* (2013.01); *G06F 13/4022* (2013.01); *H04L 49/20* (2013.01); *H04L 49/25* (2013.01); *H04L 49/90* (2013.01)

(58) Field of Classification Search

None
See application file for complete search history.

(56) References Cited

U.S. PATENT DOCUMENTS 5,754,436 A * 5/1998 Walsh ................. G06F 9/30083 700/286
7,133,940 B2 11/2006 Blightman et al.
7,861,026 B2 * 12/2010 Shen ....................... G06F 13/28 710/309
10,067,893 B2 * 9/2018 Egi ..................... G06F 13/4282
10,091,295 B1 * 10/2018 Savic ...................... G06F 16/25
10,241,947 B2 * 3/2019 Edirisooriya ......... G06F 13/102
10,474,599 B1 * 11/2019 Mohan ................ G06F 13/1673
10,754,808 B2 * 8/2020 Sethi ....................... G06F 13/42

(Continued)

OTHER PUBLICATIONS

Examination Repon from IN Application No. 202447058339 dated May 27, 2026.

(Continued)

*Primary Examiner* — Henry Tsai
*Assistant Examiner* — Christopher A Bartels
(74) *Attorney, Agent, or Firm* — Patterson + Sheridan, LLP

(57) ABSTRACT

A network interface device has data path circuitry configured to cause data to be moved into and/or out of the network interface device. The data path circuitry comprises: first circuitry for providing one or more data processing operations; and interface circuitry supporting channels. The channels comprises command channels receiving command information from a plurality of data path circuitry user instances, event channels providing respective command completion information to the plurality of data path user instances; and data channels providing the associated data.

20 Claims, 36 Drawing Sheets

(56) References Cited

U.S. PATENT DOCUMENTS

| | | | | |
|---|---|---|---|---|
| 11,159,408 | B2 * | 10/2021 | Svennebring | H04L 41/147 |
| 11,199,853 | B1 * | 12/2021 | Afrouzi | B25J 13/006 |
| 11,336,287 | B1 * | 5/2022 | Rodriguez | G06F 15/7867 |
| 11,409,685 | B1 * | 8/2022 | Kaplan | H04L 67/1095 |
| 11,726,936 | B2 * | 8/2023 | Thyamagondlu | G06F 13/24 710/22 |
| 11,831,550 | B2 * | 11/2023 | Chandra | H04L 49/9068 |
| 11,983,441 | B2 * | 5/2024 | Subramanian | G06F 3/067 |
| 11,994,751 | B1 * | 5/2024 | Wagner | G02C 5/146 |
| 2005/0177657 | A1 * | 8/2005 | Pope | G06F 13/385 710/36 |
| 2012/0124121 | A1 * | 5/2012 | Pope | H04L 69/162 709/201 |
| 2013/0198480 | A1 * | 8/2013 | Jones | G06F 12/023 711/170 |
| 2013/0318277 | A1 * | 11/2013 | Dalal | H04L 49/70 710/308 |
| 2014/0157397 | A1 * | 6/2014 | Dalal | G06F 13/1652 726/13 |
| 2014/0165196 | A1 * | 6/2014 | Dalal | G06F 13/404 726/23 |
| 2015/0324118 | A1 * | 11/2015 | Mccambridge | G06F 13/4282 710/5 |
| 2017/0187621 | A1 * | 6/2017 | Shalev | H04L 45/745 |
| 2018/0335971 | A1 * | 11/2018 | Borikar | G06F 13/24 |
| 2018/0337863 | A1 * | 11/2018 | Roberts | H04L 12/4633 |
| 2019/0042513 | A1 * | 2/2019 | Fleming, Jr. | G06F 9/30145 |
| 2019/0065417 | A1 * | 2/2019 | Yamashita | G06F 13/4022 |
| 2019/0229925 | A1 * | 7/2019 | Kounavis | G06F 11/2094 |
| 2019/0250850 | A1 * | 8/2019 | Benisty | G06F 3/0656 |
| 2019/0250853 | A1 * | 8/2019 | Arbel | G06F 13/4022 |
| 2019/0303323 | A1 * | 10/2019 | Swarbrick | G06F 1/06 |
| 2019/0303328 | A1 * | 10/2019 | Balski | G06F 15/7807 |
| 2019/0317802 | A1 | 10/2019 | Bachmutsky et al. | |
| 2020/0057681 | A1 * | 2/2020 | Mamaghani | G06F 11/3648 |
| 2020/0218684 | A1 * | 7/2020 | Sen | G06F 13/4027 |
| 2021/0117246 | A1 * | 4/2021 | Lal | G06T 1/20 |
| 2021/0117340 | A1 * | 4/2021 | Trikalinou | H04L 9/0637 |
| 2021/0117360 | A1 | 4/2021 | Kutch et al. | |
| 2022/0245072 | A1 * | 8/2022 | Roweth | G06F 13/1642 |
| 2023/0131698 | A1 * | 4/2023 | Noguera | G06F 3/0647 711/148 |
| 2023/0224261 | A1 * | 7/2023 | Pope | G06F 13/28 370/392 |
| 2023/0229497 | A1 * | 7/2023 | Santan | G06F 9/544 718/104 |
| 2023/0231811 | A1 * | 7/2023 | Dalal | G06F 13/1605 710/308 |
| 2024/0061792 | A1 * | 2/2024 | Confalonieri | G06F 12/1408 |
| 2024/0089239 | A1 * | 3/2024 | Kakaiya | H04L 9/0897 |
| 2025/0007689 | A1 * | 1/2025 | Ouziel | H04L 9/0618 |

OTHER PUBLICATIONS

Office Action from Japanese Patent Application No. 2024-540788, dated Jun. 30, 2026.

* cited by examiner cDM 824

NETWORK INTERFACE DEVICE

TECHNICAL FIELD

This application relates to a network interface device.

BACKGROUND

Network interface devices (e.g., a network interface card/controller (NIC) or SmartNIC) are known and are typically used to provide an interface between a computing device and a network. Some network interface devices can be configured to process data which is received from the network and/or process data which is to be put on the network.

For some network interface devices, there may be a drive to provide increased specializations of designs towards specific applications and/or the support of increasing data rates.

SUMMARY

According to one embodiment, there is provided a network interface device comprising: a network interface configured to interface with a network, the network interface configured to receive data from the network and put data onto the network; a host interface configured to interface with a host device, the host interface configured to receive data from the host device and provide data to the host device; and data path circuitry configured to cause data to be moved into and/or out of the network interface device, the data path circuitry comprising: first circuitry for providing one or more data processing operations; and interface circuitry supporting channels, the channels comprising: command channels receiving command information from a plurality of data path circuitry user instances, the command information indicating a path for associated data through the data path circuitry and one or more arguments for one or more data processing operations of the one or more data processing operations provided by the first circuitry; event channels providing respective command completion information to the plurality of data path user instances; and data channels providing the associated data.

The data channels may provide the associated data to and/or from the plurality of data path user instances.

The plurality of data path user instances may be provided by one or more of: a central processing unit on the network interface device; a central processing unit in the host device; and programmable logic circuitry of the network interface device.

The data path circuitry may comprise command scheduling circuitry, the command scheduling circuitry being configured to schedule commands for execution, the commands being associated with the command information, the command scheduling circuitry scheduling a command when at least a part of the associated data is available and a data destination is reserved.

The command scheduling circuitry may be configured to schedule a command when buffer resources of the network interface device required for that command have been reserved as the data destination.

The command information may comprise: one or more commands; a program which when run causes one or more commands to be executed; and a reference to a program which when run causes one or more commands to be executed.

When a command has been completed, the command scheduling circuitry may be configured to cause a command completion event to be provided to one of the event channels.

The program may be configured, when run, to cause two or more commands to be executed, each of the commands being associated with a respective command completion event.

The program may be configured, when run, to cause two or more commands to be executed, the executing of one of the commands being dependent on an outcome of the executing of another of the commands.

The program may be configured, when run, to support a loop, where the loop is repeated until one or more conditions is satisfied.

The program may be configured, when run, to call a function to cause one or more actions associated with that function to be executed.

A barrier command may be provided between a first command and a second command to cause the first command to be executed before the second command.

The network interface device may comprise a memory configured to store the program which when run causes one or more commands to be executed, the command channel being configured to receive the reference to the program to cause the program to be run.

The data path circuitry may comprise a data classifier configured to classify data received by the network interface and to provide, in dependence on classifying of the data, a reference to a program which when run causes one or more commands to be performed, the reference to the program being command information for the data received by the network interface.

The circuitry for providing one or more data processing operations may comprise one or more data processing offload pipelines, the data processing pipelines comprises a sequence of one or more offload engines, each offload engine configured to perform a function with respect to data as it passes through the offload pipeline.

The network interface device may comprise one or more direct memory access adaptors providing an input/output subsystem for the data path circuitry, the one or more direct memory access adaptors interfacing with one or more of the data processing pipelines to receive data from one or more data processing offload pipelines and/or deliver data to one or more of the data processing offload pipelines.

One or more of the data processing offload pipelines may comprise a plurality of offload engines and a packet bus connects the offload engines of the data processing pipeline, the packet bus being configured to carry data into and out of the offload engines.

An argument bus may be provided, the argument bus configured to provide respective arguments from a command associated with the data to be processed by the data processing pipeline to the offload engines of the data processing pipeline.

An offload pipe register bus may be configured to provide metadata from one offload engine of the data processing pipeline to another offload engine of the data processing pipeline.

One or more of the offload engines of the data processing pipeline may be configured to receive data, process that data and overwrite the received data on the packet bus.

One or more of the offload engines may be configured to receive data, process that data and write the processed data at a different offset as compared to the received data, on the packet bus.

One or more offload engines may be configured to provide incremental processing in which received data is processed, data associated with processed received data is stored in a context store and used when processing subsequent received data.

The data path circuitry may have a first communications path with the programmable logic circuitry and a second communications path with the central processing unit in the host device, said second communications path bypassing the programmable logic circuitry.

Different data path user instances may be configured, in use, to issue commands to a same command channel of the command channels.

One of the data path instances may be configured to take over providing a plurality of commands via a same command channel from another of the data path instances.

The first circuitry may comprise: a first host data processing part; and a second network data processing part.

The network interface device may comprise a data path between the first host data processing part and the second network data processing part, the data path being configured to transfer data from one of the first host data processing part and the second network data processing part to the other of the first host data processing part and the second network data processing part.

The first host data processing part may comprise a first set of buffers and the second network data processing part may comprise a second set of buffers, the data path being provided between the first set of buffers and the second set of buffers.

The network interface device may comprise a network on chip, the data path being provided by the network on chip.

According to another aspect, there is provided a method provided in a network interface device comprising: receiving command information at interface circuitry of data path circuitry, the command information being received via command channels supported by the interface, the command information being received from a plurality of data path circuitry user instances, the command information indicating a path for associated data through data path circuitry and one or more parameters for one or more data processing operations provided by first circuitry of the data path circuitry, the data path circuitry being configured to cause data to be moved into and/or out of the network interface device; providing the associated data via data channels supported by the interface circuitry; and providing respective command completion information via one or more event channels to the plurality of data path user instances, the one or more event channels being supported by the interface circuitry.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF DRAWINGS

Some embodiments are illustrated by way of example only in the accompanying drawings. The drawings, however, should not be construed to be limiting of the arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

When data is to be transferred between two data processing systems over a data channel, each of the data processing systems has a suitable network interface to allow it to communicate across the channel. The data channel may be provided by a network. For example, the network may be based on Ethernet technology or any other suitable technology. The data processing systems may be provided with network interfaces that are capable of supporting the physical and logical requirements of the network protocol. The physical hardware component of network interfaces are referred to as network interface devices or network interface cards/controllers (NICs). In this document, the network interface device is referred to a NIC. It should be appreciated that the NIC may be provided in any suitable hardware form such as integrated circuit or hardware module. A NIC is not necessarily implemented in card form.

Computer systems may have an operating system (OS) through which user level applications communicate with the network. A portion of the operating system, known as the kernel, may include protocol stacks for translating commands and data between the applications and a device driver specific to the network interface device, and the device drivers for directly controlling the network interface device. By providing these functions in the operating system kernel, the complexities of and differences among network interface devices can be hidden from the user level applications. In addition, the network hardware and other system resources (such as memory) can be safely shared by many applications and the system can be secured against faulty or malicious applications.

Figure 1:
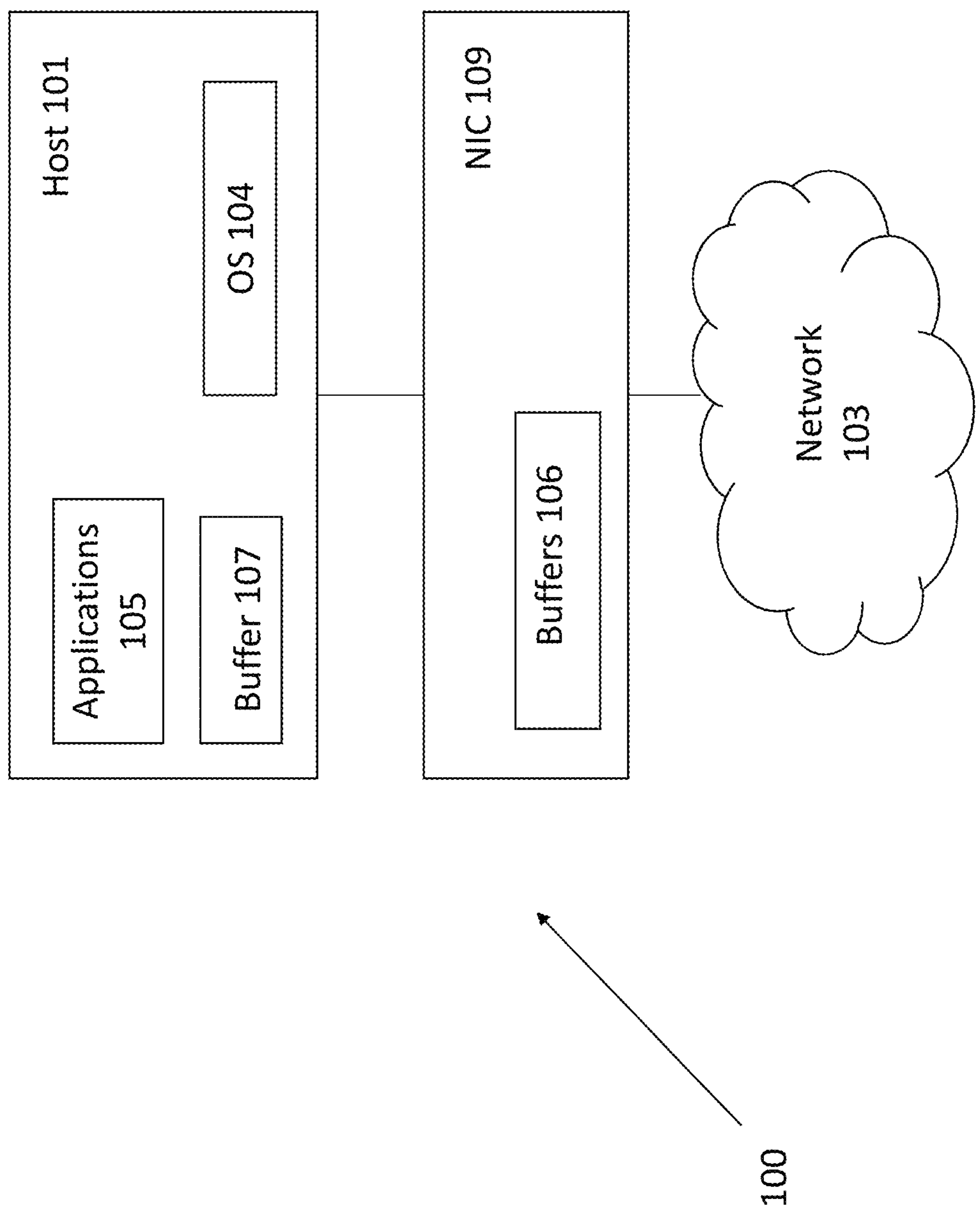
FIG. 1 shows a schematic view of a data processing system where a host computing device is coupled to a network via a network interface device.

An example data processing system 100 for carrying out transmission across a network is shown in FIG. 1. The data processing system 100 comprises a host computing device 101 coupled to a NIC 109 (which is one example of a network interface device) that is arranged to interface the host computing device 101 to network 103. The host computing device 101 includes an operating system 104 supporting one or more user level applications 105. The host computing device 101 may also include a network protocol stack (not shown). The network protocol stack may be a Transmission Control Protocol (TCP) stack or any other suitable protocol stack. The protocol stack may be a transport protocol stack.

The application 105 may send and receive TCP/IP (Internet Protocol) messages by opening a socket and reading and writing data to and from the socket, and the operating system 104 causes the messages to be transported across the network.

Some systems may offload at least partially the protocol stack to the NIC 109. For example, in the case that the stack is a TCP stack, the NIC 109 may comprise a TCP Offload Engine (TOE) for performing the TCP protocol processing. By performing the protocol processing at least partially in the NIC 109 instead of in the host computing device 101, the demand on the processor/s of the host computing device 101 may be reduced. Data to be transmitted over the network, may be sent by an application 105 via a TOE-enabled virtual interface driver, bypassing the kernel TCP/IP stack entirely. Data sent along this fast path therefore need only be formatted to meet the requirements of the TOE driver.

The host computing device 101 may comprise one or more processors and one or more memories. In some embodiments, the host computing device 101 and the NIC 109 may communicate via a bus, for example a peripheral component interconnect express (PCIe bus) or any other suitable bus.

During operation of the data processing system, data to be transmitted onto the network may be transferred from the host computing device 101 to the NIC 109 for transmission. In one example, data packets may be transferred from the host to the network interface device directly by a host processor. The host computing device may provide data to one or more buffers 106 located on the NIC 109. The NIC 109 may then prepare the data packets and transmit them over the network 103.

Alternatively, the data may be written to a buffer 107 in the host computing device 101. The data may then be retrieved from the buffer 107 by the network interface device and transmitted over the network 103. Some systems may support both of these data transfer mechanisms.

In both of these cases, data may be temporarily stored in one or more buffers prior to transmission over the network.

The data processing system may also receive data from the network via the NIC 109.

The data processing system may be any kind of computing device, such as a server, personal computer, or handheld device. Some embodiments may be suitable for use in networks that operate TCP/IP over Ethernet. In other embodiments one or more different protocols may be used. Embodiments may be used with any suitable networks, wired or wireless.

Figure 2:
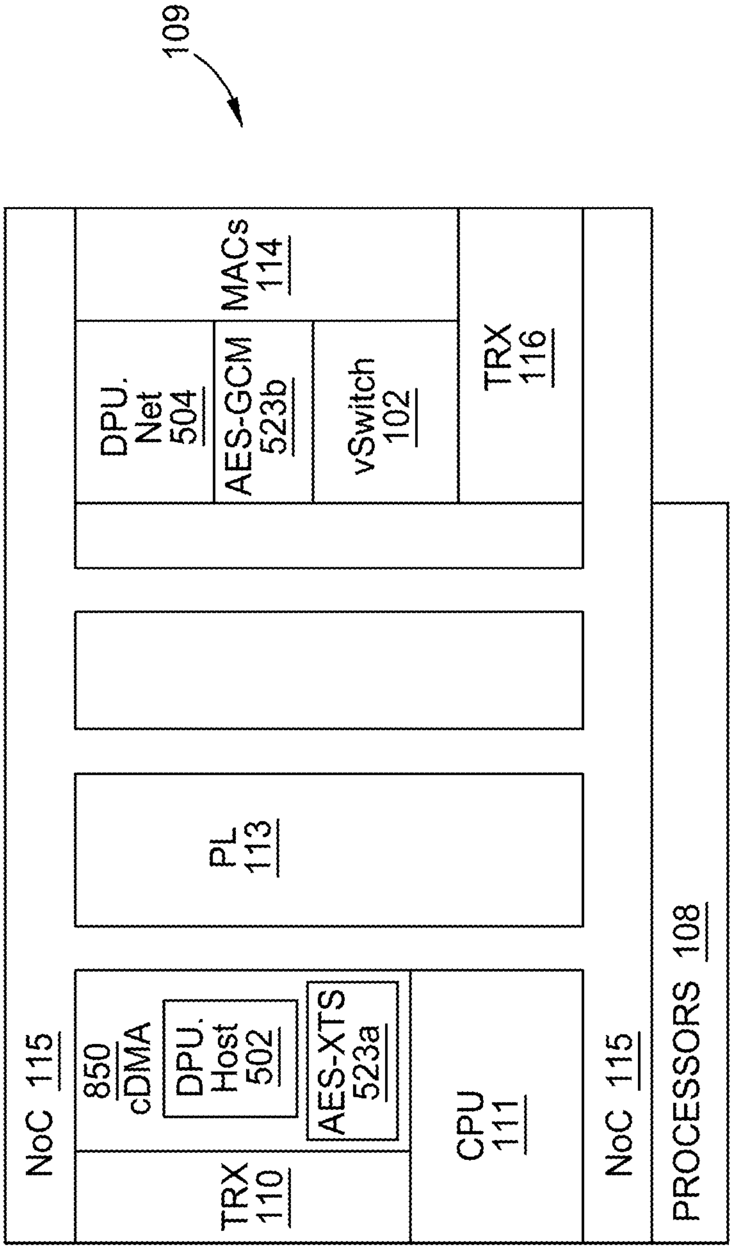
FIG. 2 shows a network interface device of some embodiments.

Reference is made to FIG. 2 which shows a NIC 109 of some embodiments. The network interface device may be at least partially provided by one or more integrated circuits. Alternatively, the network interface device may be part of a larger integrated circuit. The NIC 109 may be provided by a single hardware module or by two or more hardware modules. The network interface device may provide a network attached CPU (central processing unit) in front of the main CPU. The network interface device will be located on a data path between the host CPU (on the host computing device) and the network.

The NIC may be configurable to provide application specific pipelines to optimise data movement and processing. The NIC may integrate high-level programming abstractions for network and compute acceleration.

The NIC of some embodiments support terabit class endpoint devices. Some embodiments may be able to support terabit data rate processing. For example the NIC may receive data from the network at a terabit data rate and/or put data onto the network at a terabit data rate. However, it should be appreciated that other embodiments, may operate at and/or support higher or lower data rates.

The arrangement of FIG. 2 may be regarded as providing a System-on-Chip (SoC). The SoC shown in FIG. 2 is an example of a programmable integrated circuit IC and an integrated programmable device platform. In the example of FIG. 2, the various, different subsystems or regions of the NIC 109 may be implemented on a single die provided within a single integrated package. In other examples, the different subsystems may be implemented on a plurality of interconnected dies provided as a single, integrated package. In some embodiments, the NIC 109 of FIG. 2 may be provided by two or more packages, one or more integrated circuits or one or more chiplets.

In the example of FIG. 2, the NIC 109 includes a plurality of regions having circuitry with different functionalities. In the example of FIG. 2, the NIC 109 has a processing system provided by one or more application processors 111 (e.g., CPUs). The NIC 109 has one or more first transceivers 116 for receiving data from a network and/or for putting data onto a network. The NIC 109 has one or more virtual switches (vSwitch) 102 or protocol engines. The protocol engine may be a transport protocol engine. This function is referred to a virtual switch function in the following. The NIC 109 has one or more MAC (medium access control) layer functions 114. The NIC 109 has one or more second transceivers 110 for receiving data from a host and/or for providing data to a host.

The NIC 109 has a cDMA (composable direct memory access architecture) 850. In one embodiment, the various elements in the cDMA 850 in are formed from hardware in the NIC 109, and thus are circuitry. This cDMA 850 is described in more detail later and may comprise a PCIe (peripheral component interconnect express) interface and one or more DMA (direct memory access) adaptors. The one or more DMA adaptors provide a bridge between the memory domain and packet streaming domain. This may support memory-to-memory transfers. The cDMA 850 has a host data path unit DPU.Host 502 which is described in more detail later. The NIC also comprises a network DPU, DPU.Net 504 which will be described in more detail later. The DPU.Net 504 may be provided on the network side of the NIC, in some embodiments. The DPU.Host and DPU-.Net may provide data path circuitry. The DPU.Host and DPU.Net may cause data to be moved into and/or out of the NIC.

An AES-XTS (advanced encryption standard-XEX (Xor-encrypt-xor)-based tweaked-codebook mode with ciphertext stealing) crypto function 523*a* may be provided on the host side of the NIC and an AES-GCM (AES-Galois/Counter mode) crypto function 523*b* may be provided on the network side of the NIC. The crypto functions are by way of example and different embodiments may use one or more different crypto functions.

The NIC 109 may comprise or have access to one or more processors 108 (or processing cores). By way of example only the cores may be ARM processing cores and/or any other suitable processing core. The application processors 111 and the one or more processors 108 may be provided by a common processor or by different processors.

The NIC 109 has a network on chip (NoC) 115 which is shaded in FIG. 2. This may provide communications paths between different parts of the NIC 109. It should be appreciated that two or more of the components on the NIC 109 may alternatively or additionally communicate via direct connection paths and/or dedicated hardened bus interfaces.

The area between the NoC may include one or more components. For example, the area may accommodate one or more programmable logic blocks 113 or programmable circuitry. This area is sometimes referred to as the fabric. By way of example only, the programmable logic blocks may at least partially be provided by one or more FPGAs (field programmable gate array). The area may accommodate one or more look up tables LUTs. One or more functions may be provided by the programmable logic blocks. The ability to accommodate different functions in this area may allow the same NIC to be used to satisfy a variety of different end user requirements.

It should be appreciated that in other embodiments, any other suitable communication arrangement may be used on the NIC instead of or in addition to the NoC. For example, some communications may at least in part be via the fabric.

The NIC provides an interface between a host computing device and a network. The NIC allows data to be received from the network. That data may be provided to the host computing device. In some embodiments, the NIC may process the data before the data is provided to the host computing device. In some embodiments, the NIC allows data to be transmitted by the network. That data may be provided from the host computing device and/or from the NIC. In some embodiments, the NIC may process the data before the data is transmitted by the network.

The virtual switch 102 may be an at least partially hardened device or part of the NIC. There may be a single virtual switch or two or more separate virtual switches provided. The virtual switch 102 is able to communicate with other blocks on the chip using the NoC and/or via direct connection paths and/or dedicated hardened bus interfaces. In some embodiments, this may be dependent on the capacity of the NoC versus the quantity of data to be transported. The NoC may for example be used for memory access by the NIC 109. The NoC 115 may be used for delivering data to the application processors 111, the processors 108, the DMA adaptors and/or the PCIe blocks.

In some embodiments, the NoC and/or direct connection paths and/or dedicated hardened bus interfaces may be used to deliver data to one or more accelerator kernels and/or other plugins. In some embodiments, routing may be via the programmable logic. These kernels and/or plugins may in some embodiments be provided by the programmable logic blocks 113 and/or any suitable programmable circuitry.

The virtual switch 102 may be physically located on the edge region of the NIC 109 and communicate with various other components of the NIC 109. In some embodiments, the virtual switch 102 may be arranged in physical proximity to the MAC layer functions 114 and the one or more first transceivers 116. These components may be arranged in physical proximity to the edge region of the NIC 109. The data from the network is received by the one or more first transceivers 116.

In other embodiments, the virtual switch 102, the MAC layer functions 114 and the one or more first transceivers 116 may be physically arranged away from the edge region of the NIC.

Some embodiments may allow a customized or programmable NIC function to be provided. This may be useful where a specific NIC function is required. This may be for a particular application or applications or a for a particular use of the NIC. This may be useful where there may be a relatively low volume of devices which are required to support that NIC function. Alternatively or additionally this may be useful where customization of a NIC is desired. Some embodiments, may provide a flexible NIC.

The customization may be supported by providing one or more functions using the PL 113 or programmable circuitry.

Some embodiments may be used to support a relatively high date rate.

Figure 3:
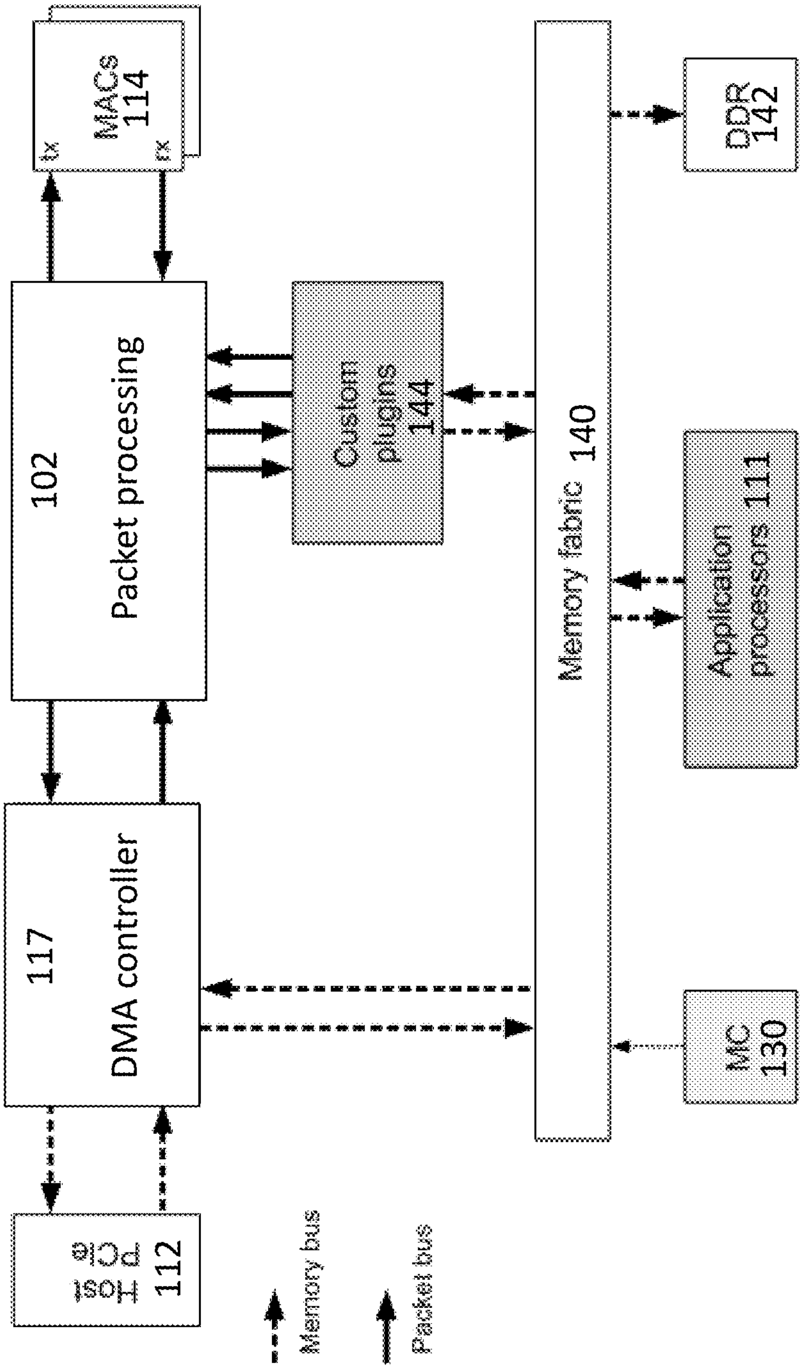
FIG. 3 schematically shows subsystems of the network interface device of some embodiments.

Reference is made to FIG. 3 which schematically shows the communication paths between the subsystems of the NIC of FIG. 2. A host PCIe interface 112 of the cDMA block and a DMA controller 117 also of the cDMA block communicate via a memory bus. The DMA controller 117 communicates via the memory fabric 140 using a memory bus. A management controller MC 130 provides control plane messages via the memory fabric 140 using a control bus. Application processors 111 communicate via the memory fabric 140 using a memory bus. Data is received at a DDR (double data rate memory) 142 via the memory fabric 140 using a memory bus.

The DMA controller 117 communicates with the one or more virtual switches 102 via a packet bus. The one or more virtual switches may provide packet processing. The one or more virtual switches may perform offload processing and virtual switching. The processing provided by the one or more virtual switches may be modified using one or more plugins 144 or kernels. The plugins or kernels may communicate with the memory fabric via a memory bus and with the one or more virtual switches via a packet bus. The one or more virtual switches may communicate with the MACs 114 via a packet bus.

In some embodiments capsules of data may be used to transport data in the NIC. This will be described in more detail later.

Figure 4:
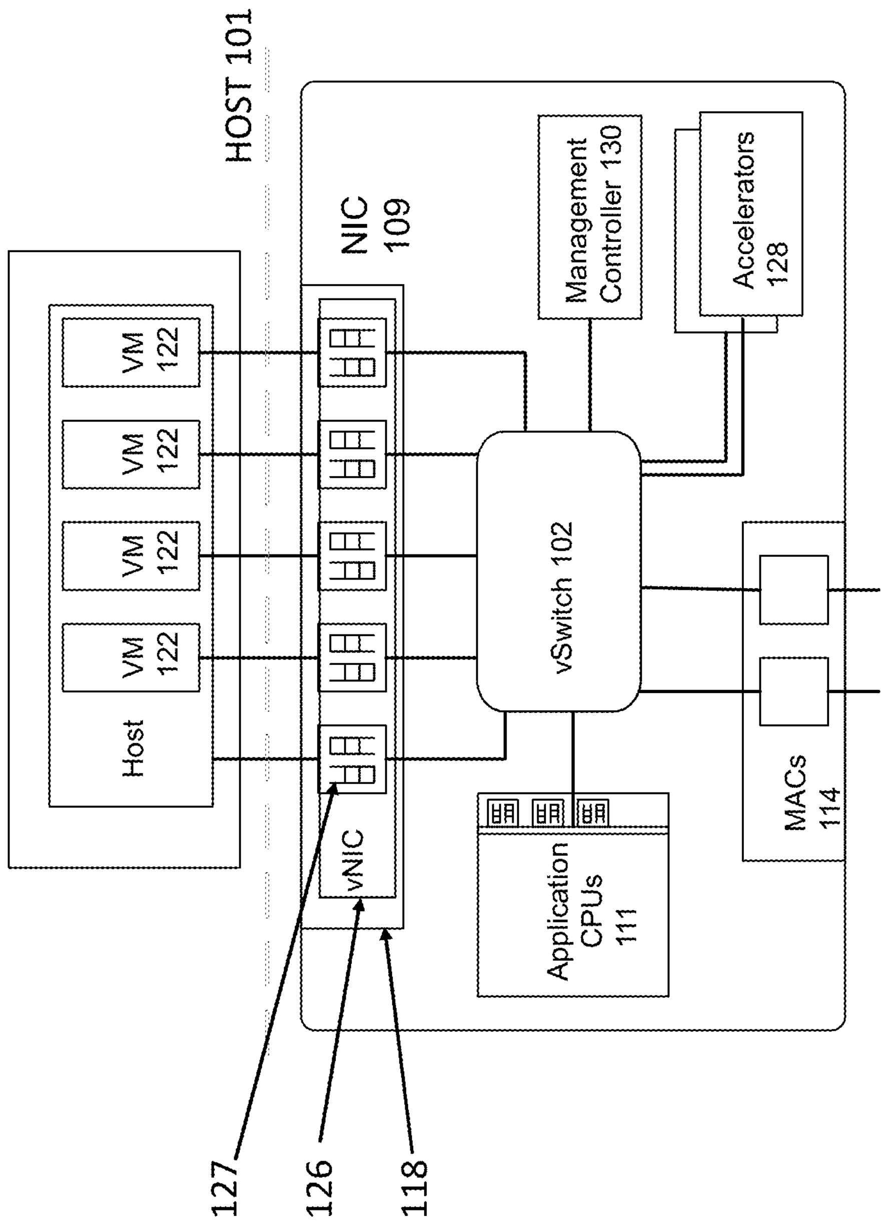
FIG. 4 shows a schematic view of a host computing device and the network interface device of some embodiments.

Reference is made to FIG. 4 which shows a schematic view of the host computing device 101 and functional blocks supported by the NIC 109. The NIC 109 comprises the virtual switch 102. This virtual switch 102 may be extendible by one or more plugins or kernels. The virtual switch 102 with the plugins or kernels is able to support custom protocols and switch actions.

The host computing device 101 comprises a number of virtual machines VM 122.

A number of PCIe PFs (physical function) and/or VFs (virtual function) may be supported. A PCIe function 118 may have multiple virtual NICs (vNICs). Each vNIC 126 may connect to a separate port on the virtual switch 102. In FIG. 4 one PCIe function and one vNIC of the PCIe function 118 is shown for clarity.

Each vNIC 126 may have one or more VIs (virtual interfaces) 127. Each VI may provide a channel for sending and receiving packets. Each VI may have a transmit queue TxQ, a receive queue RxQ and an event queue EvQ. There may be a one to one relationship between a virtual machine and a virtual function. In some embodiments, there may be a plurality of VIs mapped into a VF (or PF).

In some embodiments, one of the VIs in a given PF or VF may support a function management interface.

The virtual switch 102 comprises a plurality of virtual ports. The ports may be configured to receive data from the TxQ of a vNIC and to transmit data to the RxQ of a vNIC.

The virtual switch 102 is configured to interface with one or more application CPUs provided for example by the application processors 111, the management controller 130 which is configured to control the virtual switch, and one or more MAC layer functions 114. In some embodiments, the virtual switch is extendible by plugins or kernels such as previously discussed. One example of a plugin or kernel comprises a hardware accelerator 128.

Figure 5:
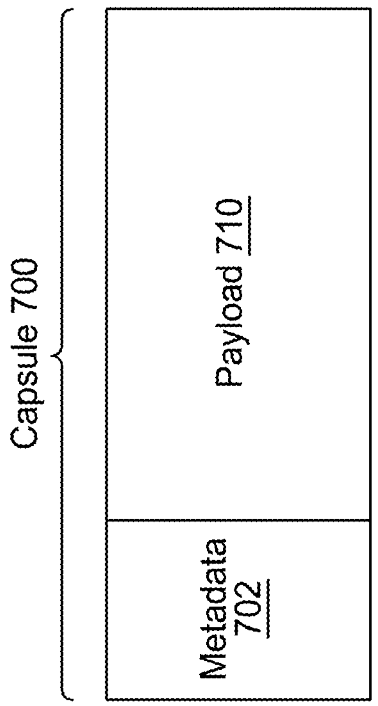
FIG. 5 schematically shows a capsule used in some embodiments.

In some embodiments capsules of data may be used to transport data in the NIC. Reference is made to FIG. 5 which shows a capsule used in some embodiments. In some embodiments, streaming subsystem of the NIC may carry capsules. As will be discussed later, the capsules may alternatively or additionally be used in other parts of the NIC. The capsules may be control capsules or network packet capsules. The payload may be provided by a pointer to a payload. Alternatively the payload may be provided in the capsule.

As schematically shown in FIG. 5, the capsule comprises metadata 702. This may be provided at the beginning of the capsule. This may be followed by the capsule payload 710. Capsules may contain data integrity checks such as ECC (error correcting code), CRC (cyclic redundancy check) and/or any other integrity check to protect the metadata/header and/or payload.

The metadata may depend on whether the capsule is a control capsule or a network capsule.

A network packet capsule has capsule metadata followed by for example an Ethernet frame in the payload.

The metadata may comprise a capsule header which may be common to the control capsule and the network capsule. The capsule header may comprise information indicating if the capsule is a control capsule or a network packet capsule. The capsule header may comprise route information which controls the routing of the packet. The route information may be source based routing which expresses the path that a capsule will take, or may be an indirection to a route table or to a program state (processor) which is controlling the flow of capsules. The capsule header may comprise virtual channel information indicating the virtual channel to be used by the capsule. The capsule header may comprise length information indicating the length of a capsule.

As will be described in more detail, the capsule header may contain a reference to a program and context which will be used to control the processing of the capsule.

The network packet capsule may have a network capsule header following the capsule header as part of the metadata 702. This may indicate the layout of the capsule metadata and if the capsule payload includes or not an Ethernet FCS (frame check sequence).

The metadata for the control capsule may indicate the type of control capsule. The capsules may have meta data to indicate offsets. This may indicate the beginning of the data to process.

Some embodiments may use a segmented bus. A segmented bus is a streaming bus where the overall data path width is split into physically distinct pieces. Each segment has its own principal control signals (for example SOP (start of packet) and EOP (end of packet)). A segmented bus may be used to overcome potential inefficiency of any bus of fixed width carrying capsules of arbitrary size. Without segmentation, if a capsule is (say) one byte longer than the bus width, 2 bus beats (clock cycles) will be required to carry the capsule; the entire bus save for one byte carries nothing on the second beat. A segmented bus allows the next capsule to begin transmission in the second bus beat in the example above, recovering much of the wasted bandwidth. As the number of segments increases, the bus bandwidth for an arbitrary capsule size trends towards 100% of its theoretical maximum. However this needs to be balanced against the complexity and resources of the multiplex and demultiplex operations required with increased segmentation. The number of segments and segment widths can vary with the constraints.

In some embodiments the bus may be divided into 4 segments, but this can vary depending on how strong the constraints are.

The frame size may be modified and/or the number of segments which are supported by the bus width may be modified.

Some embodiments may be arranged to allow data to be passed across the NIC at relatively high rates between a plurality of different data sources and sinks. This may be using the network-on-chip NoC architecture discussed previously.

Some embodiments may provide a composable DMA (cDMA) architecture to facilitate the passing of the data. The composability may allow different elements of a DMA system to be added, and/or the capabilities of endpoints altered without having to re-design the system. In other words, different DMA schemes with different requirements can be accommodated by the same composable DMA architecture.

The architecture is scalable and/or adaptable to different requirements. The architecture is configured to support the movement of data between the host and other parts of the NIC. In some embodiments, the architecture can support relatively high data rates.

Figure 6:
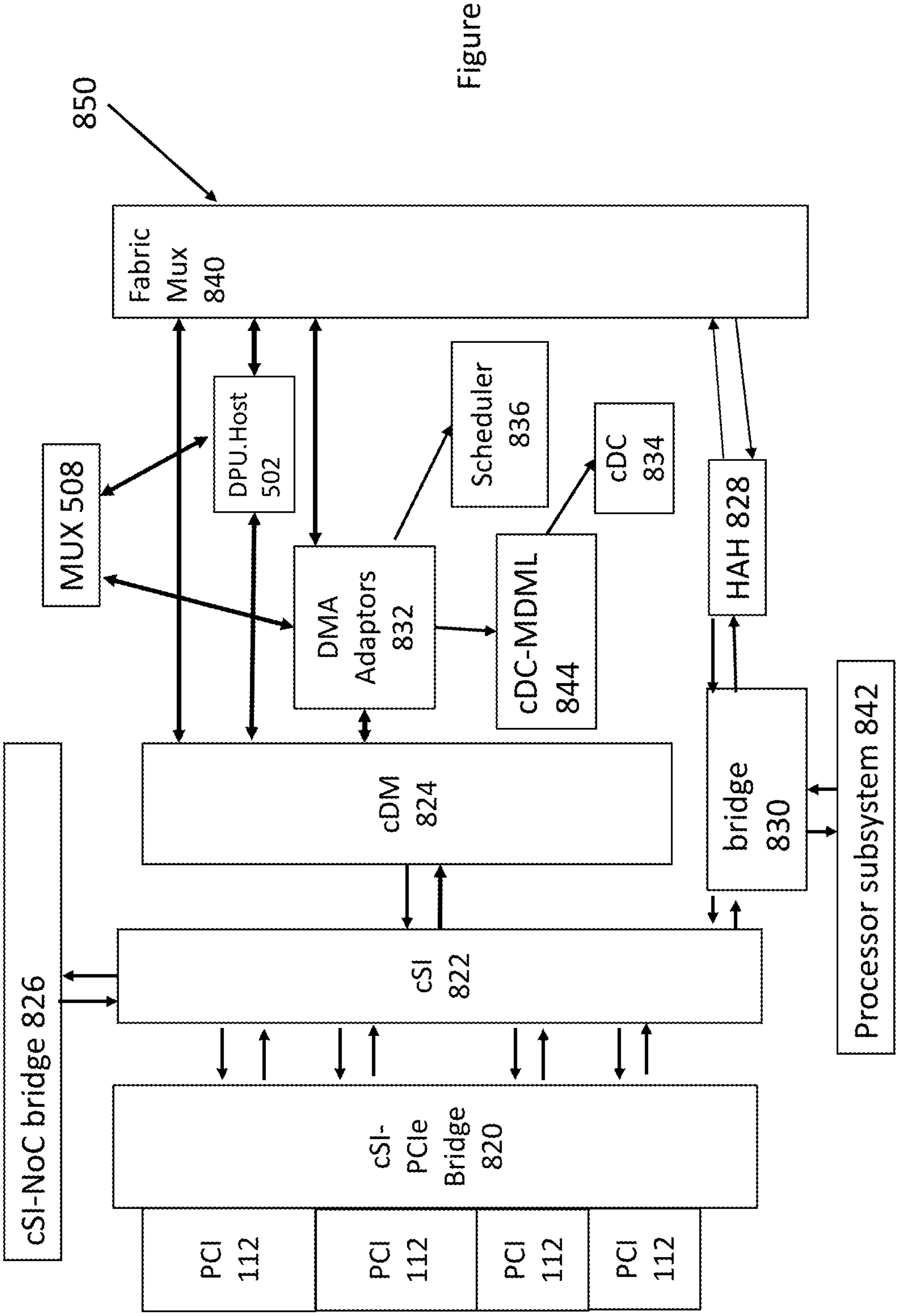
FIG. 6 schematically shows the composable direct memory access architecture of some embodiments.

Reference is made to FIG. 6 which schematically shows an example of a cDMA architecture of some embodiments.

The arrangement schematically shown in FIG. 6 allows data to be passed between different sinks (destinations) and data sources. By way of example only, the sinks and data sources may comprise one or more of the following:

One or more PCI connected hosts. These would be connected via the host PCIe interface 112;

One or more processor subsystems 842. This may be the application processors 111 and/or the processors 108 shown in FIG. 2 or and/or one or more different processors;

The vSwitch 102 shown in FIG. 2;

DDR memory 142 (shown in FIG. 3);

A data movement engine provided by the NIC. This may be provided by one or more accelerators 128 (shown in FIG. 4) or custom plugins 144 (shown in FIG. 3) such as previously discussed;

One or more fabric client(s);

Memory; and

Any other suitable sink or data source.

The sinks and/or data sources may be dependent on the system in which the NIC 109 is provided and/or the function which needs to be provided by the NIC 109.

The cDMA 850 may be regarded as a layered architecture. A base layer may connect different devices, bus widths and protocols to the cDMA system. A composable scalable interconnect (cSI) 822 may allow data to be moved between the interfaces. A composable data mover (cDM) 824 may perform bulk data movement between the interfaces under the direction of one or more schedulers 836. As well as bulk-data, the cDM 824 may provide a message load/store interface which allows small messages to be transferred e.g. for interrupts or descriptor management.

DMA adaptors 832 may provide the API (application programming interface) for the required types of DMA (interpreting descriptors and managing the state of rings etc.), using the data mover cDM 824 to fetch descriptors and move data around. A shared descriptor cache system cDC 834 may allow adaptors to share temporary storage for descriptors in flight. A host access handler HAH 828 may manage PCIe target transactions, bar/device/function mappings and doorbell management. For example the HAH may manage doorbell coalescing, sampling, and forwarding.

One or more relatively high bandwidth memory interfaces may be supported. The one or more memory interfaces may provide an interface to one or more DDRs.

One or more of accelerators may want to access the host and/or the high bandwidth memories.

The host may want to access the high bandwidth memories.

Bridges may be used to interconnect the cDMA architecture to other parts of the NIC. In general bridges act as protocol translators, and generally do not initiate or terminate traffic. The bridges may provide protocol translation to other bus types. For example, the NoC may have a proprietary master/slave interface, or the processor subsystem may support an internal AXI interconnect A bridge may also act as bus width translators. Examples of bridges are a cSI-NoC bridge 826, a processor bridge 830, and a cSI-PCIe bridge 820, and cSI-AXI bridge (discussed later).

The cSI-NoC bridge 826 may be provided to extend the cSI 822 over the NoC in a streaming mode.

In some embodiments a bridge to a bus may be provided. In some embodiments an AXI bus (or other suitable bus) may be used and a cSI-AXI bridge (discussed later) may be provided.

The processor bridge 830 may provide an interconnection to the one or more CPUs of the NIC, for example a processing subsystem 843. The processor bridge may contain the cSI-AXI bridge and/or other bus bridge and/or other components. This processor bridge may be provided between the HAH 828 and the cSI 822.

The cSI-PCIe bridge 820 connects a host PCIe interface 112 and the cSI 822. A cSI-PCIe bridge acts as a cSI target (that is a target of the cSI), forwarding requests from cSI initiators (that is an initiator of a request to the cSI) to a PCIe controller requester interface. This bridge also acts as a cSI initiator, forwarding requests from a PCIe controller completer interface to cSI targets (that is a target of the cSI).

In the example, shown in FIG. 6, there are four PCIe controllers. This is by way of example only and different numbers of PCIe controllers may be provided. A cSI-PCIe bridge instance may be associated with each one of the four PCIe controllers. More or less than four PCIe controllers may be provided in other embodiments A fabric multiplexer 840 brings together the components of cDMA with the components that require fabric and NoC access to be shared. The DMA adaptors 832, cDM 824, HAH 828 and/or any other suitable component may be provided with a path to/from the fabric. The fabric multiplexer 840 may be configured to have more than one path active at the same time. This may be dependent on the number of input/output pins of the fabric.

The host data path unit (DPU.Host) 502 is provided as part of the cDMA. This is described in more detail later. A multiplexer 508 multiplexes between on the, one hand the NoC and on the other hand the DPU.Host 502 and one or more DMA adaptors 832.

In alternative embodiments, the processor subsystem may be memory mapped onto a DMA adaptor via the cSI, without using a multiplexer 508. For example, in this alternative embodiment, there may be no cSI-NoC bridge (the bridge referenced 826 may be omitted in this case). In this example the DMA adaptors may issue cSI transactions to the processor subsystem by memory mapping.

The interface to the cDC may be multiplexed to two or more DMA adaptors and the PL via the cDC-MDML (multiplexer/demultiplexer logic) 844. A scheduler 836 is provided. This is described in more detail later.

The cDMA makes use of capsules such as previously described. The capsules are data entities which flow through the streaming fabric. The capsules contain metadata and data. The data portion may be PCIe TLP (transport layer protocol). The metadata contains supplementary routing information (for example derived from the TLP itself and/or other context) and/or other fields used to control the flow of capsules in the cSI system. Capsule headers may include PCIe TLP header data and/or may comprise one or more of additional routing and flag information.

Figure 7A:
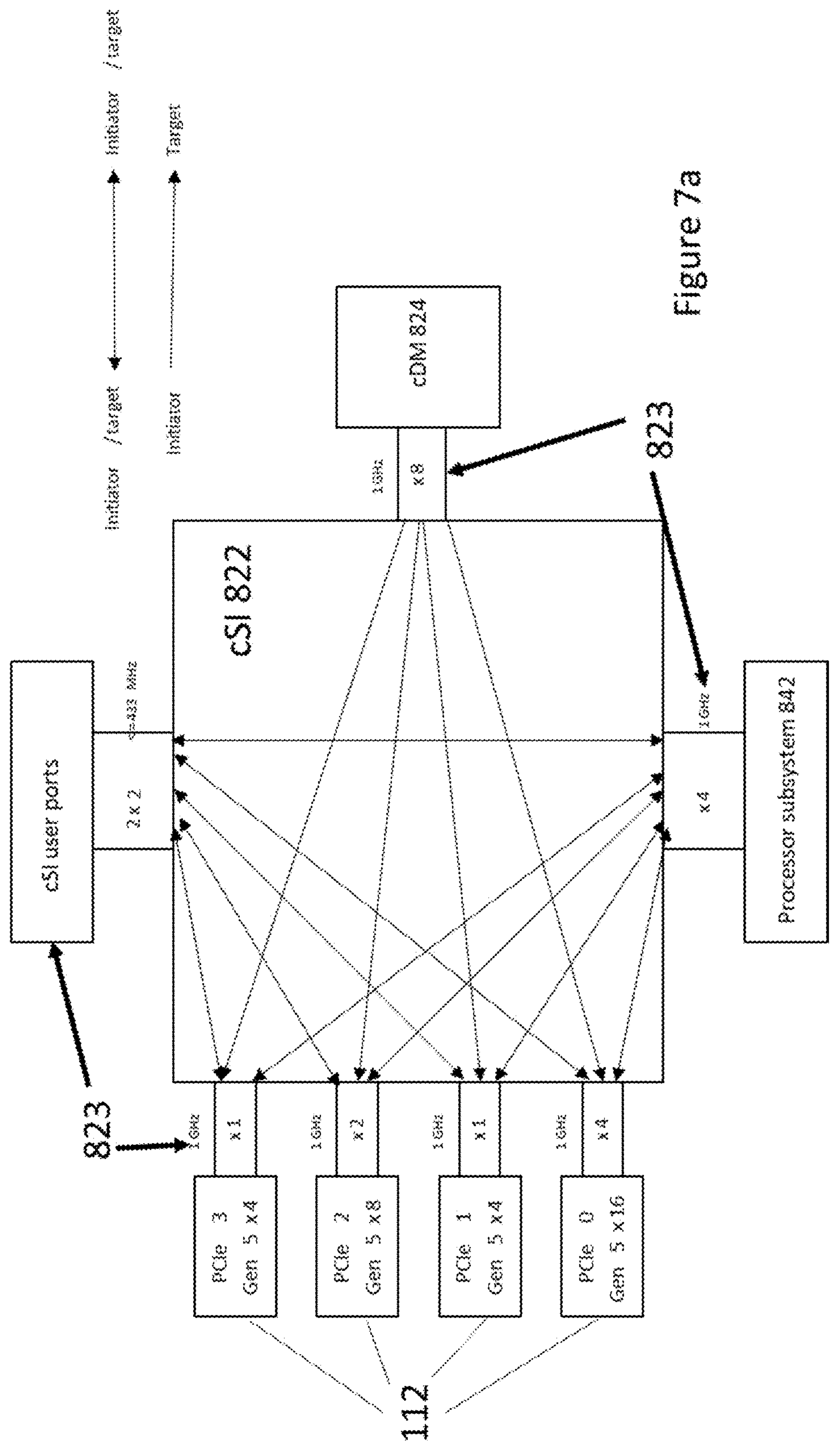
FIG. 7*a* schematically shows the interfaces of the composable scalable interconnect (cSI) of some embodiments.
Figure 7B:
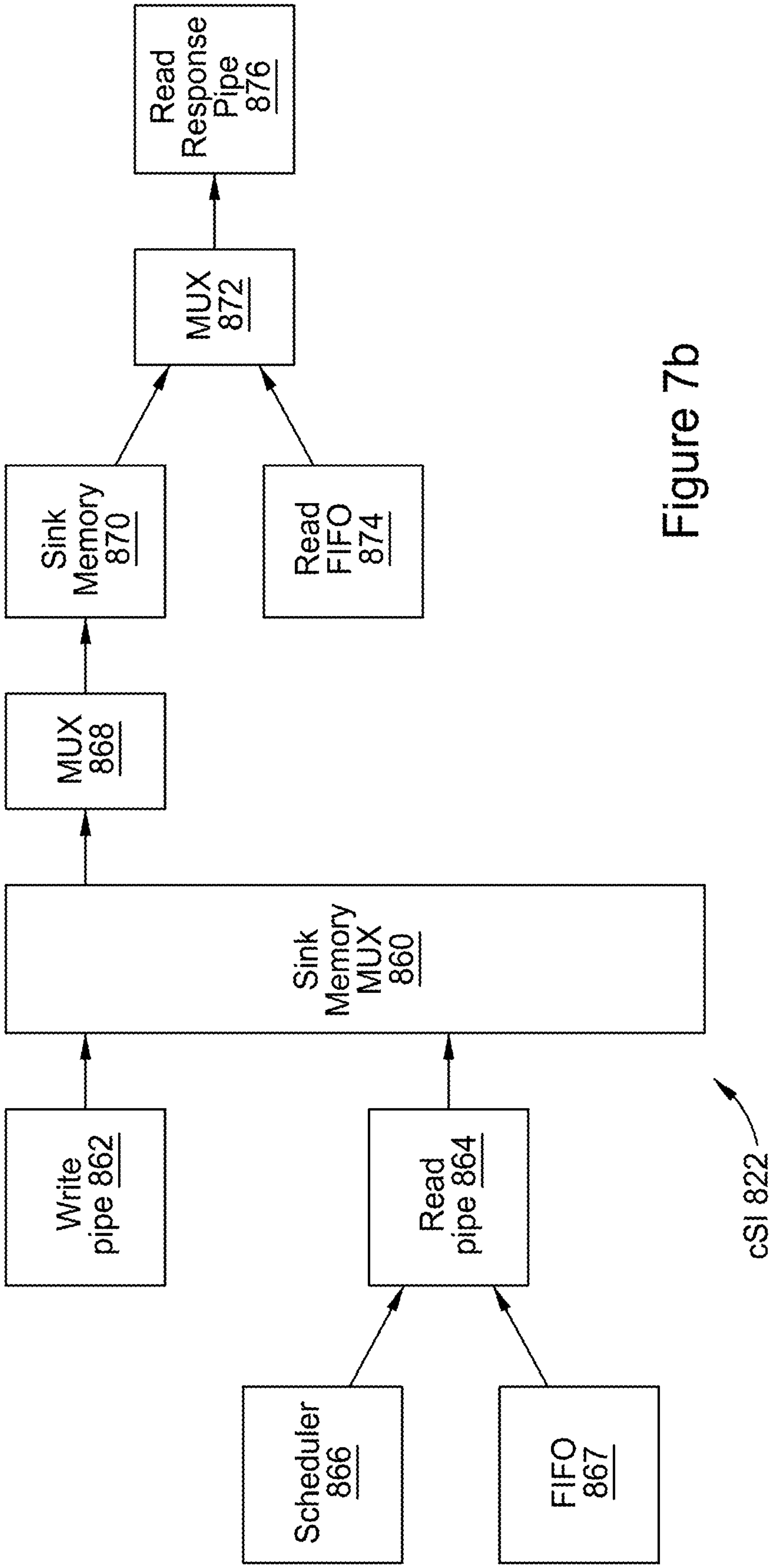
FIG. 7*b* shows the composable scalable interconnect (cSI) of some embodiments in more detail.

Reference is made to FIG. 7*a* and FIG. 7*b* which schematically shows the cSI 822 introduced in FIG. 6. The cSI 822 sees clients as capsule sources and sinks where a source sends capsules into the cSI 822 and the sink receives capsules from the cSI 822. At a system level, clients of the cSI (cSI clients) are initiators and/or targets. Both the initiator client and the target client may implement respective interfaces to the cSI.

As shown in FIG. 7*a*, the cSI 822 is an N×M streaming fabric connecting N capsule sources to M capsule sinks. N and M may be the same or different number. The cSI 822 provides connectivity between initiators and targets by transporting memory read requests, memory write requests, completions, and/or other types of transactions. The cSI 822 may provide PCIe-like connectivity in some the embodiments. The cSI 822 may be considered to provide a transport medium. The cSI 822 can be regarded as a source-routed switch matrix, allowing traffic from multiple sources to be routed to multiple sinks. The sources and sinks do not necessarily have the same bus widths or data rates.

As shown in FIG. 7*a*, the cSI 822 has interfaces 823 to the cDM 824, the PCIe interfaces 112 (via the PCIe bridge), the processor subsystem 842 (via the bridge 830) and user ports for the cSI which may be provided in the fabric (these may bypass the cDM). The interfaces may be a sink interface, a source interface or both a sink interface and a source interface. The interfaces shown in FIG. 7*a* are by way of example only and different embodiments may comprise different interfaces. It should be noted that the notation x1, x2, x4 and x8 schematically represents the number of bus segments supported by the respective interface, in FIG. 7*a*.

The interface with the cDM 824 may support 8 bus segments with the interface with processor subsystem supporting 4 segments. The interface with the user ports for the cSI may support 2×2 segments.

Capsules passing from a specific source to a specific sink are segregated into mutually non-blocking flows based on capsule type and virtual channel assignments. Capsules in the same flow are delivered in order and are not blocked by capsules belonging to another flow.

Capsules may be passed into and out of the interconnect over segmented streaming buses. The segment size may be any suitable size, for example 20B. In other embodiments, the segments may be larger or smaller than this example size.

The cSI capsule header size is in some embodiments 28B, and therefore two segments are required for small capsules such as read requests and writes or completions with small payloads. The cSI capsule header size may be larger or smaller than 28B. In some embodiments, the cSI capsule header size may be accommodated in one or more segments.

The number of segments used by each bus depends on the performance requirements of the interface. Buses carrying only NPR (non-posted request including read requests) flows may be one segment wide. This may be the case since NPR capsules are small and therefore do not need as much bandwidth as PR (posted requests including writes) and CMPT (completions which include read data) flows.

Virtual Channels (VC), when provided, exist between one source and one sink. Having more than one VC provisioned between a source and a sink for given capsule type allows multiple non-blocking flows (one per VC) to exist for that capsule type between the source and the sink. In this regard, reference is made to FIG. 7*c* which shows three virtual channels VC0, VC1 and VC2.

Segmented buses, such as previously discussed may be used in some embodiments.

cSI capsule flow has the following two stages:

From source client to the cSI buffers (sink memory buffers). A source client can write to one or more or even many different buffers.

From cSI buffers (sink memory buffers) to destination client. A buffer can be read by one sink client in some embodiments.

Figure 7C:
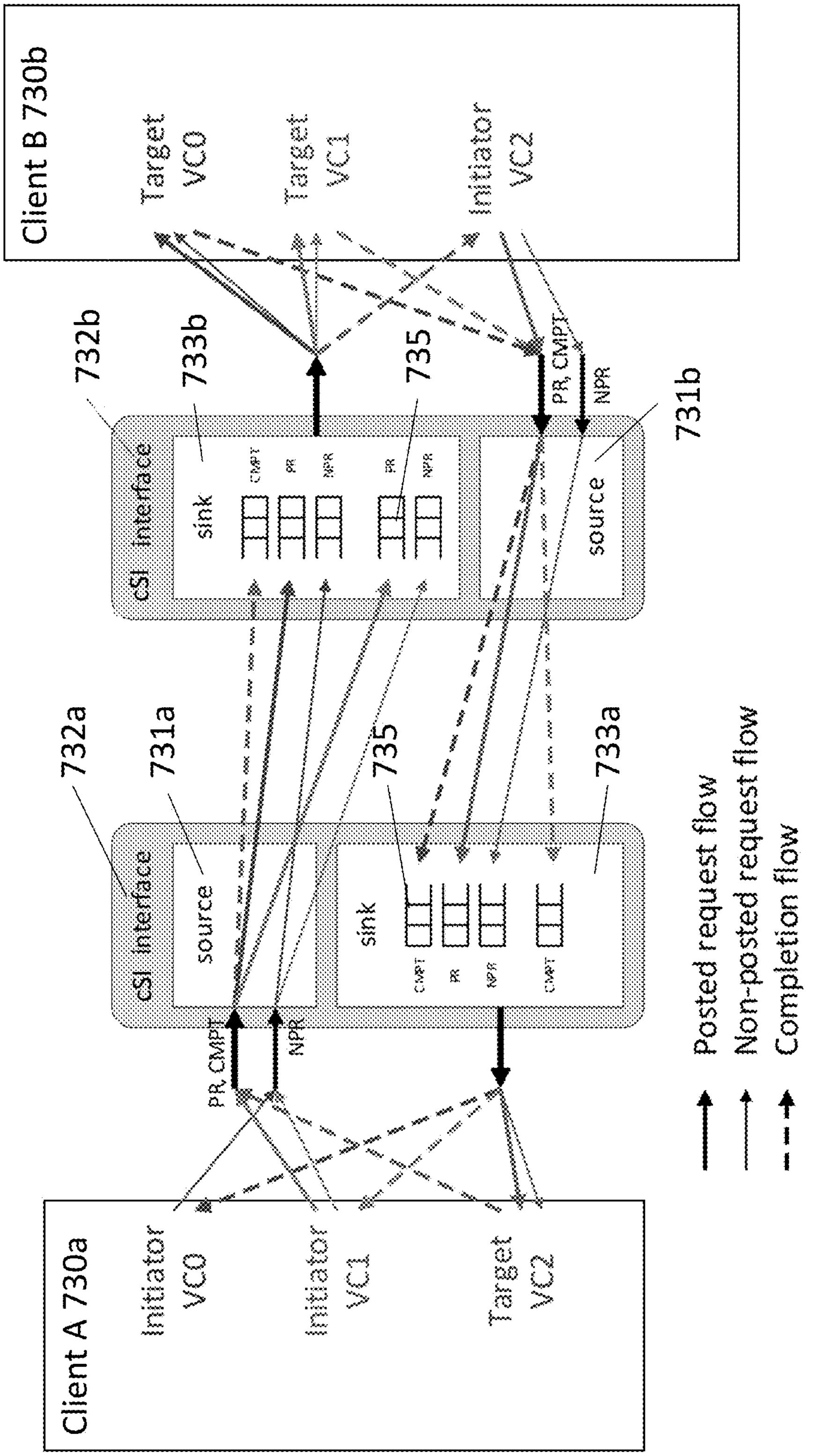
FIG. 7*c* shows example virtual channels of the composable scalable interconnect (cSI) of some embodiments.

In the example shown in FIG. 7*c*, a first client, client A, 730*a* of the cSI interfaces with an interface 732*a* of the cSI 822. That cSI interface 732*a* has a source 731*a* and a sink 733*a*. A second client, client B, 730*b* of the cSI interfaces with an interface 732*b* of the cSI 822. That cSI interface 730*b* has a source 731*b* and a sink 733*b*. The sinks 733*a* and 733*b* have a number of sink buffers 735. VCs support independent flows of requests, with separate buffering, flow control, ordering domains and quality of service. A VC may comprise a PR flow and an NPR flow going from initiator to target, and a CMPT flow going from target to initiator. The arrangement of FIG. 7*c* has 2 VCs from the first cSI client 730*a* to the second cSI client 730*b*—VC0 and VC1. The arrangement of FIG. 7*c* has 1 VC from the second cSI client 730*b* to the first cSI client 730*a*—VC2. The sink 733*a* of the first interface 732*a* has a CMPT buffer for VC0 and CMPT buffer for VC1 as well as a PR buffer and NPT buffer for VC2. The sink 733*b* of the second interface 732*b* has a CMPT buffer for VC2 as well as a PR buffer and NPT buffer for each of VC0 and VC1.

The cSI 822 may have one or more throughput characteristics:

A sustained throughput from any source to any accessible cSI sink buffer of the source may be provided. This may match the full bandwidth of the source.

An output may be provided from any cSI sink buffer to the corresponding sink client. This may match the full bandwidth of the sink.

Multiple sources may have throughput to the same sink. cSI may allow the scaling of bandwidth.

The cDMA takes the data flows in a system and connects them as required. Differences in peak data rates may be managed by using a collection of segmented busses with scheduled traffic flows. This may be a function of the cSI 822, which acts as a source-based router for flows in the cDMA system. The cSI may also enforce ordering rules. This may reduce the complexity of the bridges. This may avoid possible deadlock conditions.

The cSI may address issues relating to the scaling up to the bandwidth requirements for network interfaces. Based on a modular approach, the cSI allow a flexible data path to be constructed incorporating multiple data sources, sinks and types of data mover.

cSI interfaces may be exposed to the programmable logic (fabric) and/or the NoC.

Credits may be used and provide a flow control mechanism where a data producer advertises an amount of data and a consumer advertises an amount of space available. Credit updates are carried by credit messages from consumer to producer or from producer to consumer, depending on the scenario. The exact value of a credit may change in different contexts and may be a number of bytes, segmented bus segments, response reassembly buffers, or other values established for the context. Credits and credit contexts are managed by respective schedulers.

Reference is made to FIG. 7*b*. The cSI is provided with a plurality of write pipes 862 (only one of which is shown in FIG. 7*b* for clarity) and a plurality of read request pipes 864 (only one of which is shown in FIG. 7*b* for clarity). Each read request pipe 864 is associated with a sink scheduler 866 and a job information FIFO (first in first out buffer) 867. The write pipe and the read request pipe will be described in more detail later. A write pipe will output a write request to a sink memory multiplexer 860 and the read request pipe will output a read request to the sink memory multiplexer 860.

The sink memory multiplexer 860 sees all write and read requests from all write and read pipes and choses which can proceed to the sink memory buffers and which are back pressured.

Some source clients may be furcated into sub-busses using bus segmentation.

A cSI source or sink interface can be split into multiple interfaces or “furcated”. In the following example, a 4 segment bus is used. The segments may be used singly or in combination.

An x2 interface (source interface using a two-segment bus or sink interface using a two-segment bus) can be furcated into two x1 interfaces (using one bus segment).

A x4 interface (source interface using a four-segment bus or sink interfaces using a four-segment bus) can be furcated into two x2 interfaces or four x1 interfaces or even two x1 interfaces and one x2 interface.

In this example of a four segment bus, a furcated interface bus is statically allocated one, two or four segments (depending on the type of furcation and the original interface width) from the original interface. In this example, the furcated interface produces 2, 3 or 4 fully independent interfaces.

In some embodiments an interface may be allocated $2^n$ segments where n is an integer equal to 0 or more. The value of n may be determined by the total number of bus segments. In the example where there a maximum of 4 bus segments, n may be 0, 1 or 2. In some embodiments, there may be a total number of $2^n$ bus segments where n is an integer. Whilst the example has a total of four bus segments, it should be appreciated that other examples may have a different total number of bus segments.

In other embodiments, an interface may have an x3 interface made up of three bus segments or any other suitable number of bus segments.

The number of bus segments allocated to an interface, in alternative embodiments may not be an integer power of 2. The total number of bus segments in alternative embodiments may not be an integer power of 2.

As shown in FIG. 6 the cSI 822 interconnects one or more of the following clients.

The cSI-NoC Bridge 826. For example, this may be a 512 Gb initiator/target. With furcation support, the cSI allows this client to become two 256 Gb initiator/target clients or four 128 Gb initiator/target clients or one 256 Gb initiator/target client and two 128 Gb initiator/target. This supports a 1×4 interface or 2×2 interfaces or 4×1 interfaces or 2×1 interfaces and 1×2 interface. It should be appreciated that the 512 Gb value is by way of example only, and other embodiments may use a different value, which may alter the sizes of an interface and/or the number of supported interfaces.

The processor bridge 820. For example this may be a 512 Gb initiator/target or other value. This may be furcated as discussed in relation to the cSI-NoC Bridge 826. It should be appreciated that the 512 Gb value is by way of example only, and other embodiments may use a different value, which may alter the sizes of an interface and/or the number of supported interfaces.

PCIe Bridge 820. For example this may be a 512 Gb initiator/target (or other value) with furcation support. The cSI allows this client to become two 256 Gb initiator/target clients or four 128 Gb initiator/target clients or one 256 Gb initiator/target client and two 128 Gb initiator/target. This supports a 1×4 interface or 2×2 interfaces or 4×1 interfaces or 2×1 interfaces and 1×2 interface. It should be appreciated that these values are by way of example only. Other embodiments may use a different value, which may alter the furcated sizes. It should be appreciated that 512 Gb is by way of example only, and other embodiments may use a different value, which may alter the furcated sizes and/or the total number of segments. Where a different value to 512 Gb is used, this may be greater or less than 512 Gb.

cDM-800 Gb initiator. It should be appreciated that 800 Gb is by way of example only, and other embodiments may use a different value. This may be furcated in some embodiments. The different value may be greater or less than 800 Gb in some embodiments. In some embodiments, the value may be the same as the previous discussed clients. However, in other embodiments, the cDM initiator may be associated with a larger Gb value than the other clients.

In some embodiments, to ensure that the number of inputs/outputs following furcation remains the same, one or more of the following techniques may be used:

All furcated interfaces use the same local credit and scheduler resource message buses as the original interface. Messages belonging to different furcated interfaces are multiplexed on the same message bus.

Furcated source interfaces use the same NPR (non-posted request) bus as the original interface. Capsules belonging to different furcated source interfaces are multiplexed onto the same NPR bus.

In one example of a furcated operation, the cSI may receive data on a 1×4 interface from a data source which is intended for two different data sinks. The cSI may have a 1×2 interface with one of the data sinks and a 1×2 interface with the other data sink.

Join operations may be supported. This is where two or more interfaces are combined. For example, the cSI may receive data on a 1×2 interface from a first source for a first data sink and data on a 1×2 interface from a second source for the first data sink. The cSI may have a 1×4 interface with the first data sink. The data from the two sources may be both sent on the 1×4 interface.

However, the furcation cases may make no difference to the write pipe arrangement since each source sink may process at most a given maximum number of simultaneous segments needing to be written to sink memory and at most a given maximum number read requests that need to be simultaneously presented to the sink memory. In some embodiments, the given maximum number may be 4. In other embodiments, the given maximum number may be more or less than 4.

A first set of a plurality of multiplexers 868 are provided downstream of the sink memory multiplexer 860. Only one of these multiplexers of the first set is shown in FIG. 7*b* for clarity. The sink memory multiplexer 860 will direct the read and write requests to the required multiplexer of the first set of multiplexers 868. The output of the each of the first set of multiplexers 868 is provided to a respective sink memory 870. The sink memories may take any suitable form. In some embodiments, the sink memories may comprise single ported one segment wide RAMs. In other words, the width of the RAMs matches the size or width of a bus segment.

The output of two or more of the sink memories 870 is output to a multiplexer 872 of a second set of multiplexers. Again only one of the second set of multiplexers is shown for clarity. Each multiplexer 872 of the second set of multiplexers is controlled by an output of a respective read control FIFO 874. The number of multiplexers in the first set of multiplexers may be greater than the number of multiplexers in the second set of multiplexers. The multiplexer 872 of the second set of multiplexers provides an output to a respective read response pipe 876 which will be described in more detail later.

In one embodiment, a first pair of the first set of multiplexers 868 provide an output to respective sink memories 870 which in turn provide respective outputs to a first multiplexer of the second set of multiplexers 872. This arrangement may be repeated for a second pair of the first set of multiplexers providing an output to respective sink memories which in turn provide a respective output to a second multiplexer of the second set of multiplexers and so on.

The write request that make it to memory require no further processing.

Figure 8:
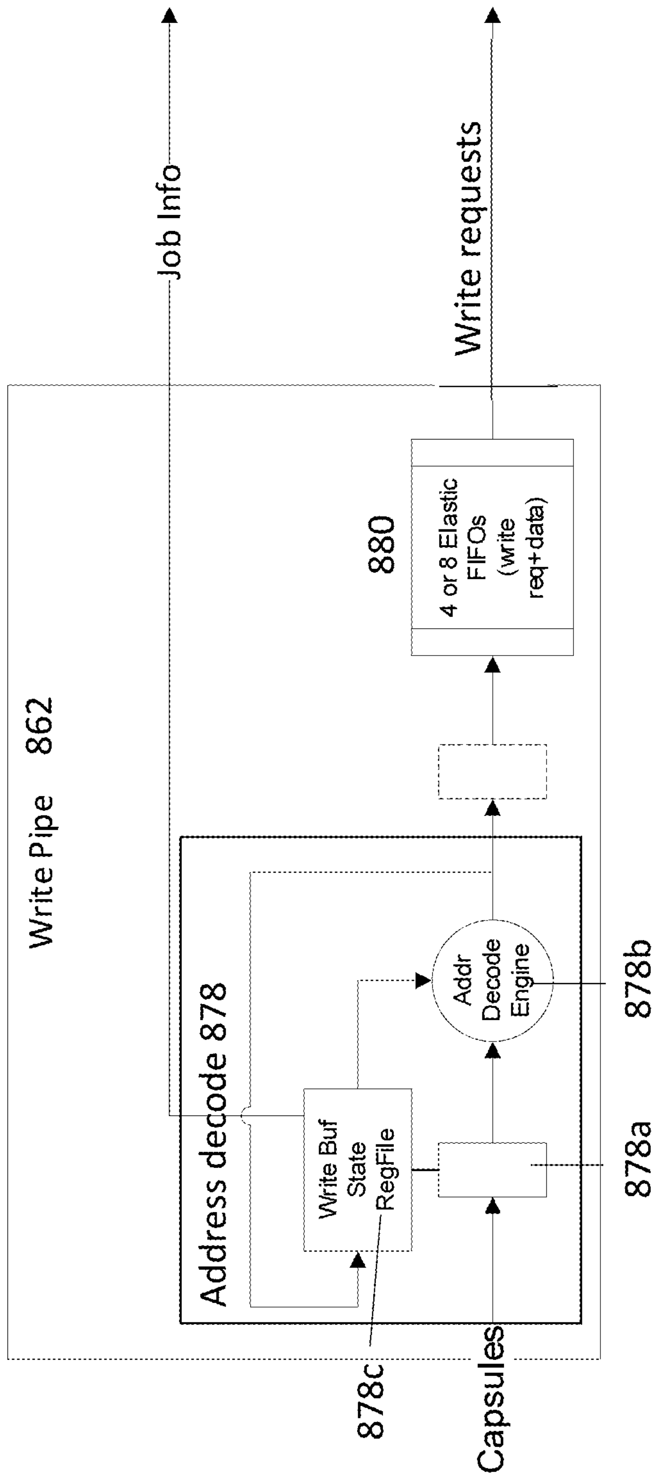
FIG. 8 shows an example of a write pipe of the cSI of FIG. 7*b*.

The read requests produce read data, which is collected into read response pipes, one for each sink client Reference is made to FIG. 8 which schematically shows an example of a write pipe of FIG. 7*b*. One write pipe may be provided for each source client. The write pipes accept capsules from source clients. The write pipe has an address decode part 878. The address decode part 878 or stage comprises an input buffer 878*a*, an address decode engine 878*b* and a write buffer state register file 878*c*. The address decode part 878 determines, for a capsule, the target sink memory, and the target sink buffer. The address decode part may consult the state of the target buffer. The address decode part may associate a sink memory address with each capsule segment. The address decode part may update the state of the target buffer. The address decode part may pass the write requests to the sink memory multiplexer via a FIFO 880. The output of the write pipe is provided by a capsule segment with a width corresponding to the width of a bus segment. The sink memory address may identify the memory bank of the sink memory as discussed later.

In more detail, control logic in the address decode part 878 monitors capsules appearing on the ingress bus. The logic inspects capsule header(s) and determines the target circular buffers for the capsules. The target buffer depends on capsule type and the virtual channel VC of the capsule.

The control logic inspects the buffer state (start, end, and write pointer), maintained in a block register file, and calculates the bus segment's write address in the sink memory.

The control logic in the address decode part may perform the above actions for all the segments of the bus in parallel.

The address decode part 878 handles read job-chunk boundary discovery and job notify messaging for each buffer. A job chunk is the amount of data the sink scheduler expects to be read from the buffer for each job request. The chunk may be approximately 1 KB extended up to nearest capsule or any other suitable chunk size. For each completed (fully written) job chunk the address decode part pushes a job notify message to the job information FIFO. A parallel job information FIFO may be provided for each buffer. The job notify message may have one or more of the following arguments: buffer ID and job-chunk length in segments. Each job information FIFO may be sized to match the size of the corresponding buffer.

The address decode part 878 may maintain a job-chunk complete timer per buffer. When a buffer starts receiving a new job-chunk the timer is armed. If the job-chunk does not complete within allotted time (i.e. timer expires) the address decode part acts as if the job-size is reached. If all jobs are incomplete, it is possible to fill the job chunk information FIFO before filling the corresponding buffer. Thus, the logic stops the timer if the corresponding job chunk information FIFO fill level reaches a threshold. The timer continues after the FIFO fill level falls below threshold. This condition may trigger a blocking stall.

The address decode part thus handles the job notify messaging for each buffer and provides a job information output which is provided to the respective job information FIFO.

The write pipe has a FIFO 880. There may be a dedicated FIFO for each bus segment. This may smooth transient delays caused by segment address collisions. The FIFOs enables all segments of the address decode part to move at the same time which may simplify the address decode logic. The output of the write pipe is thus a bus segment width and can be written in one operation to a cell of the sink memory. This memory cell has a width equal to a bus segment width.

Figure 9:
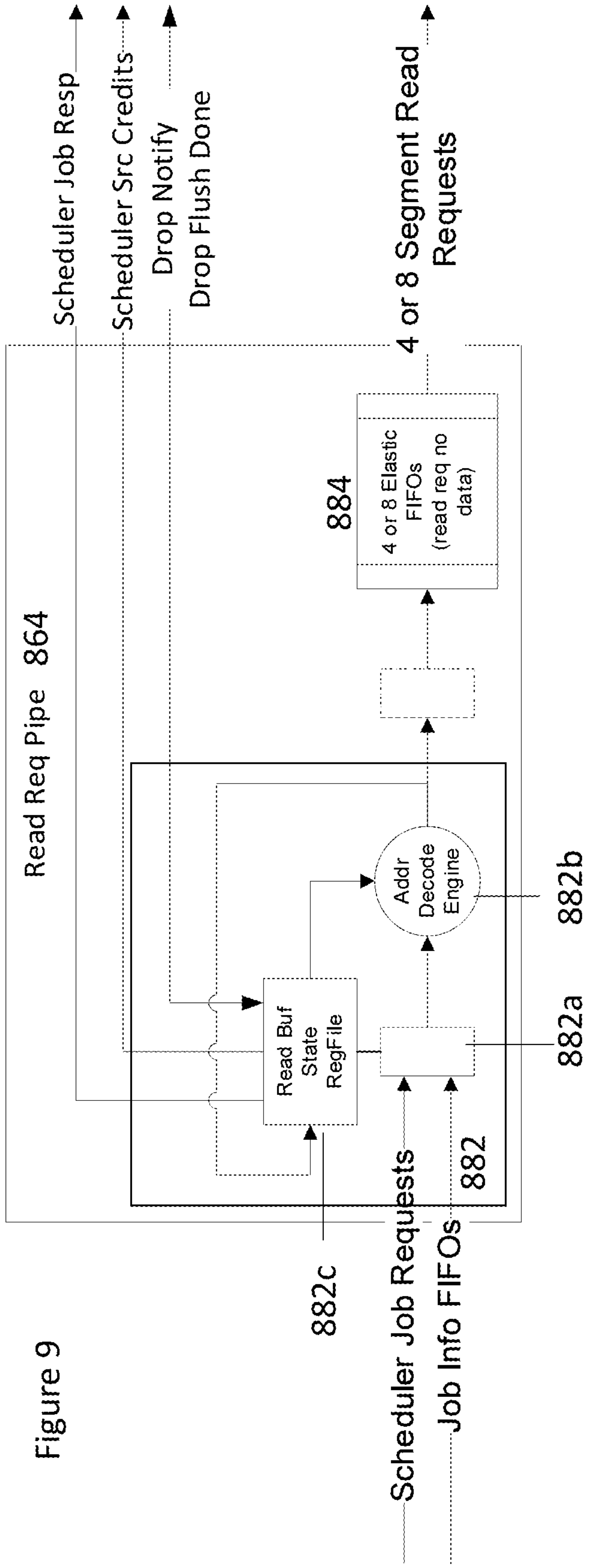
FIG. 9 shows an example of a read request pipe of the cSI of FIG. 7*b*.

Reference is made to FIG. 9 which schematically shows a read request pipe 864 of FIG. 7*b*. There may be one read request pipe for each sink client. The read pipe receives job requests from sink schedulers (one scheduler for each sink client). The read pipe may consult the state of the buffer (sink memory) that the scheduler instructs the pipe to read. The read pipe may generate read requests. The read pipe may update the state of the buffer. The read pipe may pass the read requests to the sink memory multiplexer.

The read request pipe has an address decode part 882. The address decode part or stage comprises an input buffer 882*a*, an address decode engine 882*b* and a read buffer state register file 882*c*.

The address decode part receives job requests from the sink scheduler 866. The job request asks the read stage to read a job-chunk of data from a specific location. This specific location may be a specific RAM cell or other memory cell or managed data structure such as a linked list, circular queue, or virtual FIFO. The request carries the buffer ID and the destination ID. A client may be permitted to have one or more outstanding job requests to the same or different buffers.

The address decode part receives job information which has been produced by the write stage (such as shown in FIG. 8) from the job information FIFO.

The job information allows the address decode part to transition from job to job (from buffer to buffer) without any overhead i.e. the stage does not over run the end of a job because it knows the job chunk length from the job information.

The job information allows the address decode part to process multiple job chunks during the same scheduler job request if the chunks are smaller than the default chunk size (due to job chunk filling timeouts in the write stages).

The job information allows the address decode part to know the state of the buffer at the job end, since the job information contains the length of job chunk in segments.

Upon completion of each job request, the address decode part generates a job response to the sink scheduler—the scheduler job response. The response carries source credit, cost, and resource credit fields.

During each active job execution cycle, the address decode part constructs up to 4/8 (or any other suitable number) simultaneous sequential read requests to the same sink memory circular buffer. The first and/or the last cycle of a job may have fewer than 4/8 (or any other suitable number) simultaneous requests because of alignment. On any given cycle only requests belonging to one job may be issued. This may be the case even if two sequential jobs are targeting the same buffer.

If the request address decode part services a furcated sink interface it may be able to process one job for each furcated interface simultaneously. Each furcated interface will be associated with one or more particular bus segments.

During each active job execution cycle, the address decode part constructs a request context and pushes it into the request context FIFO 884 to be collected by the response stage. The request context describes the request stage transaction i.e. which one of the read requests are valid etc.

In the case of a furcated interface one request context FIFO is used for each furcated interface.

If a capsule is dropped by the read request pipe, the read response pipe will issue a drop notification. This may be done where a capsule violates ordering rules. In this case the response pipe will continue dropping all the following capsules from the same buffer until read request pipe stops capsule flow from the buffer and notifies the response pipe using a flush done message.

The read request pipe may see two capsule drop notifications for every notification message issued by the client. One message is delivered directly bypassing the job request FIFO and the other is received via the same FIFO as the job request. The first message allows the address decode part to react to the notification immediately and the second message tells the address decode part that there are no more pipelined job requests for the affected buffer.

Figure 10:
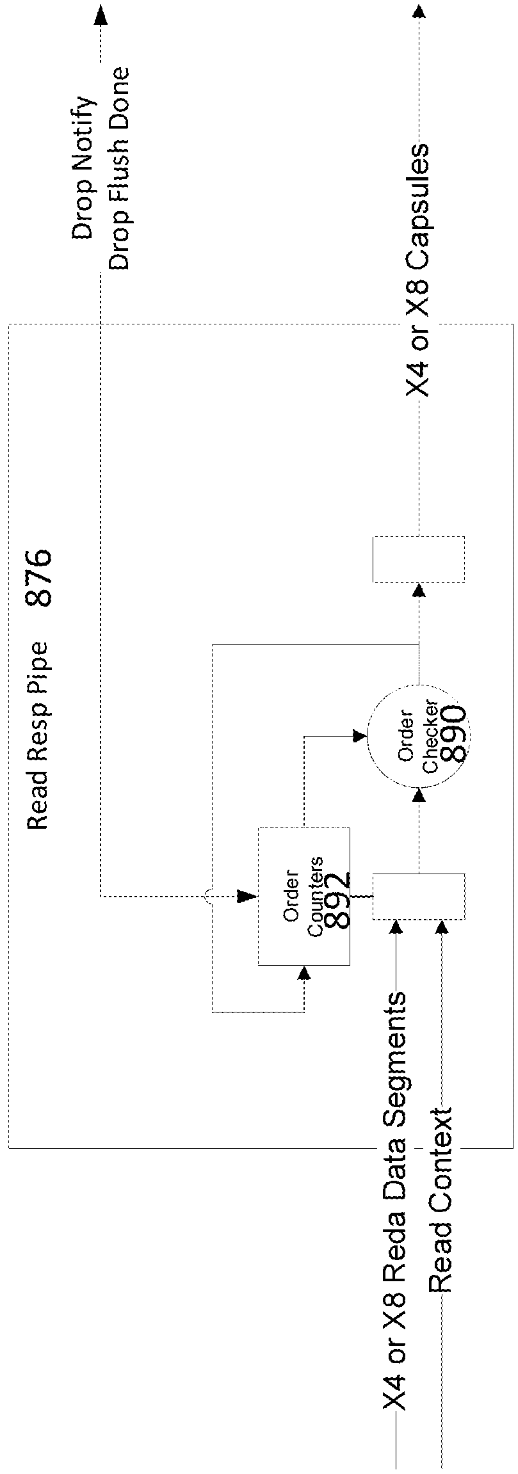
FIG. 10 shows an example of a read response pipe of the cSI of FIG. 7*b*.

Reference is made to FIG. 10 which shows a read response pipe 876. The read requests produce read data, which is collected into a number of read response pipes, one for each sink client. The read response pipe receives read data responses from the sink memories and the corresponding context from the read stage. The request context tells each response stage segment register which memory or RAM is to receive the data and whether the data is valid.

The read response pipe sees the same buffer segments in order. For each capsule the read response pipe updates/verifies order state using an order counter 892 and order checker 890 respectively. If the capsule is found to not be in order the pipe drops the capsule without passing it to the sink interface and notifies the read request pipe. The read response pipe continues to drop all capsules from the affected buffer (without issuing any more notifies) until the read response pipe sees a flush done message from the read request pipe.

On every cycle, the sink memory multiplexer 860 considers all write and all read requests to sink memories. The arbiter of the sink memory multiplexer 860 can make decisions for each sink memory in parallel since they are independent. In some embodiments there may be 8 sink memories. In other embodiments, there may be more or less than 8 sink memories. A sink memory may comprise a bank of one segment wide single ported RAMs. Other embodiments may use different types of memory.

The width of each single ported RAM is the same as the width of a bus segment. The port width is the thus the same as the width of a bus segment.

The number of RAMs in a memory bank may depend on the number of simultaneous write and read requests per cycle. There may be the same number of RAMs in a bank as bus segments. For example, there may be 32 RAMs in the bank and 32 bus segments. 32 streams (the read pipes and the write pipes) may be supported with each stream associated with respective FIFOs (the elastic FIFOs of the write pipe and the FIFOs of the read pipe).

The number of RAMs may depend on the bandwidth the logical multi-bank sink memory is required to sustain. If there are fewer simultaneous write and read requests, there may be fewer RAMs in the bank. By way of example only, the number of RAMs may be 16.

The bus is segmented and each segment is written/read from the memory bank independently.

The logical sink memory is comprised of physical segment wide RAMs and the logical sink memory address is striped across the bank to ensure that all RAMs are equally loaded. For example memory cell 0 is RAM0, 1 is RAM1 and so on.

If none of the requests collide i.e. none target the same RAM cell in the same sink memory bank, all requests may proceed. If some of the requests collide the sink memory multiplexer 860 acts as an arbiter. The sink memory multiplexer 860 may for any two or more collided write requests cause the one with the most entries in the elastic FIFO to win. If the requests have the same number of entries, absolute priority based on segment buffer index may be applied. This may not result in any imbalance since the loosing segment will soon have more entries in its elastic FIFO and will win on the following rounds.

For any two collided read and write requests the arbiter may use a programmable threshold mechanism to choose the winner.

To ensure that the read response pipe always sees response data from the same buffer in order, the arbiter of the sink memory multiplexer 860 arbitrates between colliding read requests as follows. Read requests may collide if a read pipe is operating in furcated mode in which case only the segments belonging to different furcated interfaces may collide. The arbiter may choose the furcated interface with most entries in at least one of its elastic read request FIFOs and allow all segments belonging to this interface to proceed. The arbiter, in some embodiments, does not allow a subset of read requests from the same interface to proceed i.e. either all or none of the requests proceed.

Thus the cSI may manage host interfaces that furcate without having to replicate DMA engines.

The cSI can be extended into the fabric. There may be two methods for doing this. In some embodiments only one of the methods may be used. In other embodiments, both methods can be employed at the same time. The methods are exposing fabric interfaces to fabric ports and tunnelling cSI capsules via the NoC. The NoC/fabric bridge may support both methods simultaneously. For simultaneous support of both methods, the cSI interface is furcated and the resulting sub-interfaces are respectively associated with NoC and with fabric pins or connections.

From a system perspective, the cSI may be expandable and adaptable for specific system needs. For that purpose, the cSI fits into one hub or be provided by a network of interconnected hubs. A hub, by itself is an n by m streaming fabric which connects n sources to m sinks. The hubs may be parametrizable and compile-time configurable.

The ease with which a custom cSI can be built using hubs and the straightforward mechanism for hub assembly support cSI composability.

The multi-hub fork-join approach may allow a portion of cSI to exist in soft logic. This means that many varied instantiations with different topologies can be created and (using dynamic reconfiguration) added to/modified at run time so as to provide connectivity for different kernels (or plugins).

The cDM (composable data mover) 824 provides the bulk data mover element of the cDMA system. The cDM is fed commands. The cDM works under the direction of the various DMA adaptors to move data to and from the cSI 822 to the required endpoints. The cDM 824 is used by the DMA adaptors 832. In some embodiments the cDM is exposed to the programmable logic of the NIC so other DMA adaptors can be used. This may be dependent on customer or user requirements.

The cDM aims to decouple the API for DMA adaptors from the data movement process. The cDM sits between cSI and the DMA adaptors. It is one of the possible clients of cSI and may be the highest bandwidth component in any DMA system. Owing to the flexibility of cSI, cDM can perform the data movement part of transactions involving one or more of PCIe host(s), CPUs, DDR, NIC and fabric clients either directly or through the NoC. This may be under the control of DMA adaptors or fabric client DMA adaptors.

It should be appreciated that the DPU.Host 502 can incorporate one or more DMA adaptors or may itself be considered to be a DMA adaptor. The one or more DPU.Host 502 DMA adaptors may be an alternative to or in addition to the one or more DMA adaptors referenced 832 in FIG. 6.

There may be three "data plane" data mover operations which are handled by cDM. They are invoked by requests and, when completed, generate responses (which may be suppressed in some cases).

An M2ST (memory to streaming) operation moves a contiguous block of data from target memory to a cDM streaming interface to be consumed by an adaptor via a streaming interface. In this example the source is accessed using memory like transactions whereas the destination receives a data stream.

An ST2M (streaming to memory) operation moves a block of data from an adaptor via a streaming interface to a location in the target memory.

An M2M (memory to memory) operation moves a contiguous block of data from one target memory location to another target memory location. The memory locations can be in the same or different physical targets.

ST2M, M2ST, and M2M may be bulk operations.

There may be two control plane data mover operations. A message load is like an M2ST operation and a message store is like an ST2M operation. These operations (interfaces and API) may be for moving control plane traffic such as descriptors and events, rather than data. This may be for short inline messages.

An adaptor is a cDM client. As mentioned, the DPU.Host may comprise one or more DMA adaptors. The one or more DMA adaptors of the DPU.Host may be cDM clients. A cDM client implements the cDM API, which includes ST2M, M2ST, M2M, message load, and message store requests/responses. A client is not required to support all the API requests/responses. For example, some clients only perform bulk data writes (ST2M) while others only perform bulk reads (M2ST).

Figure 11:
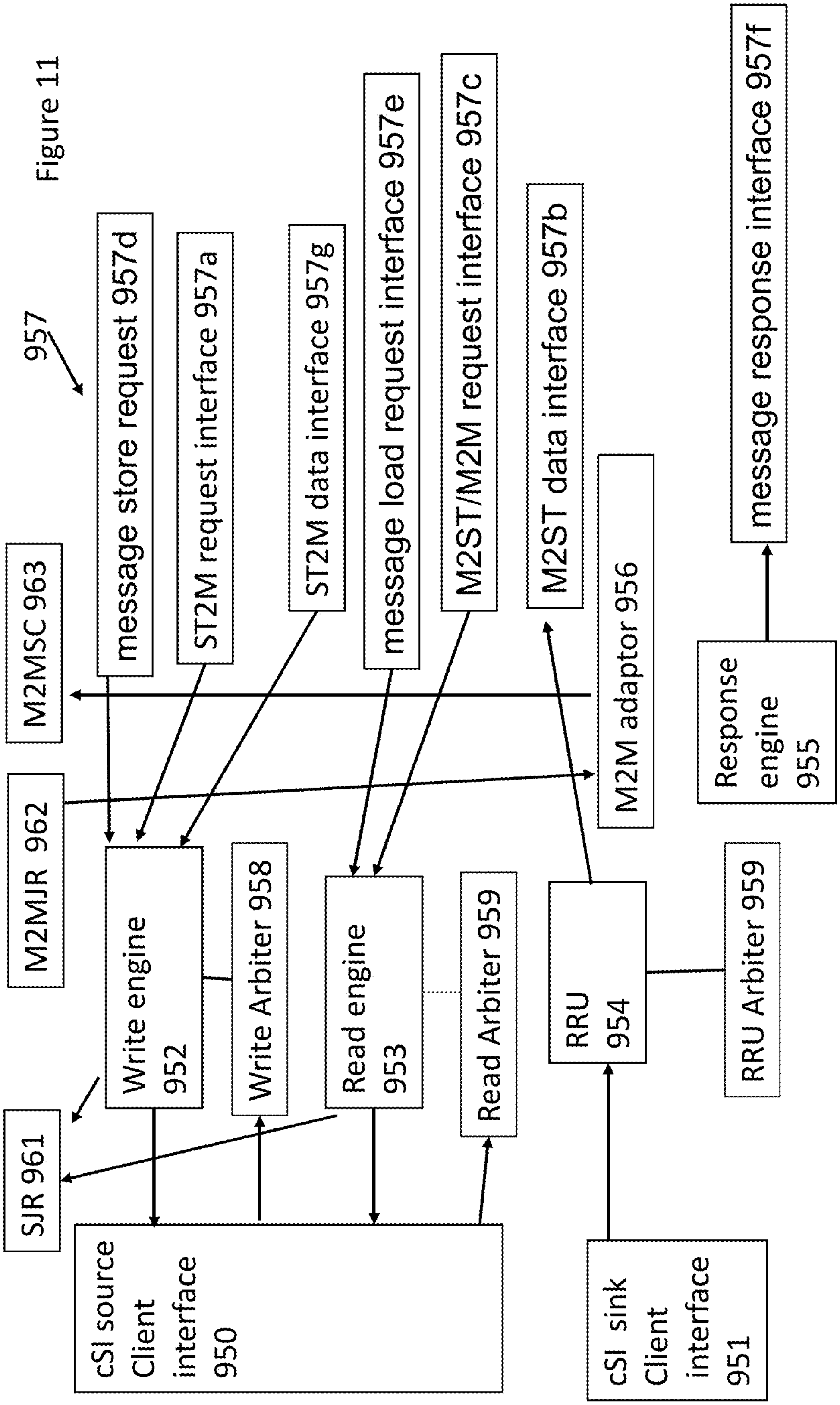
FIG. 11 shows an example of a composable data mover cDM of some embodiments in more detail.

Reference is made to FIG. 11 which schematically shows the cDM 824.

The cDM 824 has various interfaces. The interfaces may operate at any suitable rate. In some embodiments, the interfaces may operate at a relatively high rate. For example, in some embodiments, the interfaces may operate at 1 GHz. Different rates may be supported by different embodiments.

A cSI source client interface 950 is provided to pass capsules from the cDM to the cSI and is flow controlled by credits passing from the cSI to the cDM.

A cSI sink client interface 951 is provided to receive capsules from the cSI and is flow controlled by credits passing to the cSI from the cDM.

The DMA adaptor interfaces 957*a* to *g* provide a respective interface between the respective DMA adaptor and the cDM. As mentioned previously, the DPU.Host 502 may include one or more DMA adaptors. cDM provides a dedicated interface for each operation type by each enabled adaptor. This may make it unnecessary to support multiplexing/demultiplexing and local credit schemes over the interfaces.

The DMA adaptor interfaces may comprise one or more of the following: An adaptor ST2M request interface 957*a*. This provides one or more request interfaces to support a corresponding number of write capable adaptors. Each transaction may pass one ST2M request from the adaptor to the cDM. The flow may be controlled by a ready/valid handshake. The requests are provided to a write engine 952.

An adaptor M2ST data interface 957*b*. This provides one or more data interfaces to support a corresponding number of read capable adaptors. A bus may be used. By way of example, the bus may be an AXI ST bus or any other suitable bus. The flow may be controlled by a ready/valid handshake. The data is provided by a response reassemble unit RRU 954.

An adaptor M2ST/M2M request interface 957*c*. This provides one or more request interfaces to support a corresponding number of read capable adaptors. Each transaction may pass one M2ST or M2M request from the adaptor to the cDM. The flow may be controlled by a ready/valid handshake. The requests are provided to a read engine 953.

An adaptor message store request interface 957*d*. This provides one or more request interfaces to support a corresponding number of adaptors. The first transaction of a message store request passes the control portion of the request and c bits of the message data from the adaptor to the cDM. Additional transactions from the adaptor to the cDM, if any, pass the reminder of the message data c bits at a time (or less on the last beat). The value of c may be 128 bits or any other suitable value. The flow may be controlled by a ready/valid handshake. The requests are provided to the write engine 952.

An adaptor message load request interface 957*e*. This provides one or more request interfaces to support a corresponding number of read capable adaptors. Each transaction passes one message load request from the adaptor to the cDM The flow may be controlled by a ready/valid handshake. The requests are provided to the read engine 953.

An adaptor message response interface 957*f*. Any operation may generate a response which supplies the operation's completion status information. A message load operation generates a response which carries both the completion status and the message data. The first transaction of a response passes the completion status and the first c bits of message data from the cDM to the adaptor. Additional transactions from the cDM to the adaptor, if any, pass the reminder of the message data c bits at the time (or less on the last beat). The flow may be controlled by a ready/valid handshake. The responses are provided by a response engine 955. The response engine 955 receives inputs from the RRU, the read engine and the write engine. (Not shown in FIG. 11)

An adaptor ST2M data interface 957*g*. This provides one or more data interfaces to support a corresponding number of write capable adaptors. Any streaming bus may be used. By way of example, the bus may be an AXI ST bus. The flow may be controlled by a ready/valid handshake. The requests are provided to the write engine 952.

It should be appreciated that the adaptor interfaces which are supported will depend on which one or more DMA adaptors are supported by the NIC. One or more other adaptor interfaces may alternatively or additionally be supported.

The cDM may also support one or more of the following interfaces.

A scheduler job response interface (SJR) 961. This interface broadcasts job responses to all cDMA initiator schedulers. The flow may be controlled by a ready/valid handshake. This interface receives job responses from the read engine 953 and the write engine 952.

M2M job request interface (M2MJR) 962. This passes job requests from an initiator scheduler to the cDM internal M2M adaptor 956. The flow may be controlled by a ready/valid handshake.

M2M source credit interfaces (M2MSC) 963. This passes source credits from the cDM internal M2M adaptor block 956 to the initiator scheduler. The flow may be controlled by a ready/valid handshake.

cDM may service one or more adaptors. An adaptor may be a hardened adaptor. The hardened adaptor may be provided in the part of the NIC associated with the cDMA. The cDM provides a dedicated interface for each operation type supported by a given enabled adaptor. Each enabled adaptor may own a complete set of cDM interfaces needed to perform the adaptor supported cDM operations.

There may be one or more hardened and enabled adaptors. Alternatively, or additionally an adaptor may be a so-called soft adaptor and provided by, for example, the programmable logic or programmable circuitry. The cDM has an interface to expose the cDM adaptor interfaces to the fabric to be used by one or more soft adaptors.

The cDM may in some embodiments support one or more hardened adaptors and/or one or more soft adaptors. Any one or more or all the adaptors may be active at the same time. The adaptors may comprise one or more hardened adaptors and/or one or more adaptors provided in programmable logic.

In some embodiments, regardless of the nature of an adaptor and whether it is hardened or instantiated in the fabric, the adaptors may use the same protocol to communicate with cDM. This is referred to as the adaptor API. The adaptor API uses a request-response model. This adaptor API may be used by one or more DMA adaptors in the DPU.Host 502.

The write engine 952 is provided with a writer arbiter 958.

cSI VCs are virtual pipes featuring independent buffering resources allowing initiators, like the cDM, to perform target memory reads and writes on behalf of its clients in mutually non-blocking fashion. The memory of the response reassembly unit RRU 954 is for the data to be returned by all cDM inflight read requests. This memory is shared by all cDM clients. The RRU reorders and packs the read data and queues the data ready to be returned to the requesters into dynamic virtual FIFOs referred to as read channels. The clients utilizing read capable VCs may also be assigned an equal number of RRU read channels.

The M2M adaptor 956 is responsible for the write-half of the M2M operations originated by the DMA adaptors. The M2M adaptor owns up to a given number of write-only VCs. The given number may be 4 or any other suitable number.

DMA adaptor cDM requests may include a virtual channel identity VC ID field which the cDM translates to a cSI VC ID using per adaptor or message load/store VC translation tables. In case of a read capable VC the translation table also provides the read channel ID. In other words, the cDM clients are not required to be aware of global cSI VC IDs and read channel IDs and can use a local VC ID value instead.

A request may be for a ST2M block move. A DMA adaptor requests the cDM to move a block of data to a contiguous memory location accessible via a cSI interface. The adaptor delivers the data block to the cDM via a streaming bus interface. The cDM expects the adaptor to supply the streaming bus data blocks in the same order as the requests.

The DMA adaptor may truncate a block (i.e. supply fewer bytes than specified in the request) due to an adaptor error condition. To allow for this, the streaming bus may incorporate a Truncate Flag (in addition to the EOP flag). The data block may be aligned to the bus transaction boundary plus specified offset bytes. If desired, the cDM responds to the adaptor upon completion of the request. Request completion, in this case, means that all the request streaming data is passed to the cSI. While executing the request, the cDM produces one or more memory write capsules belonging to the posted request PR flow type. The cDM is configured with interface's rules. The cDM knows which interface it is accessing and thus can apply different rules. One variable may be the maximum write request setting. The capsule headers are populated using one or more of the following arguments:

A client identity ID identifying a cDM client—that is the DMA adaptor;

VI identity used with the client ID to lookup the cSI VC to be used by the request;

Address information.

Length information indicating the number of bytes of data to write; Information indicating if a response is requested. If set, this instructs the cDM to generate a response once the block has been moved to the cSI interface.

The request may be a M2ST block move. An adaptor requests the cDM to move a block of data from a contiguous memory location accessible via a cSI interface. The adaptor collects the data block from the cDM via a streaming interface. Each M2ST request choses a read channel from a set of channels owned by the adaptor that originated the request. The cDM places the same channel data blocks on the streaming interface in the same order as they were requested. The different channel requests even from the same adaptor return data out of order.

The cDM may truncate the data block (i.e. supply fewer bytes than specified in the request) due to an error condition reported by the cSI (for example a PCIe read error). For example, if a read error happens from the PCIe core, the bridge receives a capsule with an error flag. It in turn generates a capsule with an error flag. The cDM sees the capsule with an error, knows which request it belongs to, truncates the data, and handles all the rest (for example ignoring additional response capsules for this request).

The data block may be aligned to a transaction boundary plus the specified offset byte. If desired, the cDM responds to the adaptor upon completion of the request. Request completion, in this case, means that all the requested streaming data is delivered to adaptor. While executing the request, the cDM produces one or more memory read capsules. The cDM is configured with rules of the interface. It knows which interface it is accessing and thus can apply different rules. One variable here may be the maximum read request setting. The cDM collects the memory read completion capsules (belonging to the associated flow type) and uses them to assemble the requested data block. The request capsule headers are populated using one or more of the request arguments described below:

VI identity used with the client ID to lookup the cSI VC and the RRU Read channel ID to be used by the request Relaxed read information. If set, this instructs the cDM and cSI, to allow the read request capsules generated during this cDM request to bypass any in-flight write (including those with the same requester) produced by the cDM.

A request may be a M2M block move. This may be similar to the previously described request. A DMA adaptor requests the cDM to move a block of data from one contiguous memory location accessible via cSI interface to another contiguous memory location also accessible via cSI interface. This request does not expose the adaptor to the content of the data block. The cDM may respond to the adaptor on completion of the request. The block may be truncated, as previously described. In this example the data loops from read to write are inside the cDM. This request may use a source virtual channel ID and a destination channel ID. The source VC ID and the client ID are used to look up the cSI VC and the RRU read channel ID. The destination VC ID with the M2M adaptor's client ID is used to look up the cSI VC for the write half of the request.

The request may be a message load. A DMA adaptor requests the cDM to move a block of data from a contiguous memory location accessible via the cSI interface. Unlike M2ST, this request may return the requested data via the message response interface rather than placing it on the streaming interface. The request may have a VC ID which is used to lookup the cSI VC and the RRU read channel ID to be used by the request. The lookup table in this case is the cDM message load/store VC lookup table used by message load and message store requests from all cDM clients.

The request may be a message store. A cDM adaptor requests the cDM to move a block of data (in this case a message) to a contiguous memory location accessible via the cSI or to send an interrupt request capsule to one of the PCIe targets. Unlike ST2M, this request consumes the data from cDM request interface rather than collecting it from a separate streaming interface. A message store operation is intended to be used to deliver notifications and interrupts signifying the completion of certain operations. Because notifications can be data-position dependent (i.e. follow the delivery of related data), the message store operation has ordering controls.

Message stores may be frequent and small. It may be desirable to combine stores that are adjacent in memory into a single transaction. To facilitate this without extra logic in adaptors, the cDM implements a write combining mechanism that can be applied to any message store request. A VC ID is used to look up the cSI VC used by the request.

Responses may be generated for message load requests and on demand for other request types. The message load response makes use of the response payload component to supply the message block. Responses may be returned in the same order as the corresponding requests were executed, which is not necessarily the same as the issue order.

An ST2M response is issued when all write capsules corresponding to this request have been passed to the cSI.

An M2M response is issued when all capsules corresponding to this request have been received from the cSI and all write capsules corresponding to this request have been issued to cSI.

An M2ST response is issued when all capsules corresponding to this request have been received from the cSI and the requested block has been streamed to the adaptor.

A message store response is issued when all write capsules corresponding to this request have been passed to the cSI.

A message load response control component is issued when all capsules corresponding to this request have been received from the cSI. The response control component is passed to the adaptor at the same time as the first transaction of the response payload component.

The ST2M, M2M write half, and message store traffic compete for the cDM write engine (WE) 952 bandwidth. The cDM implements an internal arbiter—the write arbiter (WA) 958 to load balance between these request types. The WA is responsible for ensuring that message store traffic and data write traffic share WE bandwidth appropriately and that the WE does not head of line block or deadlock.

To ensure that the WE 952 transfers message store data at full speed (independent of the adaptor speed), the WA 958 monitors the state of the message store FIFOs and does not select a FIFO if the FIFO does not appear to hold at least one complete message.

To ensure that the WE transfers ST2M data at full speed (independent of the adaptor speed), the WA 958 monitors the state of the ST2M data FIFOs and does not schedule a thread if the FIFO does not appear to hold enough data to finish the request or to form at least one capsule.

While arbitrating between the threads, the WA 958 aims to achieve the following:

The ST2M request sources share WE bandwidth equally.

The message store request sources share WE bandwidth equally,

The message store request vs ST2M request arbitration is based on programmable priority.

The write engine WE 952 provides ST2M processing.

The cDM sees a given number of FIFO pairs where one FIFO in a pair carries a ST2M request and the other FIFO carries ST2M data. Each pair is owned by an adaptor instance. The adaptor decides (under cDMA scheduler control) which one of its internal sources (queues) pushes the next ST2M request/data and guarantees that the requests and the data are seen by the cDM in the same order.

The WE processes ST2M requests from the given number of FIFO pairs in parallel using one thread for each. The WE consults the arbiter at each capsule boundary.

Following completion of an ST2M request the WE engine emits a response word (if requested by the request) to the response engine.

Following completion of an ST2M request marked with an end of job flag, the WE uses the values of per thread job cost and resource credit accumulators to generate a job response message to the scheduler.

The write engine WE 952 provides message store processing.

The cDM sees a given number of FIFOs carrying message store requests. The WE processes message store requests from the given number of FIFOs sequentially. Once a thread accepts a request it processes it to the end without suspending. The engine consults the arbiter once it completes the request.

Following completion of a message store request the WE emits a response word (if requested by the request) to the response engine.

The write engine WE 952 provides message store—ST2M data synchronization. Message store operations are commonly used to write out events that notify a cDMA application about ST2M data delivery. Such events should not overtake the corresponding data. The cDM and the cSI incorporate logic to synchronize the arrival of selected ST2M request data and the corresponding message store request data.

A cDMA application can enforce an arbitrary order between any set of DMA requests by employing barriers. The cDM and cSI may implement dedicated logic for this synchronization scenario.

Adapters can ask for message store—ST2M request synchronization using a message store request argument. The cDM does not decouple synchronized and not synchronized message store requests from the same adaptor and instead buffers message store requests in the per adaptor message store request FIFOs.

To ensure that a synchronized message store request retains its position relative to ST2M data all the way to the target, the message store data utilizes the same cSI VC as the ST2M data. The ST2M data and the message data will share the same buffers in the sink memory.

The WE may provide message store write combining. This is performed within the WE.

The M2ST, M2M read half, and message load traffic compete for the cDM read engine (RE) 953 bandwidth. The cDM implements an internal arbiter, the read arbiter (RA) 959 to load balance between these request types.

The RA is responsible for ensuring that message load requests and data, and data read requests share RE bandwidth appropriately and that the RE does not head of line block.

While arbitrating between the threads the RA aims to achieve the following:

The M2ST/M2M-read-half request sources share the RE bandwidth equally.

The message load request sources share the RE bandwidth equally.

The message load request vs M2ST/M2M-read-half request arbitration is based on programmable priority.

The read engine 953 may perform M2ST processing. The cDM sees FIFOs carrying M2ST and M2M requests. The adaptor decides which one of its internal sources (queues) pushes the next M2ST/M2M request.

The RE processes M2ST/M2M requests from the FIFOs in parallel using one thread for each. The read engine consults the arbiter at each capsule boundary.

Following completion of an M2ST/M2M request marked with end of job flag the RA uses the values of per thread job cost and resource credit accumulators to generate job response message to the scheduler. The M2ST and M2M may be treated the same for the purpose of job cost and resource credit calculation.

At the beginning of each M2M request, the RA generates the M2M state word and passes it to cDM internal M2M adaptor. This word acts as a context that allows the adaptor to process the M2M read data, which it receives from RRU, and to complete the write halves of M2M requests.

The RE may provide message load processing.

The cDM sees a number of FIFOs carrying message load requests. The RE processes message load requests from the FIFOs sequentially. Once a thread accepts a request, it processes it to the end without suspending. The read engine consults the arbiter once it completes the request.

For each non-posted request NPR capsule output to the cSI source interface, the RA acquires a free NPR tag value from a free tag pool maintained by RE, places the tag into the capsule pseudo header, and emits the read state word containing the tag and other context to the RRU. This word carries the context that allows the RRU to process the capsules carrying the data requested by the NPR. The tags are returned to the free tag pool by the RRU after it collects all requested data for the given NPR The RE may provide RRU memory space tracking. The RRU memory is a relatively limited resource. When all of the RRU memory is reserved for inflight read requests, the RE stalls the current thread. The RRU memory is a collection of buffers. The buffers hold completion capsule payloads. Different payloads may not share the same buffer. The RE determines (based on the read request address and the target completion payload length setting) how many completion capsules and of what size the request will generate and reduces the RRU memory free buffer count by the appropriate amount. The RRU may report back to the RE each time a buffer is freed.

The RRU 954 processes read response data belonging to M2ST, M2M, and message load requests. The RRU receives completion capsules from the cSI sink interfaces. Each capsule carries the NPR tag of the corresponding non-posted request.

The RRU maintains the state of outstanding NPRs indexed by the tag value. The RRU also maintains the NPR issue order. Every NPR issued by the RE is associated with a read channel, identified by the cDM request which produces the NPR. The RRU maintains NPR order separately for each read channel. Capsule payloads are stored in RRU memory. The RRU keeps track of the amount of data received by each read channel and communicates it to the RRU scheduler in form of source credits. The RRU scheduler also receives destination credit information from read data recipients informing it how much read response data each recipient can accept.

There may be one or more of the following read data recipients:

The cDM response engine which receives message load data;

The M2M cDM internal adaptor which receives M2M read data; and

One or more external adaptors.

Each recipient owns one or more read channels.

The scheduler schedules blocks of data to be transferred from a qualified read channel to the corresponding recipients. Only in order data (without holes) is transferred. If while transferring the read channel data to the recipient, the RRU discovers an incomplete NPR response, the block terminates the transfer (without transferring any of the NPR response data) and informs the scheduler (using source credits) that the read channel has no data. This prevents the scheduler from continuing to schedule the same channel again, thereby wasting RRU bandwidth. When the hole is filled RRU informs the scheduler about the presence of data in the channel.

The data arrives to the recipients via rate match FIFOs. In some embodiments, there may be one FIFO per recipient. The FIFOs allow the RRU to egress data at a maximum speed (for example 800 Gbps or any other suitable speed) and the recipient to receive the data at its own speed. The FIFOs may not be needed by the response engine and M2M adaptors as these are cDM internal blocks which may accept the data at the maximum speed. The one or more external adaptors may require the rate match FIFOs. The FIFO sizes may be defined by the maximum number of outstanding jobs multiplied by the job length multiplied by the cDM—adaptor speed ratio.

The RRU may pack the data belonging to the same cDM requests before pushing it to the rate match FIFO, such that the data starts at the request specified offset in the first word and fills all but the last bus words completely.

The RRU maintains the context of the outstanding cDM requests. The cDM request information is provided to RRU as a part of the read state word from the RE. This context allows the RRU to generate the response word to the response engine for each completed cDM request that requires one.

The M2M adaptor 956 performs the write halves of M2M requests. The M2M adaptor receives M2M read state words from the RE which carry M2M request contexts. The M2M adaptor uses this context to process the in order M2M request read data that it accepts from RRU. The M2M adaptor utilizes cSI write-only VCs and RRU read channels. Internally the M2M adaptor implements circular buffers. There may be one to one correspondence between the M2M cSI VCs, RRU read channels, and internal circular buffers. The buffers accept the data from RRU read channels (channel per buffer) and advertises the destination credits to RRU scheduler. The same buffers act as data sources for the cDMA initiator scheduler 836 (see FIG. 6) which associates one cSI VC with each buffer. The cDMA initiator scheduler issues job requests to the M2M adaptor, the adaptor executes the job requests by issuing one or more ST2M requests/data to the cDM WE, the scheduler receives job responses for M2M and the other adaptors' job requests from WE. In other words, the internal M2M adaptor may function in the same way as the external adaptors.

The response engine 955 generates responses to the adaptors. The response engine receives response content from the write engine, the M2M adaptor and the RRU, the connections to which have been omitted for clarity.

ST2M and message store response content is supplied by the write engine.

M2ST response content is supplied by RRU 954.

M2M response content is supplied by the M2M adaptor 956.

The message load response and message load response data are supplied by the RRU 954.

A plurality of different DMA adaptors may be provided as described previously. DMA adaptors provide the API element of the DMA system, allowing the bulk data mover to be expressed in the required functionality of the DMA interfaces needed in a given system. These adaptors may be provided by the DMA adaptors 832 and/or the one or more DMA adaptors provided in the DPU.Host 502.

Examples of some other DMA interfaces are:

QDMA—provided by the current applicant;

EF100—used with network stacks and applications and again provided by the current applicant;

Virtio—provides a standardised hardware interface to allow guest operating systems to use the hardware with a portable device driver. The Virtio interface is supported both for guests over a hypervisor or guests directly over hardware (so called bare-metal).

Other DMA adaptors to suit particular customers are possible. These may be composed in soft logic. In this latter the case the cDM, cSched (composable scheduler) and cDC (composable descriptor cache) interfaces may need to be made available at the programmable logic boundary.

One or more DMA schemas may support streaming and/or one or more may not.

One or more DMA schemas support multiple queues and/or one or more may not i.e. single-queue.

DMA adaptors may be connected directly to the PL or to the NoC as required.

The specific requirements of a given DMA scheme are handled by the DMA adaptors.

DMA engines may benefit from descriptor management in order to improve performance. This may be to reduce the latency of fetching descriptors from host memory which may affect throughput and transfer rate. DMA engines may benefit from descriptor prefetch. In some embodiments, there may be more than one DMA adaptor. The different DMA adaptors may implement different DMA APIs to support the varied needs of host software. To facilitate a high data throughput, the DMA system should have a relatively high chance of being able to load an appropriate descriptor from local memory, rather than having to fetch it from the host or elsewhere off chip.

The cDC (composable descriptor cache) module 834 shown in FIG. 6 manages a relatively large block of memory set aside for holding DMA descriptors (to reduce latency) on behalf of at least one or some or all the DMA adaptors in the cDMA system. This may include those DMA adaptors implemented in soft logic. This may allow that memory to be optimally distributed and re-used. The cDC may be exposed to the fabric so that user-level adaptors can take advantage of the ordered storage available. cDC thus exists to provide managed access to a shared memory resource for storing descriptors potentially for two or more DMA adaptors. For the DPU.Host, descriptor processing may be performed in the fabric (optionally using the cDC).

Scheduling may be controlled by one or more schedulers 836. The scheduler may be required for scheduling initiator access to shared targets. The scheduler may schedule the DMA adaptor of the DPU.Host. Alternatively, the control logic for the DPU.Host may monitor the fill levels of various FIFOs and adjust the rates at which different commands are submitted (i.e. perform the scheduling operation itself).

The cDC is connected to each of the DMA adaptors 832. This may include a fabric interface so that soft DMA adaptors can take advantage of cDC's resources. The main connection to the cDC may be via combined command and data request and response buses, operating at the frequency of the block. The flow may be controlled with Rdy/Vld (ready/valid) signals. The request bus and the response bus may be the same or different sizes. The response bus may in some embodiments be wider than the request bus. The interface to the cDC may be multiplexed to two or more DMA adaptors and the PL via the cDC-MDML (multiplexer/demultiplexer logic) 844. The multiplexing may be based on a client identity field that is part of requests and responses.

The cDC may comprise two memory structures: the actual descriptor cache memory, and memory for tracking the state (read/pop/write pointers) of active/open lists.

The cDC may sustain one descriptor read and one descriptor write per cycle. The request/response scheme may allow two or more commands to be issued together every cycle.

The cDC may perform one get list or one put list operation roughly every n clock cycles (n may for example be every 64 clock cycles or any other suitable number). Operations involving more than one descriptor may pass one descriptor per clock, and thus occupy the request/response bus for multiple cycles.

The cDC holds sequences of DMA commands until they are used by an adaptor. For that, the cDC maintains descriptor lists that contain descriptors in FIFO order. From a cDC perspective, descriptors may be a constant size (for example 128 bit/16 byte or any other suitable size) chunks of data that the adaptors can use freely to fill with DMA commands, addresses, etc. The content of the descriptors is opaque to the cDC. In some embodiments, the only requirement may be that the access to descriptor chunks is in-order, following a FIFO order—with added flexibility for supporting head/tail (read/write) pointer adjustments and separate reclamation.

The cDC maintains a maximum number of active lists of descriptors which is configurable at compile time and stores the associated descriptors. Each active cDC list serves one DMA adaptor queue containing one or more jobs (a subsequence of consecutive DMA commands). An adaptor interacts with the cache by the means of four request operations: get list, put list, write descriptor, and read descriptor.

Get list allocates a free list in the cDC, associates it with the provided queue ID, and logically reserves space for the list. This operation returns the allocated list ID<LID> and how many descriptors need to be read in.

With an existing queue/list association, get list indicates the start of a new job on the same queue to the cache.

Put list declares the end of a job of an active queue/list, frees entries that will not be used anymore, and potentially closes the entire list/queue. When a queue is ended, the list is returned to the pool of free lists for association with another queue in the future.

The write descriptor adds one or more new descriptor entries to the tail of the list specified by the queue ID and the list ID at location of the write pointer and adjusts the write accordingly.

The read descriptor retrieves one or more descriptors from the head of the list specified in the queue ID and the list ID from the read pointer location, adjusts the read pointer, and returns the retrieved descriptors in the response. Optionally, the command can also pop descriptor entries from the list, by adjusting a pop pointer.

The cDC sends a evict response messages on the response channel whenever it evicts an idle list. The message contains the evicted queue and list IDs and optionally additional eviction state.

These four operations can be merged in one cycle, and in high-throughput cases, both a read descriptor and write descriptor may occur in one cycle.

Each request and response may contain a client ID (CLIENT_ID) that uniquely identifies the adaptor using the cDC and a queue ID (QID) and list ID (LID) which together specify a cached list. Both may be used in some embodiments, as the cache can decide to evict lists/queues, and re-associate the same list (LID) with a different queue that is requested by the adaptor. In some embodiments, queue IDs can be reused across adaptors, so the (CLIENT_ID, QID) pair is needed to uniquely identify a queue.

An example flow between a DMA adaptor and cDC may be as follows:

An adaptor receives a job request from the scheduler. This queue has not been used—the queue state contains no valid cDC LID.

The adaptor issues a get list request with LID set to −1 and asks for the number of descriptors it estimates it needs to complete the job. For example, the DMA adaptor will ask for 32 descriptors.

If the adaptor receives more job requests before it receives a response from the cache, it issues more get list requests with LID set to −1.

A response for the first get list command is received.

This supplies the LID together with how many descriptors the adaptor should add to the cache. Since this is the first get list for the list (there are no descriptors present or requested) the number of descriptors "needed" will be the same as the number of descriptors "wanted".

Responses for additional get list commands to the same queue will all have the same LID as the one returned in the first get list response.

Following the first get list response, the adaptor associates the LID with the requesting queue i.e. stores the LID in its queue state table.

Following each get list response, the adaptor fetches the "needed" number of descriptors i.e. issues message load request(s) to cDM to fetch the descriptors from the appropriate location. The location may be any suitable location such as from the host, DRAM (dynamic random access memory), programmable logic memory or any other suitable location The adaptor receives descriptors from the cDM and passes them to the cDC using the write descriptor command.

The adaptor receives and executes a job request.

At this time, it is expected that the queue has a valid LID. This property is guaranteed by the adaptor having properly prioritized future job requests against this job request. If no valid LID is present the adaptor terminates the job without executing it (as a zero-length job).

If a valid LID is present, the adaptor executes the job and issues a series of descriptor read requests.

The descriptor read operation is pipelined, meaning that the adaptor is expected to have multiple descriptors reads in flight during job execution.

Depending on the nature of the adaptor, it may be requesting one or more descriptors in each request. Read requests also instruct pop pointers to increment to match the number of descriptors already consumed. This is done in a timely way to free cache memory.

The adaptor may monitor for response-incomplete and insufficient descriptor errors and react accordingly.

The adaptor completes the job.

When the adaptor completes a job it issues a put list request.

A high-performance pipelined adaptor may overshoot the end of job by N descriptors (N is pipe depth) i.e. it will still have N descriptor read requests in flight when it reaches the job end condition. The put list request tells the cache how many descriptors it can forget about and how many descriptors will have to be re-fetched.

DMA adaptors may overshoot their get list allocations as the job size in numbers of descriptors is often not known in advance, so the adaptors may ask for a default that captures most typical conditions. Often, fewer descriptors are needed.

If an adaptor knows the precise number of descriptors needed ahead of time, it can overestimate that (at the cost of using more cache space and thus evicting other queues) in order to have more descriptor fetches in flight.

The put list operation can be combined with get list and/or read descriptors for the next job if it happens to be for the same list.

After this sequence of operations runs its course to completion, the two per-list reference counters maintained by the cDC (one counting outstanding gets for the list and the other outstanding descriptors for the list) will both become zero. The list/queue will be then eligible for eviction.

During the processing, the adaptor may receive an evict response message with the used <QID> and <LID> and additional eviction descriptor location information. This occurrence causes the adaptor to re-stablish the list, and re-fetch missing entries.

DMA adaptors fetch DMA descriptors and write them into a cDC list, and later read them again to perform the requested DMA operations. The cDC may provide storage for the DMA adaptors so they can have enough requests in flight to cover memory access latencies. The descriptor memory of the cDC is finite (also specified at compile time), and when exhausted, idle lists and their stored descriptors are evicted. Eviction only occurs for lists that are not currently processing a job. Lists that were evicted are subsequently available to be associated with other DMA queues. Freed descriptor memory entries are available to hold new entries. Evictions are propagated to the requesting DMA adaptor through eviction messages and adaptors will have to allocate a new list, and re-fetch and write evicted descriptors. The dynamic association between queues and lists keeps the tracking structures of the cDC independent of the total (and potentially large) number of available queue IDs. The eviction timing may simplify DMA adaptor design, as evictions can only occur during well-defined points of the queue lifetime (when there is no active job).

The cDC manages its internal descriptor and list resources without any adaptor involvement.

The cache automatically assigns available lists to queues and reserves the required amount of descriptor memory space.

The cache automatically evicts queues that it believes are not in immediate use. To avoid complex race conditions in adaptors, the cache maintains that the following condition is satisfied for a queue to be eligible for eviction:

The list associated with the queue has no pending put list operations i.e. the list's reference counter (which incremented for each get list and decremented for each put list) is zero. This means that the list is in the Idle state.

Because writes can only be pending after a get list that has not yet been closed by put list, the list associated with the queue has no pending descriptors. In other words, the list's reference counter which is incremented for each get list response by the specified number of descriptors and decremented for each write descriptor by the specified number of descriptors is zero.

Overall, this condition means that a queue will not be evicted while one (or more) jobs are being executed. Only after in-flight jobs have completed (all encountered get list operations were closed by receiving the same number of put list operations) will the queue be evicted. That can, however, be before the queue itself has been completely executed and closed.

When a queue is evicted the following may take place:

The list associated with the queue is released to the free list pool and becomes available for use by new get list operations.

The descriptor memory locations holding the queue descriptors referenced by the list are released to the free descriptor memory pool and become available for use by new get list operations.

The cDC sends an evict response message to the original user of the queue.

A layer of multiplexing and de-multiplexing logic (cDC-MDML) 844 provides the necessary cDC to many-adaptor connectivity. The MDML is outside of the cDC block, meaning that the cDC-adaptor interfaces and behaviour are unchanged regardless of the number and nature of the adaptors. The cDC to adaptor API uses a request-response model.

The cDC is comprised of one logical thread which executes all requests in the order they are supplied.

Schedulers are required to manage the traffic in any situation where multiple streams access a shared buffer resource or the buffer resource is subject to backpressure. Schedulers may be composed of various scheduling entity types and may take a significant time to complete a scheduling operation—sometimes tens of clock cycles. To accommodate this, data movement may be scheduled in job units where a job might be 2 kB. This is by way of example and other job sizes may be used in other embodiments. Job response messages may be moderated (i.e. aggregated) before being passed back to schedulers to avoid overloading them.

The host access handler HAH 828 may the flow of doorbells to DMA adaptors, moderating doorbell access.

The HAH may process all target accesses from host(s) both non-DMA and DMA-specific.

Some embodiments comprise a date path unit DPU, as mentioned previously. The DPU is a data path processor/accelerator The DPU may have a programmable logic interface. In one embodiment, the various elements of the DPU are formed from hardware in the NIC 109, and thus are circuitry. In some embodiments the DPU may be implemented by one or two chiplets. In other embodiments, the DPU can be implemented at least partially in or extended into programmable logic The DPU provides a command/event/data interface to fabric and may implement data-path acceleration operations In some embodiments, the DPU is composed of two logical blocks working in tandem to provide the DPU function. In other embodiments, the logical blocks may be combined or even provided by more than two logical blocks.

In the example embodiment, where there are two logical blocks, the first logical block provides the network interface aspects of the DPU and is referred to as the DPU.Net 504 in this document and is schematically shown in FIG. 2, as previously discussed. The DPU.Net block is built on layer 2 (that is the data link layer) functionality. This layer 2 functionality may in some embodiments by provided by the vSwitch 102. In other embodiments, the vSwitch may be at least partially omitted with at least some or all of the functionality provided by the DPU function. The second logical block provides the host/system on chip (SoC) interface aspects of the DPU and is referred to as the DPU.Host 502 in this document and is schematically shown in FIGS. 2 and 6 as previously discussed. The DPU.Host block may be considered to be an instance of a DMA adaptor.

An overview of the DPU subsystems will now be described. The DPU subsystems support moving packets and other data into and out of the device, together with support for a set of data processing offloads. Each subsystem provides a plurality of channels for command, event notifications, and data, supporting fan-out and load spreading across the fabric.

Command messages may instruct the DPU to move data between sources and destinations via a pipeline of offload engines. The command message may specify the data source, destination, path to take through the offload pipelines, and parameters that control the behaviour of the offload engines as data traverses from the source to the destination.

Each DPU subsystem has a large managed memory called the DPU Buffer subsystem (BufSS). The BufSS may be a managed memory with explicit allocate/free/append like functions. A BufSS buffer may be a linked list structure and block allocation/freeing may be internally managed. The buffer subsystem (BufSS) may be similar for the DPU.Host and DPU.Net, but not necessarily identical.

DPU buffers are used to stage data between commands and can be selected as the source for input data or destination for output data. Only a local DPU buffer may be used as a source. A local or remote DPU Buffers may be used to as a destination.

Some embodiments may support the movement of or copying of DPU buffer contents between the DPU.Host and DPU.Net subsystems via a DPU conduit. The DPU conduit may be a data path between the DPU.Host and DPU.Net. In some embodiments, this is provided by the NoC.

User logic within the programmable fabric region of the device uses a DPU by physically interfacing to its command, event, and data channel interfaces and submitting commands (along with associated data) to the DPUs through command and U2D (User to DPU) data interfaces respectively. The commands provide instructions to carry out a subset of fetching, processing, and delivering data.

Processing data refers to moving data through one of the DPU.Host or DPU.Net offload engine pipelines to transform or update it depending on the actions specified in the command. Offload engines receive, may process, generate, and output meta-data which is carried alongside the data. Commands which perform processing will consume offload engine bandwidth. Commands which fetch and deliver data will consume buffer BufSS bandwidth. Commands which deliver data to remote buffers will consume NoC bandwidth.

The DPU subsystems process commands and emit their output to external interfaces (e.g. DMA to host memory or Ethernet transmission over the network), local or remote DPU buffers or local D2U (DPU to User) data channel interfaces. Once commands complete, the DPU subsystems provide completion information to the fabric by writing events to event channels.

User logic may respond to packets received from the network by physically interfacing to receive notification channels to await network receive events. Once a packet receive notification is received some (user specified) frame bytes will have been output on the on the notify channel and the entire frame will be present in the DPU.Net buffers. The allocated buffers ID may be output as part of the receive notification. The user logic may then issue DPU commands as required and may reference the allocated buffer.

User-logic may receive doorbells and other MMIO (memory mapped input/output) accesses via the host access handler (HAH) interface.

The DPU comprises DPU processing engines. The processing engines receive data from the host/SoC, network, fabric, or a buffer within the DPU, process the data, and send it to the host/SoC, network, fabric, or a buffer within the DPU. The fabric is provided by the programmable logic. The processing engines may provide one or more data processing engines.

The DPU has buffers which are combined by a linked list. There may be one set of buffers for the DPU. Host and one set of buffers for the DPU.Net. In other embodiments, the buffers may be a shared resource which can be allocated to the DPU.Host and DPU.Net as required.

Flow transfers into and out of the DPU may be explicitly initiated by fabric logic. The DPU may support a number of different channels at the same time. These channels may be the virtual channels, for example as previously discussed. Many fabric "users" may be active at the same time and supported by the DPU. In some embodiments, many parallel fabric interfaces may be supported so that higher bandwidths (or packet rates) processed by the DPU can fan in/out to the slower fabric.

The DPU may treat network packet receives distinctly from network packet notifications. A network packet notification may be received for every network packet that ingresses the DPU, but may not be considered received until a flow transfer to process it has been submitted to the DPU by the fabric.

Some embodiments may support cut-through semantics. To support this "half paths" of processing may be provided. For example a receive/read half-path may be provided which comprises receiving a notification that data is ready to be received followed by receiving and processing that data. A process-and-send/write path may be provided which comprises of sending data followed by a notification to fabric that the send has completed.

Channels are used to pass messages and data between DPU and user logic (fabric). One or more of the following channel types may be supported:

D2U (DPU to user logic) data channel: passes header and payload data from DPU to user logic;

U2D (user logic to DPU) data channel: passes header and payload data from user logic to DPU;

Command channel: passes command messages from user logic to DPU;

Event channel: passes command completion messages from DPU to user logic; and

Receive notification channel: passes packet arrival notifications from DPU.Net to user logic.

A DPU Command contains (as arguments) one or more of the following:

the event channel on which the completion event will be generated after the command is executed;

optionally a U2D Data channel to source data; and optionally a D2U Data channel for destination data.

The different types of channels may have one or more of the following properties:

Each channel connects user logic with either the DPU.Host or the DPU.Net;

A channel is a stream, for example an AXI stream, carrying messages;

Credit-based flow control may be used, combined with TREADY (target ready) for transient back-pressure; and Each message may be aligned to the start of a bus word.

In some embodiments, a channel connects user logic with either the DPU.Net or the DPU.Host. Commands submitted to a command channel are processed by the DPU subsystem that the channel is connected to. User logic may submit commands that are supported by the attached DPU subsystem. Command completion events can be directed to event channels attached to the DPU subsystem that processes the command.

Figure 12:
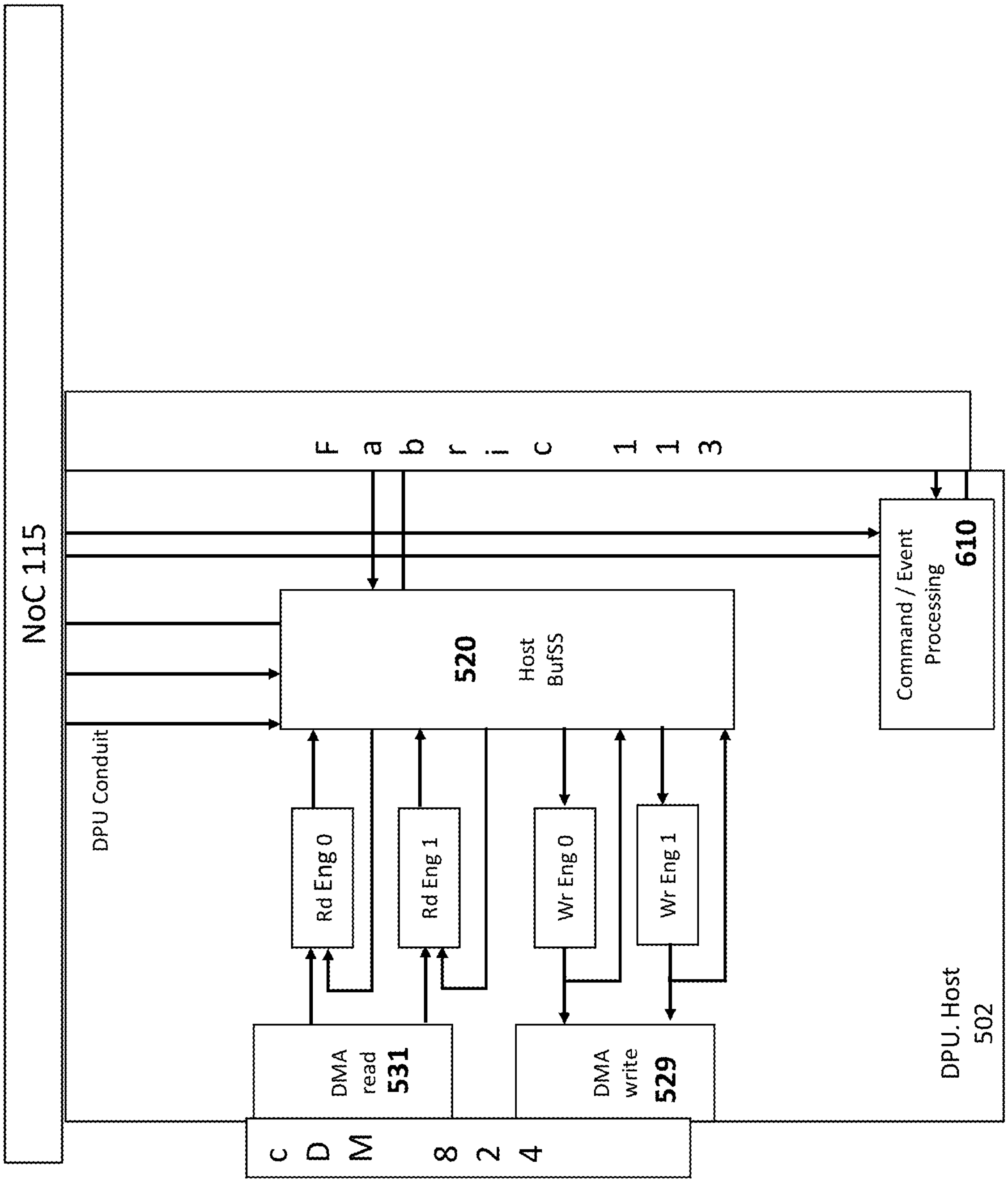
FIG. 12 shows an overview of a host data path unit (DPU.Host) of some embodiments.

Reference is made to FIG. 12 which shows an overview of the DPU.Host. This comprises a DMA write adaptor 529 (which includes a write scheduler) and a DMA read adaptor 531 (which includes a read scheduler) both of which interface with the cDM 824. The DMA write adaptor 529 and the DMA read adaptor 531 may be treated by the cDM circuitry as DMA adaptors, as previously described.

Two read engine pipelines Rd Eng 0 and Rd Eng 1 receive data from the DMA read adaptor 531 and/or a host buffer streaming subsystem (BufSS) 520 and output data to the host buffer streaming subsystem (BufSS) 520. Two write engine pipelines Wr Eng 0 and Wr Eng 1, receive data from the host buffer streaming subsystem (BufSS) 520 and output data to the host buffer streaming subsystem (BufSS) 520 and/or to the DMA write adaptor 529.

In this example, the DPU.Host has four accelerator engine pipelines:

Read engine pipeline Rd Eng 0— contains a read pipeline with accelerators;

Read engine lite pipeline Rd Eng 1— contains a read pipeline with no accelerators;

Write engine pipeline Wr Eng 0— contains a write pipeline with accelerators; and Write engine lite pipeline Wr Eng 1— contains a write pipeline with no accelerators.

However, it should be appreciated that this is by way of example only. There may be more or less than two read engine pipelines. There may be more or less than two write engine pipelines. The functions provided by each pipeline may vary. Different pipelines may provide different accelerators. In some embodiments both read pipelines may have one or more accelerators. In some embodiments both write pipelines may have one or more accelerators.

The host buffer streaming subsystem BufSS 520 can receive and/or output data to the NoC and/or the fabric. In some embodiments, data may be passed between the buffer streaming subsystem BufSS 520 of the DPU.Host and the buffer streaming subsystem BufSS 540 of the DPU.Net (which is described in more detail later). This may be via the DPU conduit which provides a data path via the NoC.

A command/event processing block 610 is provided to receive commands and generate any required events. The command/event processing block 610 can receive commands from the NoC and/or the fabric. Fabric interfaces may be provided by physical input/output 10 pins. The NoC can be used to send messages to the DPU. This may be by using a fabric interface which may be presented as an AXI-S **256*b* bus or any other suitable bus. The NoC itself may comprise switches which are pre-programmed with routing information. The command/event processing block 610 can output events to the fabric and/or the NoC. An event may be provided in response to the completion of an associated command. A command may be received via the fabric, the HAH or the NoC in this example embodiment. However in other embodiments, the commands may alternatively or additionally be received via the application processors 111 (as shown in FIG. 2**). Events may be delivered optionally to a CPU. The DPU data channels may optionally be mapped into a CPU's coherent memory space.

The command/event processing block 610 determines which tasks are next to be processed. The commands determine the tasks to be carried out. There are generally many inputs to the command/event processing block 610 which need to be mapped to a smaller number of offload paths (provided by the read and write engine pipelines). This will be described in more detail later.

Figure 13:
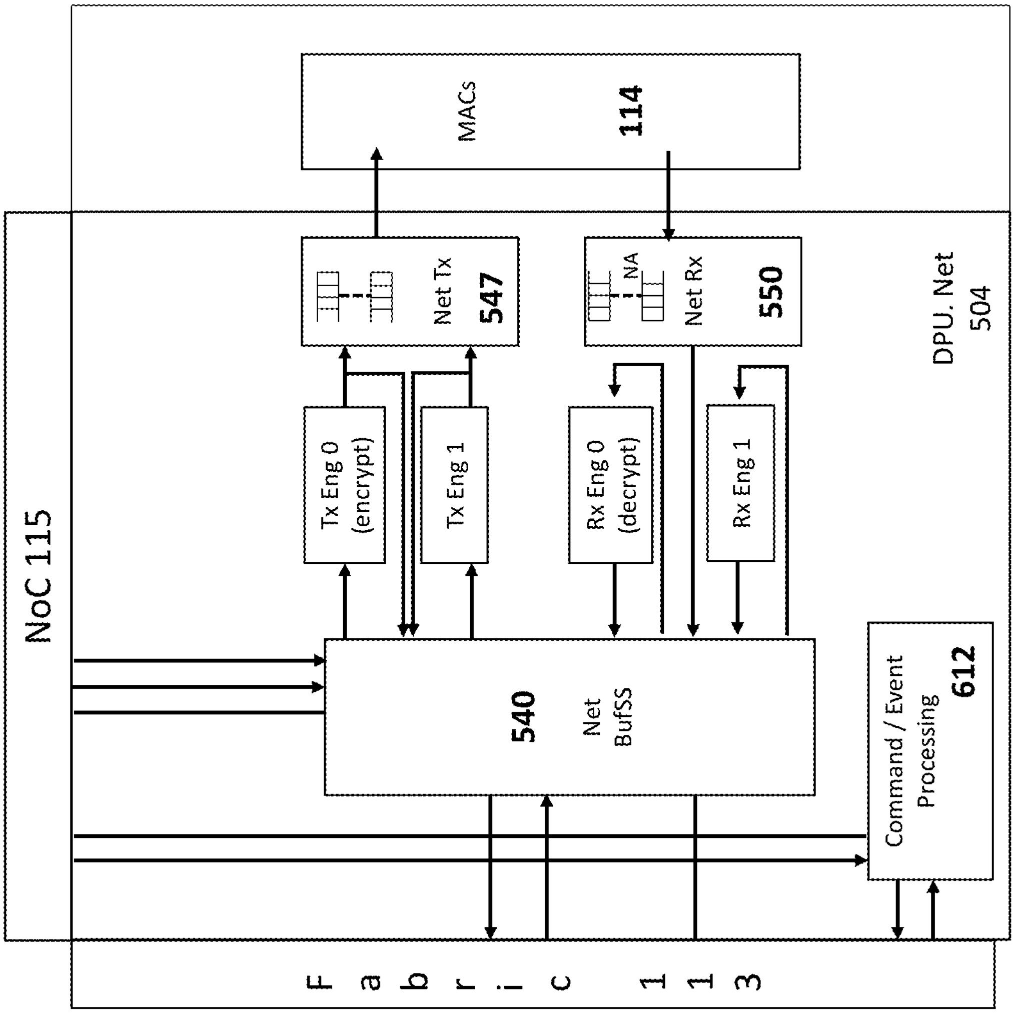
FIG. 13 shows an overview of a network data path unit (DPU.Net) of some embodiments.

Reference is made to FIG. 13 which shows an overview of the DPU.Net 504. In this embodiment, at least some of the vSwitch functionality described previously may be provided by the DPU. Net 504. The DPU.Net 504 comprises a transmit data hub 547 and a receive data hub 550, both of which interface with the MACs 114. Two receive engine pipelines Rx Eng 0 and Rx Eng 1, receive data from the receive data hub 550 and/or the buffer streaming subsystem (BufSS) 540 and output data to the network buffer streaming subsystem (BufSS) 540. The receive data hub may receive the data from the receive data hub directly or, as shown in the FIG. 13, via the network buffer streaming subsystem (BufSS) 540. Two transmit engine pipelines Tx Eng 0 and Tx Eng 1, receive data from the network buffer streaming subsystem (BufSS) 540 and output data to the buffer streaming subsystem (BufSS) 540 and/or to the transmit data hub 547.

The network buffer streaming subsystem (BufSS) 540 can receive and/or output data to the NoC and/or the fabric. In some embodiments, data may be passed between the buffer streaming subsystem (BufSS) 520 of the DPU.Host and the buffer streaming subsystem (BufSS) 540 of the DPU.Net. This may be via the NoC and/or via the fabric. This may via the DPU conduit.

A command/event processing block 612 is provided to receive commands and generate any required events. The command/event processing block 612 can receive commands from the NoC and/or the fabric. The command/event processing block 612 can output events to the fabric and/or the NoC. An event may be provided in response to the completion of an associated command. A command may be received via the fabric or the NoC, in this example embodiment.

The command/event processing block 612 will determine which tasks are next to be processed. The commands determine the tasks to be carried out. There are generally many inputs to the command/event processing block 612 which need to be mapped to a smaller number of offload paths (provided by the receive and transmit engine pipelines). This will be described in more detail later. Events may be delivered optionally to a CPU. The DPU data channels may optionally be mapped into a CPU's coherent memory space. In the case of DPU operation by a CPU, the DPU channels may be accessed from the CPU via the NoC.

The DPU.Host of FIG. 12 is configured to be used in conjunction with the DPU.Net of FIG. 13.

The logical flows of the DPU.Host will now be described with reference to FIGS. 14 and 15.

Figure 14:
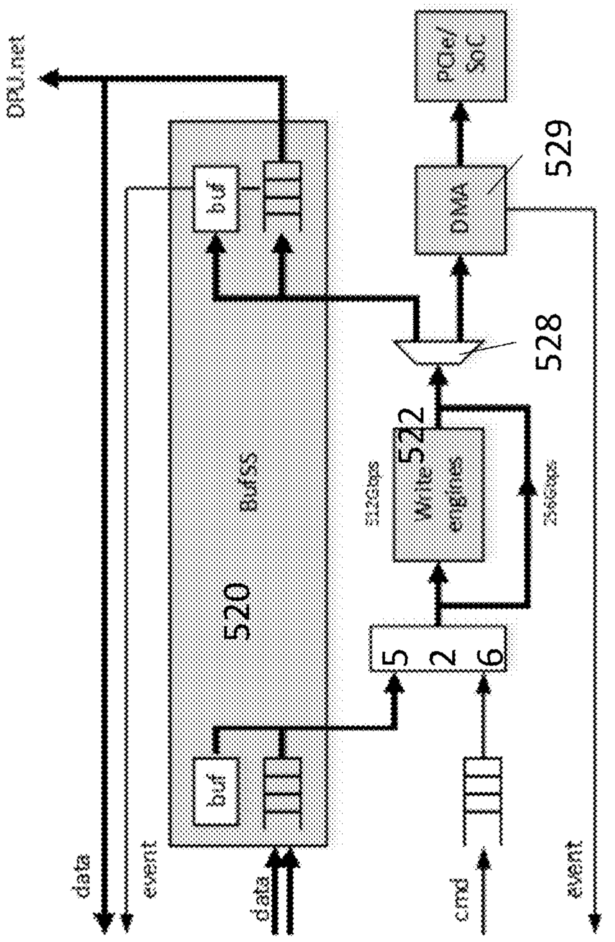
FIG. 14 shows a schematic view of DPU.Host to destination logical flows of some embodiments for a write operation.

FIG. 14 shows a schematic view of DPU.Host to destination logical flows for a write operation. Data is provided to one or more buffers of the buffer streaming subsystem (BufSS) 520. The data is provided to a write engine pipeline 522 via join circuitry 526. The write engine pipeline is a respective one of the write pipelines Wr Eng 0 and Wr Eng 1 of FIG. 12. Join circuitry 526 may be any suitable circuitry. The join circuitry 526 may be omitted in some embodiments. The join circuitry 526 is configured to receive a command, which in this example is a write command. In this example, data from the buffer streaming subsystem (BufSS) 520 is being written to a destination. The destination may be any suitable destination such as a target address, a local buffer of the buffer streaming subsystem (BufSS) 520, a data channel, a virtual channel, a remote buffer associated with the buffer streaming subsystem (BufSS) of the DPU.Net or a destination in the host computing device.

The write engine pipeline 522 performs the required processing in dependence on the received command. The data may pass through the write engine pipeline (and may be processed by the write engine pipeline) or bypass the write engine pipeline. The output of the write engine pipeline or the bypass path is provided as an input to fork circuitry 528 which can direct the data to another buffer of the buffer streaming subsystem (BufSS) 520 or to the DMA write adaptor 529.

The DMA write adaptor 529 may write the data to the host computing device or to the application processors 111 or any other destination which has a memory address mapped via the NoC. In some embodiments, the DMA write adaptor can write the data directly to the destination without the need for the data to be stored in the BufSS or other buffer first. The DMA write adaptor may provide an event to be returned to the source of the write command. The pipeline may thus be able to interface directly with its I/O input subsystem, for example the DMA write adaptor and is able to deliver data directly to the I/O subsystem without using intermediate managed buffers.

Where the buffer of the buffer streaming subsystem (BufSS) 520 receives the data from the fork circuitry 528, the buffer of the buffer streaming subsystem (BufSS) 520 may direct the data to the DPU.Net or other destination. Where the buffer of the buffer streaming subsystem (BufSS) 520 receives the data from the fork circuitry 528, this may cause an event to be returned to the source of the write command by the buffer of the buffer streaming subsystem (BufSS) 520.

The write commands may consume headers from data channels. These headers are prepended, overwrite a subset of, or appended to destination data depending on the command.

There may be a plurality of write engine pipelines. The write engine pipelines may perform different processing. The different write engine pipelines may provide alternative processing paths for the data.

Figure 15:
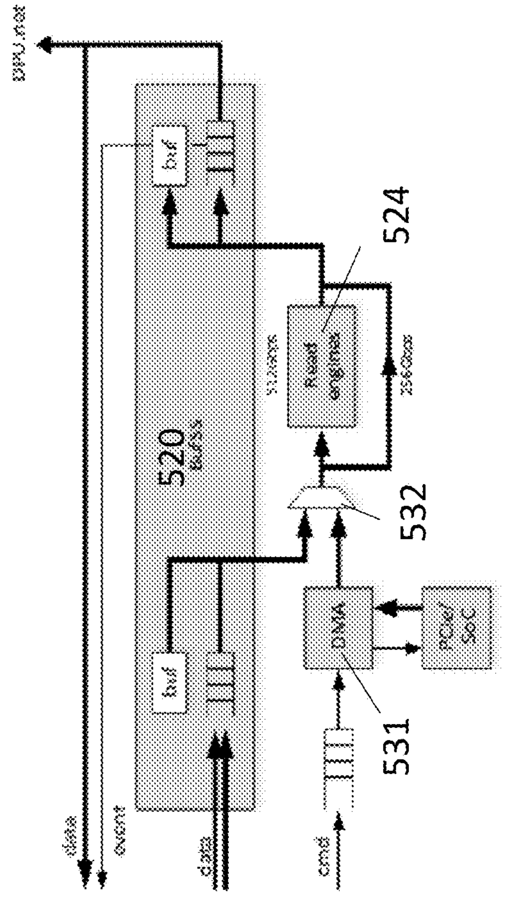
FIG. 15 shows a schematic view of DPU.Host from source logical flows of some embodiments for a read operation.

FIG. 15 shows a schematic view of DPU.Host from source logical flows for a read operation. Data may be provided to one or more buffers of the buffer streaming subsystem (BufSS) 520 or directly provided by the DMA read adaptor without the need for the data to be stored in the BufSS or another buffer first.

Join circuitry 532 is provided which can receive the data from the one or more buffers of the buffer streaming subsystem (BufSS) 520 or from the DMA read adaptor. The join circuitry receives the commands from the DMA read adaptor 531. The data and commands may be output by the join circuitry 532 to the read engine pipeline 524 or may bypass the read engine pipeline. The read engine pipeline is a respective one of the write pipelines Rd Eng 0 and Rd Eng 1 of FIG. 12. The read pipeline is able to interface directly with its I/O subsystem (e.g. DMA read adaptor) and is able to receive data directly from the I/O subsystem without using intermediate managed buffers.

The output of the read engine pipeline or the bypass path data may be provided to another buffer of the buffer streaming subsystem (BufSS) 520. The destination of the read data may be any suitable destination such as a data channel, a virtual channel, a local buffer of the buffer streaming subsystem (BufSS) 520, or a remote buffer associated with DPU.Net of the buffer streaming subsystem (BufSS). The destination may be accessed via the NoC or via the fabric in some embodiments. In some embodiments the destination may be accessed via a direct connection.

The buffer of the buffer streaming subsystem (BufSS) 520 may direct the data to the DPU.Net or other destination. The buffer of the buffer streaming subsystem (BufSS) 520 which receives the data from the join circuitry 532 or read engine pipeline may cause an event to be returned to the source of the read command.

There may be a plurality of read engine pipelines. The read engines may perform different processing. The different read engines may provide alternative processing paths for the data.

The logical flows of the DPU.Net will now be described with reference to FIGS. 16 and 17.

Figure 16:
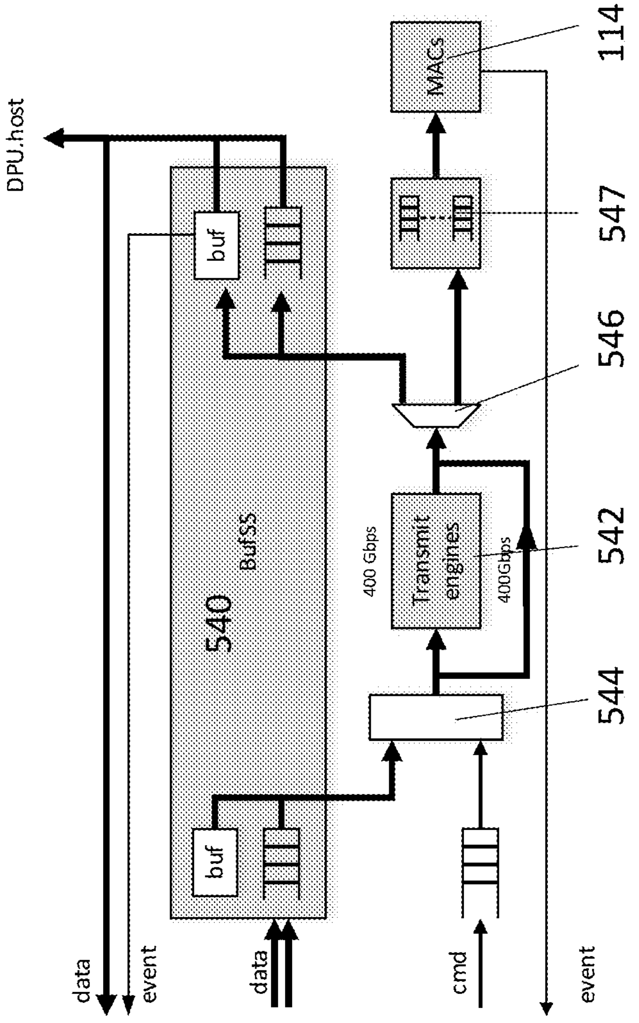
FIG. 16 shows a schematic view of DPU.Net to network logical flows of some embodiments.

FIG. 16 shows a schematic view of DPU.Net to destination logical flows. Data is provided to one or more buffers of the buffer streaming subsystem (BufSS) 540. The data is provided to a transmit engine pipeline 542 via join circuitry 544 or other suitable circuitry. The transmit engine pipeline is a respective one of the transmit engine pipelines Tx Eng 0 and Tx Eng 1 of FIG. 13. The join circuitry 544 may be omitted in some embodiments. The join circuitry 544 is configured to receive a command, which in this example is a transmit command. In this example, data from the buffer streaming subsystem (BufSS) 540 is being transmitted to a destination. The destination may be any suitable destination such as a local buffer of the buffer streaming subsystem (BufSS) 540, a data channel, a virtual channel, a remote buffer of the buffer streaming subsystem (BufSS) of the DPU.Host or the MACs 114. The destination may be accessed via the NoC or via the fabric in some embodiments. In some embodiments the destination may be accessed via a direct connection.

The transmit engine pipeline performs the required processing in dependence on the received command. The data may pass through the transmit pipeline engine (and may be processed by the transmit engine pipeline) or bypass the transmit engine pipeline. The output of the transmit engine pipeline or the bypass path is provided as an input to fork circuitry 546 which can direct the data to another buffer of the buffer streaming subsystem (BufSS) 540 or to the MACs 114 via the transmit data hub 547. The data hub 547 may comprise FIFOs and/or any other suitable circuitry. The data hub interfaces directly with the network MACs.

Where the buffer of the buffer streaming subsystem (BufSS) 540 receives the data from the fork circuitry 546, the buffer may direct the data to the DPU.Host or other destination. The buffer of the buffer streaming subsystem (BufSS) 540 which receives the data from the fork circuitry 546 may cause an event to be returned to the source of the transmit command.

Where the MACs receive the data from fork circuitry 546, the MACs may cause an event to be returned to the source of the transmit command.

The transmit commands may consume headers from data channels. These headers are prepended, overwrite a subset of, or appended to destination data depending on the command.

There may be a plurality of transmit engine pipelines. The transmit engine pipelines may perform different processing. The different transmit engine pipelines may provide alternative processing paths for the data.

Figure 17:
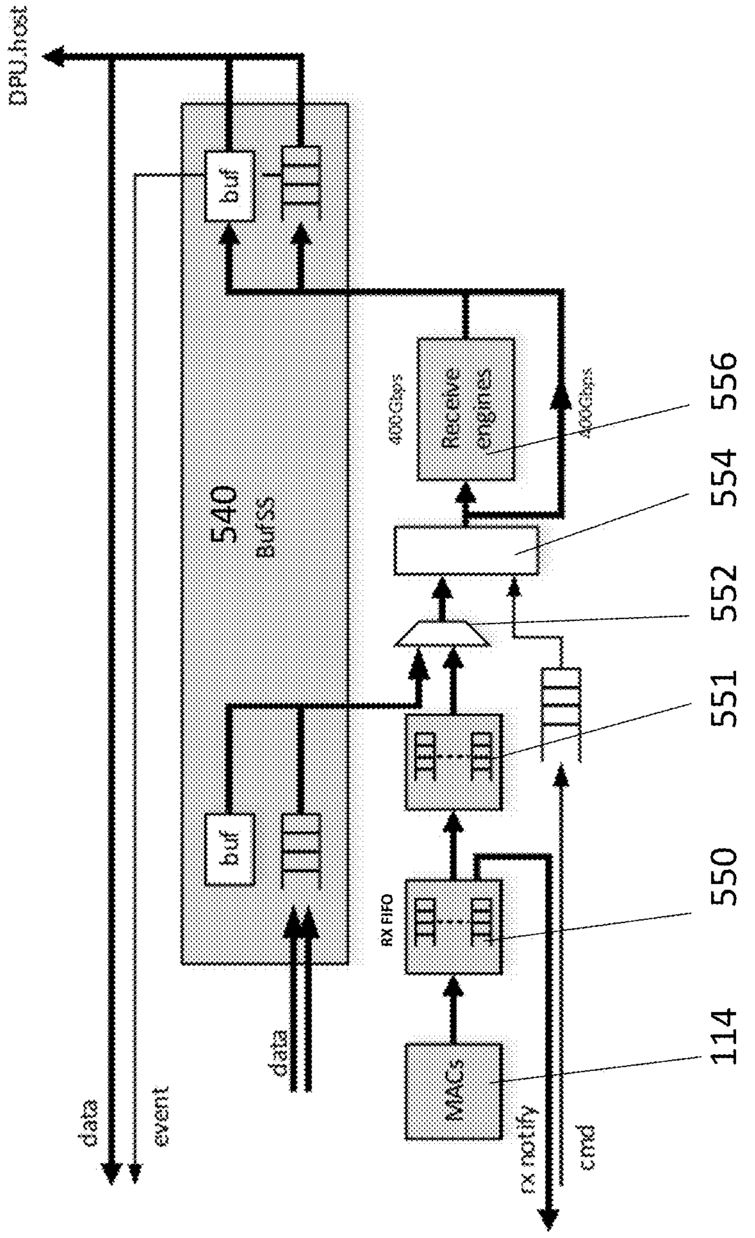
FIG. 17 shows a schematic view of DPU.Net from network logical flows of some embodiments.

FIG. 17 shows a schematic view of DPU.Net from source logical flows. Data may be provided to one or more buffers of the buffer streaming subsystem (BufSS) 540 or may be provided from the MACs 114.

A multiplexer 552 is provided which can receive the data from the one or more buffers of the buffer streaming subsystem (BufSS) 540 or from the MACs 114 via the receive data hub 550 and optionally FIFOs 551. The receive data hub 550 may comprise a plurality of FIFOs.

The data may be output by the multiplexer 552 to join circuitry 554 or other suitable circuitry. The join circuitry 554 may receive commands. Data is output to the join circuitry which may be provided to the receive engine pipeline 556 or may bypass the receive engine pipeline. The receive engine pipeline is a respective one of the receive engine pipelines Rx Eng 0 and Rx Eng 1 of FIG. 13. This output of the receive engine pipeline or the bypass path may be provided to another buffer of the buffer streaming subsystem (BufSS) 540. The destination of the receive data may be any suitable destination such as a data channel, a virtual channel, a local buffer of the buffer streaming subsystem (BufSS) 540, or a remote buffer associated with DPU.Host of the buffer streaming subsystem (BufSS). The destination may be accessed via the NoC or via the fabric in some embodiments. In some embodiments the destination may be accessed via a direct connection.

The buffer of the buffer streaming subsystem (BufSS) 540 may direct the data to the DPU.Host or other destination. The buffer of the buffer streaming subsystem (BufSS) 540 which receives the data may cause an event to be returned to the source of the receive command.

There may be a plurality of receive engine pipelines. The receive engine pipelines may perform different processing. The different receive engine pipelines may provide alternative processing paths for the data.

It should be appreciated that one or more of the arrangements of FIGS. 14 to 17 may comprise a command queue. This command queue may be provided by a FIFO or the like.

Figure 18:
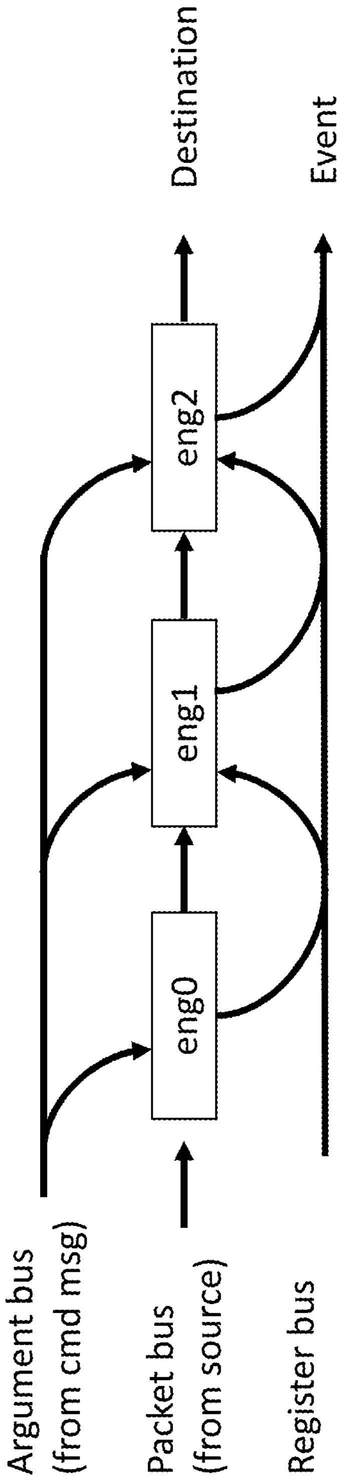
FIG. 18 shows a schematic representation of an offload pipeline of some embodiments.

As discussed the DPU.Net and/or DPU.Host may be provided with one or more pipelines. These pipelines may be regarded as an offload pipeline. Each offload pipeline includes a sequence of offload engines, each of which performs computations on, or transformations of, the data flowing through the offload pipeline. A schematic representation of an offload engine pipeline is shown in FIG. 18. In this example, the offload engine pipeline is provided by three engines, eng0, eng1 and eng2. This is by way example only and different pipelines may have more or less than three engines.

These offload engines are connected by a set of buses:

Packet bus: this carries packet/message payload into and out of the offload engines;

Argument bus: provides arguments from the command message to each engine; and

Offload pipe register bus (OPR): Carries metadata outputs from offload engines to other offload engines, and to the command completion event.

An offload engine may transiently back pressure the packet bus. The argument and register buses are fully pipelined.

The offload pipe register bus has two parts: One part maps to event_engine_data field (with the output from an offload engine) in command completion events, and the second part is a scratch area. Offload engine output metadata may be placed in either part as specified in the engine arguments, allowing the command to control which output metadata fields are passed into the completion event. The completion events are described in more detail later.

One or more of the offload engines operate in cut-through mode, and so for these engines results generated either overwrite the input payload data (on the packet bus) at the same offset, or are written or appended at a later offset in the payload data. An SF_EDIT (store and forward) engine further along the pipeline is used to forward results to an earlier position when that is needed.

One or more offload engine may support incremental processing. After processing a message, the internal state of the computation can optionally be saved to a context store. A saved context can subsequently be loaded prior to processing another message. Context state is designed to be local to each engine with internal forwarding implemented if necessary to ensure that context is available for back to back commands.

Figure 19:
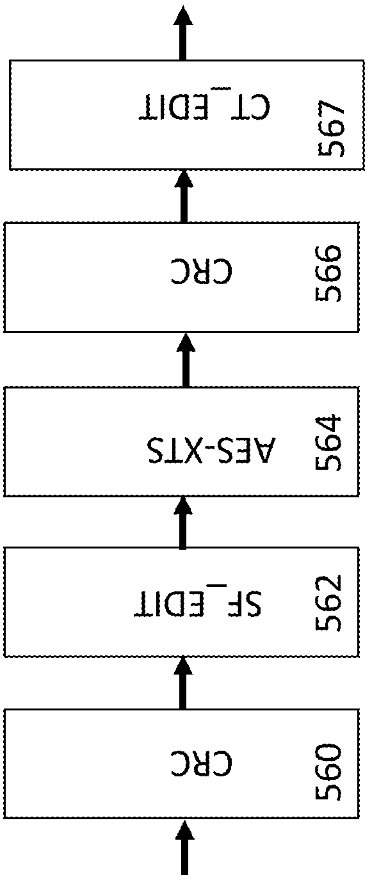
FIG. 19 shows schematically shows an example of a DPU.Host offload engine pipeline of some embodiments.

Reference is made to FIG. 19 which schematically shows one example of a DPU.Host offload engine pipeline. This same pipeline structure is used both for the read offload engine pipeline and the write offload engine pipeline. The host pipeline may have a direct path to/from DMA. In this example, the pipeline has a first CRC engine 560, followed by a SF (store forward) edit engine 564 followed by a cryption engine 564, a second CRC engine 566 and a CT edit engine 567. The SF edit engine may perform operations requiring packet buffering (store-forward). The cryption engine may provide an encryption and/or decryption function. The cryption function may be any suitable cryption function such as an AES-XTS cryption function or the like.

Figure 20:
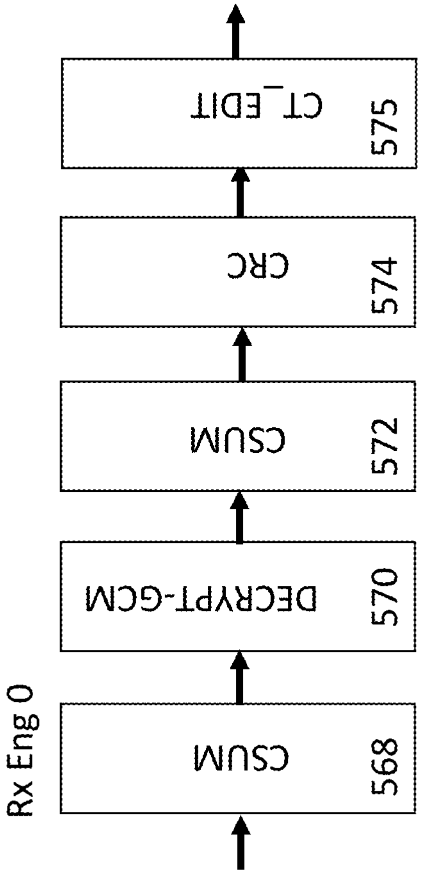
FIG. 20 schematically shows an example of a receive offload engine pipeline with accelerators of some embodiments.
Figure 21:
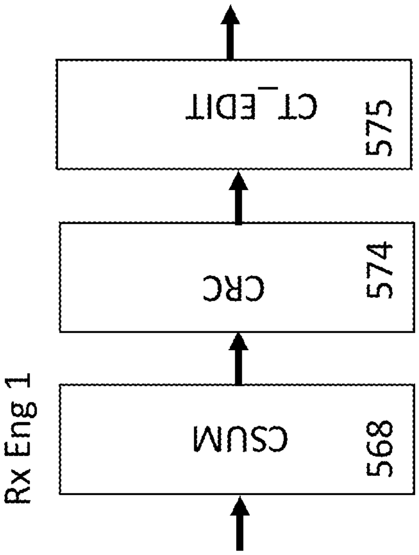
FIG. 21 schematically shows an example of another receive offload engine pipeline of some embodiments.

Reference is made to FIGS. 20 and 21 which schematically show examples of DPU.Net receive offload engine pipelines. The net pipelines may have a direct path from the networking layer (MACs).

FIG. 20 shows the first receive offload engine pipeline (RX Eng 0) with accelerators. This comprises a first checksum engine 568 followed by an encryption engine 570 followed by second checksum engine 572 followed by a CRC engine 574 followed by a CT edit engine 575. The cryption engine may support AES-GCM.

FIG. 21 shows the second receive offload engine pipeline (RX Eng 1). This receive pipeline contains no accelerators. This comprises a first checksum engine 568 followed by CRC engine 574 followed by a CT edit engine 575.

Figure 22:
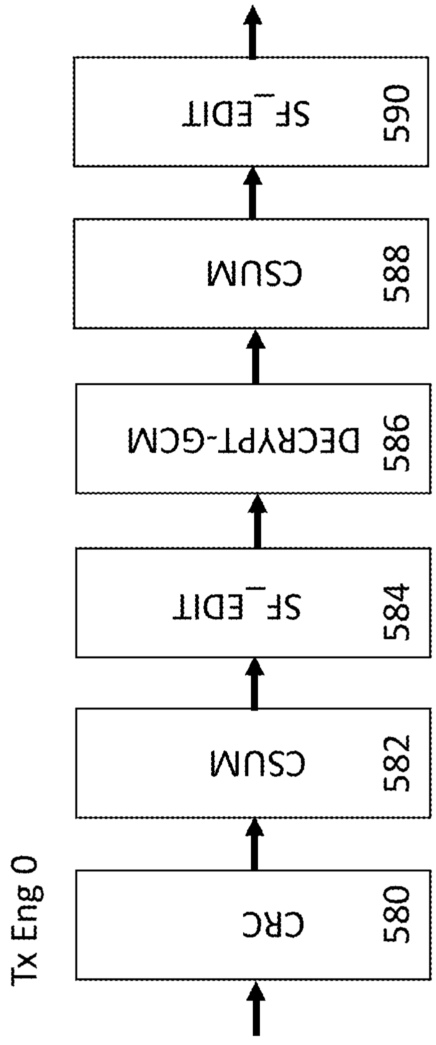
FIG. 22 schematically shows an example of a transmit offload engine pipeline with accelerators of some embodiments.
Figure 23:
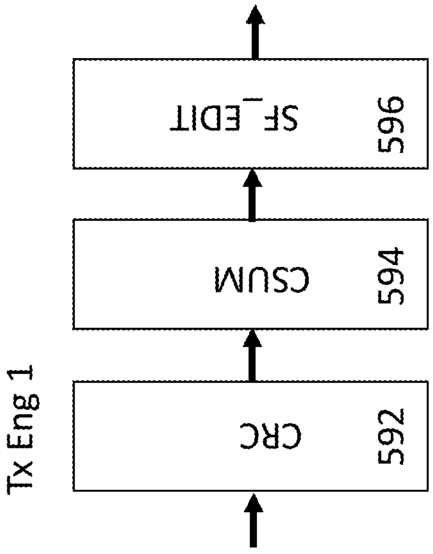
FIG. 23 schematically shows an example of another transmit offload engine pipeline of some embodiments.

Reference is made to FIGS. 22 and 23 which schematically show DPU.Net transmit followed by a CT edit engine 575 pipelines. These net pipelines have a direct path to the networking layer (MACs).

FIG. 22 shows the first transmit pipeline (TX Eng 0) with accelerators. This comprises a CRC engine 580 followed by a first checksum engine 582 followed by a first SF edit engine 584 followed by an encryption engine 586 followed by second checksum engine 588 followed by a second SF edit engine 590. The cryption engine may support AES-GCM.

FIG. 23 shows the second transmit pipeline (TX Eng 1). This transmit pipeline contains no accelerators. This comprises a CRC engine 592 followed by a first checksum engine 594 followed by a SF edit engine 596.

It should be appreciated that the various functions or engines shown in FIGS. 19 to 23 are by way of example only. One or more alternative or additional functions or engines may be provided in any of the shown pipelines. Any one or more of the shown functions or engines may be omitted from any of the shown pipelines.

The engines will now be described in more detail.

The CSUM offload engine is used to validate or generate TCP/UDP (user datagram protocol) style Internet checksums. It computes a 1s-complement checksum over a specified region of the capsule payload, seeded with an initial value from the command message. In addition data from the offload register pipe can be included in the checksum. The result is either a 16b checksum (compute operations), or 1b good/bad status (validate). The result is written to the offload pipe register bus. Operations supported are therefore compute and validate.

The CRC offload engine computes a CRC over a specified region of the payload data. The resulting CRC is written to the register bus. The CRC is subsequently delivered to fabric in the command completion event, and can be written into the capsule payload or compared with a value in the payload by a downstream EDIT engine.

The CRC offload engine may or may not support incremental processing. For example the DPU.Net CRC engines support contexts for incremental processing. The DPU.Host may not require the CRC offload engine to support incremental processing. In other embodiments, the DPU.Host mays use a CRC offload engine which supports incremental processing. In this case, the DPU.Net may use a CRC offload engine which may or may not support incremental processing. In some embodiments, none of the CRC offload engines support incremental processing.

The two AES-XTS offload engines in DPU.Host both support AES encryption and decryption with the XTS algorithm. A region within the capsule payload is encrypted or decrypted. The region may contain a whole logical block, or a subset of a logical block. Data before or after the region is passed through unmodified. The length of the region may be a multiple of 16B. The two AES-XTS offload engines may support incremental processing where a block offset is provided as an argument to each command and the incremental context calculated in a pipelined manner.

Each AES-XTS offload engine has a tightly-coupled memory storing keys (also known as the key store). Each entry holds a pair of AES keys. Each operation takes its keys from the command message, or from the key store. If the keys are provided in the command they can be saved to the key store for use by later commands.

The SF_EDIT and CT (cut through)_EDIT offload engines are used to copy data and compare values. The source data can be taken from the packet bus, register bus (output of an earlier offload engine) or the argument bus (from the command message). The source data can be copied to the packet bus (overwriting the packet/message at a given offset), or copied to the register bus. For the compare operation the source data is compared with the destination location, and the result of the comparison is written to the register bus.

CT_EDIT operates in cut-through mode, and as such the destination of the copy operation is constrained to being after the source offset.

SF_EDIT has a store-and-forward buffer and can forward results generated by an earlier offload engine.

Each edit block can perform two edit operations per DPU command in some embodiments. The operand size is 1 B, 2B, 4B, 8B or 16B in some embodiments. Other embodiments may use different operand sizes.

A CRC result calculated for a given packet will be output as meta-data and may be included in the checksum CSUM calculation for the same packet. Both the CRC and CSUM results may be edited into the packet by the SF_EDIT engine.

One or more of the following copy options may be supported by the SF_EDIT and CT (cut through)_EDIT offload engines:

Payload to payload;

Payload to register bus (downstream engine and/or event);

Register bus (upstream engine) to payload; and

Argument to payload.

One or more of the following compare options may be supported by the SF_EDIT and CT (cut through)_EDIT offload engines:

Argument with payload; and

Register bus (upstream engine) with payload.

The result of the comparison is written to the register bus.

The AES-GCM Encrypt and Decrypt offload engines will now be described. The DPU.Net crypto offload engines may support the GCM (Galois/Counter mode) algorithm. The transmit path instance of the cryption offload engine may support encryption and authentication. The receive path instance of the cryption offload engine may support decryption and authentication. A region within a packet is encrypted, decrypted, or authenticated, and an integrity check value (ICV) or AES-GCM GHASH hash value is generated.

The AES-GCM engines may support three operation modes for encryption, decryption, and authentication:

1. Normal Mode: A complete packet is submitted to the engine and a processed packet, along with its ICV is generated and emitted to the fabric.

2. Incremental Mode: Packet fragments are submitted to the engine, processed, and emitted to the fabric. Internal context memory stores and updates intermediate packet state required to continue the operation across fragments. When all the fragments of the packets have been processed the ICV is generated and emitted to the fabric.

3. Fragment Mode: Fragments are submitted to the engine, processed, and emitted to the fabric along with the GHASH computed over the fragment. Fabric logic is responsible for calculating the final ICV.

Bulk crypto AES-GCM may be available via modes 1, 2 and 3. IPSEC may only be available via modes 1 and 2.

Figure 24:
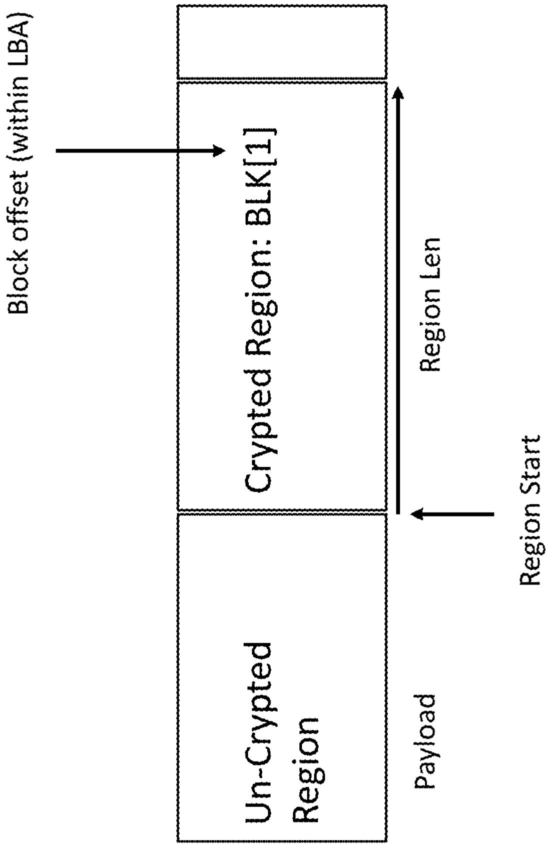
FIG. 24 schematically illustrates bulk data encryption/decryption and authenticate operations with respect to a payload.

Bulk data encryption/decryption and authenticate operations will now be described with reference to FIG. 24. The offload engine processes the subset of the capsule payload identified by “region start” and “region len”. Region start indicates the start of payload to be processed and region len indicates the length of the payload region from the identified start of the region. This crypted region is divided into two parts.

The first part, of length AUTH_DATA_LEN, is authenticated only. The second part is both authenticated and encrypted.

The capsule payload that is not part of the encrypted sub-region is passed through without modification. This is indicated in FIG. 24 as the un-crypted region of the payload.

The integrity check value is written to the register bus. It can subsequently be written into the packet, or compared with an ICV stored in the packet. In the latter case this may be by using a downstream edit offload engine.

Bulk data authentication only operations will now be described. The offload engine computes an integrity check value over the subset of the capsule payload identified by “region start” and “region len”. The ICV is written to the register bus.

Incremental and Fragmented GCM (Storage) operations will now be described.

To correctly process these regions, the following invariants must be maintained over “region start” and “region len” fields submitted to the engine for incremental and fragmented GCM operation. All fragments are processed in-order. The AAD (additional authenticated data) for the packet is provided, in entirety, in the first fragment. The crypto region length in all fragments is a multiple of, for example, 16B in all cases except for the final region. All subsequent operations include the length of the AAD present in the first fragment and the cumulative length of all regions processed in previous fragments.

For IPSEC decryption the following additional constraints may apply:

For authentication-only:

if the packet SA (security association) uses ESN (extended sequence number), the first fragment’s crypto region is 12+16*n bytes long (where n is >=0).

if the packet SA uses SN (sequence number), the first fragment's crypto region is at least 32 bytes long and the last fragment is at least 34 bytes long.

For encryption and authentication the first fragment's crypto region may be at least 32 bytes long and the last fragment may be at least 34 bytes long.

The performance of the AES-GCM engine matches that of the offload pipeline.

Each streaming processor pipeline logically is not shared so that a pipeline scheduler does not need to manage this. Multiple instances of common pipeline functions are provided for simpler blocks (for example CRC) or a single shared subsystem is provided for more complex blocks (for example crypto functions) which can provide fixed bandwidth partitioning so appears like N logically separate units).

Offload engines (OEs) are controlled via a command structure per engine provided as part of a submitted DPU command. Depending on the command arguments, OEs can output information to be consumed by downstream CT_EDIT or SF_EDIT OEs or to be emitted in the command event notification. OEs pass information between themselves via the OPR bus. In some embodiment, some of the bits of the information are emitted, verbatim, in the command's event notification.

OEs read from or write to the OPR in, for example, 4-byte offsets.

OEs may be provided instructions on a per-command basis. A command that wants to include OE transforms may include one or more of the following command elements:

1. A dpu_cmd_hdr_cmn structure that provides basic command information

2. A dpu_oe_cmd_hdr structure; this header is composed of a union of pipeline-specific OE command header structures. The specific structure for the pipeline being used may be initialized and provided as part of the command.

3. OE command structures (dpu_*_eng_args)—Depending on the value of dpu_oe_cmd_hdr, between 0 and N (where N is the maximum number of OEs in the pipeline) command structures will follow to provide the OEs commands. Every OE command structure may be followed by OE specific command data (dpu_*_eng_cmd_data) depending on the intent of the command.

An offload engine (OE) command set may begin with an OE pipeline command header(dpu_oe_cmd_hdr), the fields of which are interpreted on a per-pipeline basis. Every pipeline defines a distinct structure containing a field for every OE in the pipeline. The value of the field indicates whether a command is present for that particular OE in the submitted command, and, if so, if it contains command data. If the value of a field is zero, a command for the OE structure is not present in the pipeline. An edit OE may be provided with two bits if they carry out up to two edit operations.

Distinct structures may be provided for the DPU.Host read and write pipelines and the DPU.Net TX0, TX1, RX0 and RX1 pipelines.

Where command structures include command data (cmd data) as part of the command (e.g. initial CRCs or encryption keys), this may be provided after the engine structure values. For example, if the AES-GCM command structure has command-contained key data, it will follow the CSUM OE command structure.

The command header is followed by a set of command structures, one structure per OE except for the EDIT OEs which can have up to two structures per engine.

Figure 25:
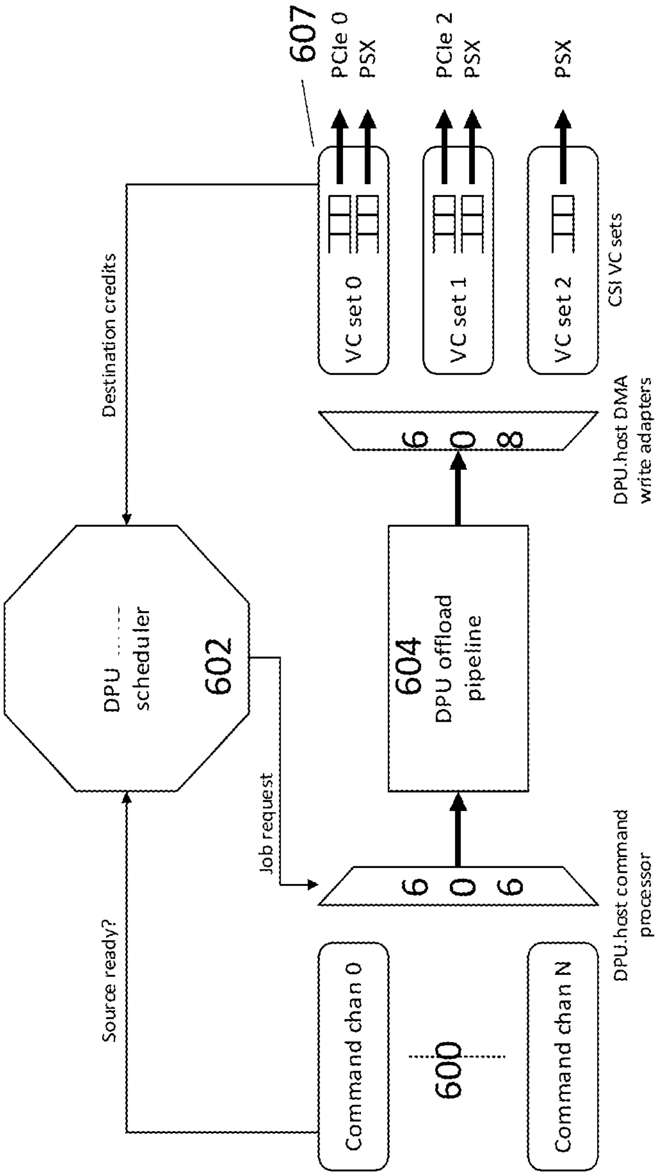
FIG. 25 schematically shows DPU.Host DMA (direct memory access) scheduling of some embodiments.

FIG. 25 schematically shows DPU.Host DMA scheduling. The DPU.Host submits commands to the cDM data mover. To avoid head-of-line blocking, the DPU.Host may only submit requests when it is known that the cDM has buffering available to store the requests. For example, the DPU.Host may reserve buffer space. If the cDM does not have sufficient buffering available then it will back-pressure the initiator, which may block other requests that could potentially have gone ahead.

In the example, the sources are command channels 600. A source is ready when it has at least one command message and the input data for that command is ready. Destinations may be cSI VCs 607, and each command channel is associated (by way of configuration) with a DMA write VC set.

Write scheduling will now be described. For a write, DMA write descriptors reference VCs that are members of the command channel's DMA write VC set. Thus each source is configured with a mapping to a subset of destinations which is the set of destinations that packets from the source can be delivered into. Packets are forwarded into an offload path when the command channel's VC-set has space for a batch of write requests.

The destinations send flow control credits to a DPU scheduler, giving the scheduler visibility of space available for packets. The scheduler may be provided in the command/event processing block 610 of FIG. 12. The scheduler also has visibility of which sources are ready to supply packets. The source is eligible to be scheduled if it is ready, and its destination set has space to accept a batch of packets. The scheduler selects a source from amongst those that are eligible, and sends a job request message to the multiplexer 606 that multiplexes between the sources. The multiplexer 606 forwards a batch of packets from the selected source to the DPU offload pipeline 604. This may be a write engine pipeline such as previously described. The output of the DPU offload pipeline is provided to a second multiplexer 608 which directs the output to the required VC 607.

Read scheduling will now be described. For a read, the sources are command channels. A command channel can be scheduled when it has at least one DMA read descriptor. The destinations are cSI VCs, and each command channel is associated (by way of configuration) with a DMA-read-VC-set. DMA read descriptors reference VCs that are members of the command channel's DMA-read-VC-set. In this case the DPU offload pipeline may be a read engine pipeline such as discussed previously.

Each command channel can be associated with a distinct VC set, or multiple channels can share a VC set.

In some embodiments, the internal buses within the DPU (e.g. to/from BufSS) are segmented. For example, the segmented buses may be 4×128b or 8×128b in some embodiments. The packet end and start may be segment aligned.

Figure 26:
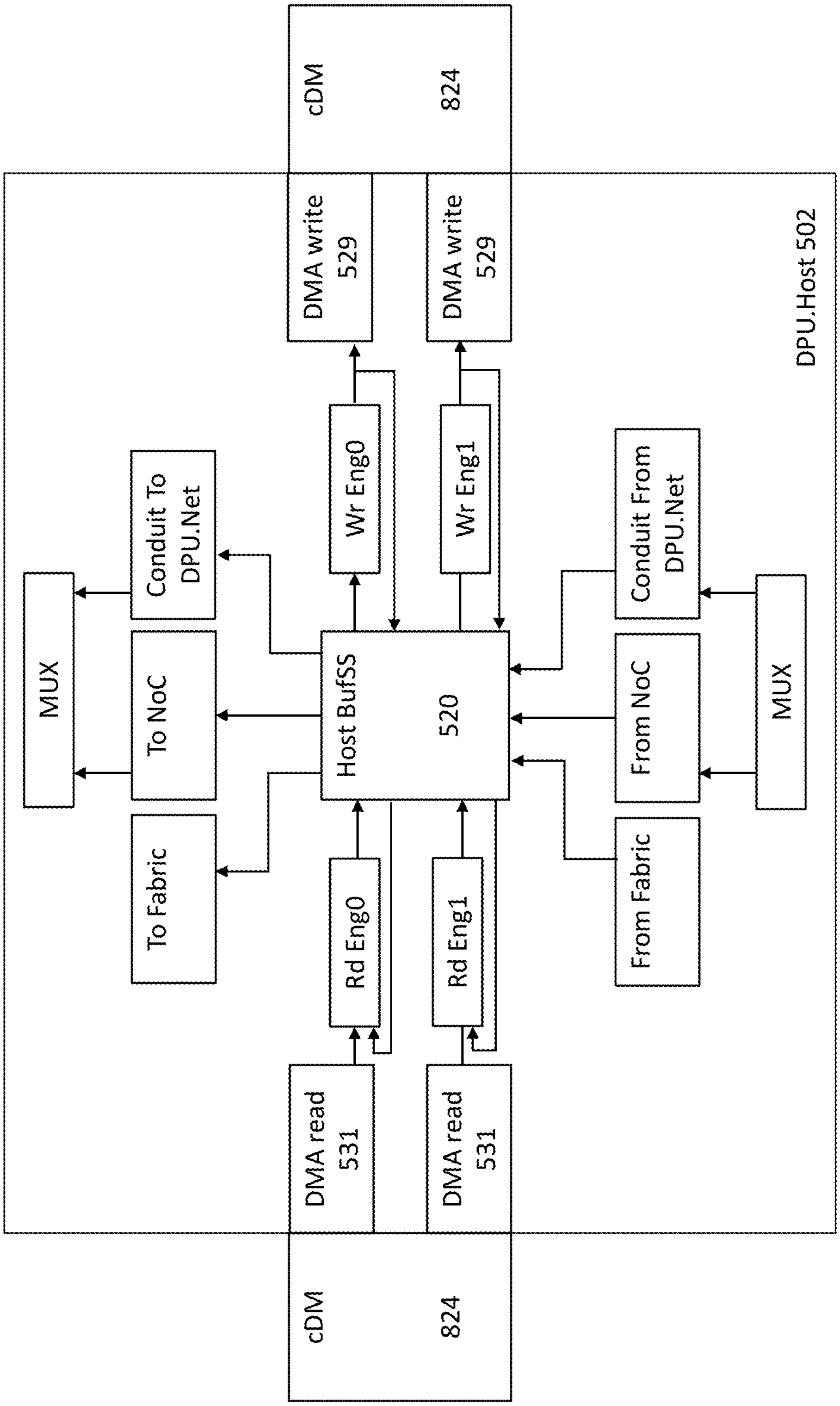
FIG. 26 schematically shows the data paths for the DPU.Host of some embodiments.

Reference is made to FIG. 26 which schematically shows for the DPU.Host, the data paths.

There is a data path from the cDM 824 to first and second DMA read adaptor 531 instances. There is a data path from the first DMA read adaptor 531 instance to the read engine pipeline Rd Eng0. There is a data path from the read engine pipeline Rd Eng0 to the buffer subsystem BufSS 520. There is a data path from the buffer subsystem BufSS 520 to the read engine pipeline Rd Eng0. There is a data path from the second DMA read adaptor 531 instance to the read engine pipeline Rd Eng1. There is a data path from the read engine pipeline Rd Eng1 to the buffer subsystem BufSS 520. There is a data path from the buffer subsystem BufSS 520 to read engine pipeline Rd Eng1.

There is a data path from the buffer subsystem BufSS 520 to write engine pipeline Wr Eng0. There is a data path from write engine pipeline Wr Eng0 to a first DMA write adaptor 521 instance. There is a data path from write engine pipeline Wr Eng0 to the buffer subsystem BufSS 520. There is a data path from the first DMA write adaptor 521 instance to the cDM 824. There is a data path from the buffer subsystem BufSS 520 to write engine pipeline Wr Eng1. There is a data path from write engine pipeline Wr Eng1 to a second DMA write adaptor 521 instance. There is a data path from write engine pipeline Wr Eng1 to the buffer subsystem BufSS 520. There is a data path from the second DMA write adaptor 521 instance to the cDM 824.

There is a data path from the fabric to the buffer subsystem BufSS 520. There is a data path from the NoC to the buffer subsystem BufSS 520. There is a data path from the DPU conduit to the buffer subsystem BufSS 520. As the DPU conduit is also provided via the NoC, a multiplexer MUX is provided. The multiplexer MUX receives data from the NoC and separates the DPU conduit data from the other NoC data and provides that data via separate data paths.

There is a data path to the fabric from the buffer subsystem BufSS 520. There is a data path to the NoC to the buffer subsystem BufSS 520. There is a data path to the DPU conduit from the buffer subsystem BufSS 520. A multiplexer MUX multiplexes the DPU conduit data and the other data for the NoC onto the NoC.

Figure 27:
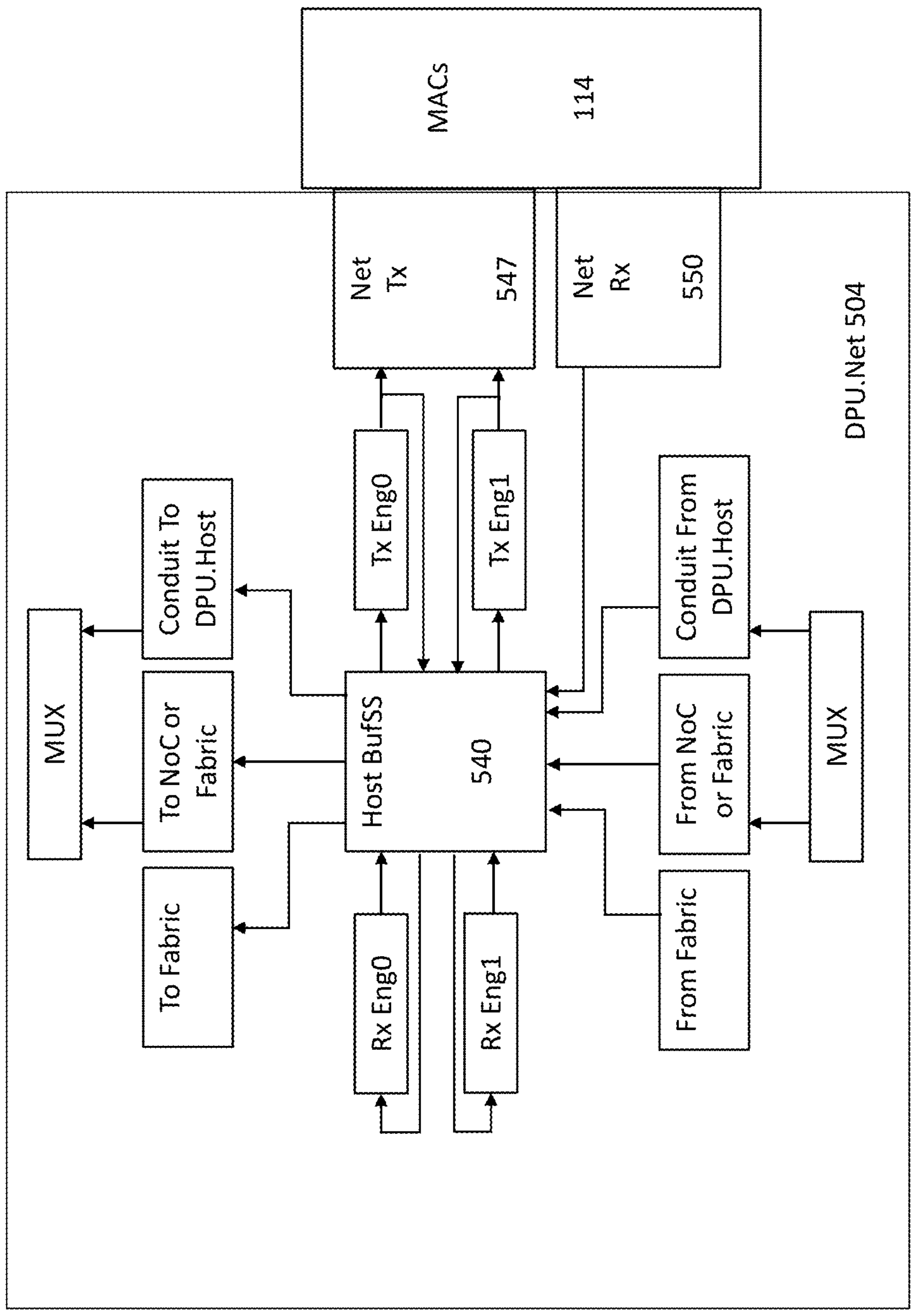
FIG. 27 schematically shows the data paths for the DPU.Net of some embodiments.

Reference is made to FIG. 27 which schematically shows for the DPU.Net the data paths.

There is a data path from the MACs 114 to the receive data hub 550. There is a data path from the receive data hub 550 to buffer subsystem BufSS 540. There is a data path from the buffer subsystem BufSS 540 to the receive engine pipeline Rx Eng0. There is a data path from the receive engine pipeline Rx Eng0 to the buffer subsystem BufSS 540. There is a data path from the buffer subsystem BufSS 540 to the receive engine pipeline Rx Eng1. There is a data path from the receive engine pipeline Rx Eng1 to the buffer subsystem BufSS 540.

There is a data path from the buffer subsystem BufSS 540 to the transmit engine pipeline Tx Eng0. There is a data path from the transmit engine pipeline Tx Eng0 to the buffer subsystem BufSS 540. There is a data path from the transmit engine pipeline Tx Eng0 to the transmit data hub 547. There is a data path from the buffer subsystem BufSS 540 to the transmit engine pipeline Tx Eng1. There is a data path from the transmit engine pipeline Tx Eng1 to the buffer subsystem BufSS 540. There is a data path from the transmit engine pipeline Tx Eng1 to the transmit data hub 547. There is a data path from the transmit data hub 547 to the MACs 114.

There is a data path from the fabric to the buffer subsystem BufSS 540. There is a data path from the NoC to the buffer subsystem BufSS 540. There is a data path from the DPU conduit to the buffer subsystem BufSS 540. As the DPU conduit is also provided via the NoC, a multiplexer MUX is provided. The MUX receives data from the NoC and separates the DPU conduit data from the other NoC data and provides that data via separate data paths.

There is a data path to the fabric from the buffer subsystem BufSS 540. There is a data path to the NoC from the buffer subsystem BufSS 540. There is a data path from the DPU conduit to the buffer subsystem BufSS 540. A multiplexer MUX multiplexes the DPU conduit data and the other data for the NoC onto the NoC.

DPU Channels (Command, Event, or Data) may not be carried within the DPU conduit and are carried over separate buses within the DPU. DPU channels and the conduit are multiplexed onto the NoC. The NoC may provide a plurality of lanes. By way of example only, there may be 4 lanes. The DPU conduit may be run time configured to run over a specific number of the lanes to allow a static bandwidth partitioning to be achieved.

Figure 30:
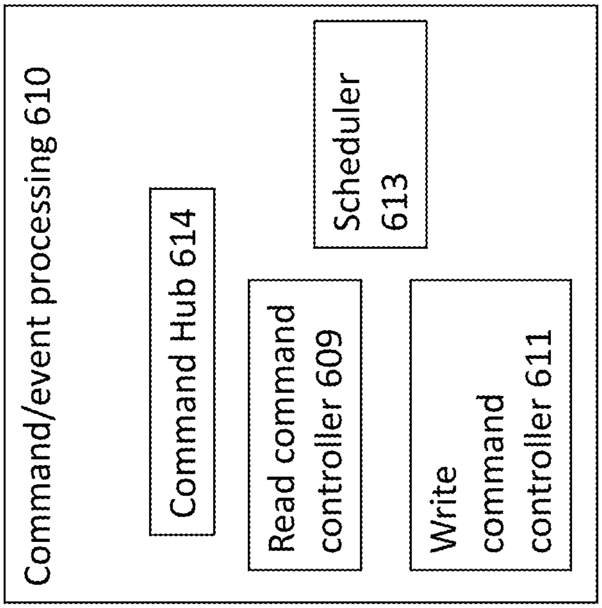
FIG. 30 schematically shows a command/event processing block provided in the DPU.Host and DPU.Net, in some embodiments.

Reference is made to FIG. 30 which schematically shows the functionality of the command and event processing block 610 of the DPU.Host or the command and event processing block 612 of the DPU.Net. The event processing block has a scheduler 613 which controls a write command controller 611 and a read command controller.

The DPU buffers provided in the DPU.Host and DPU.Net buffer subsystems are used to stage packets and data between operations. The DPU buffers can be used as the payload source or destination for various commands, as shown in FIGS. 26 and 27. The DPU.Host and DPU.Net subsystems may each have a separate buffer BufSS instance. Commands can source data from the local DPU buffer BufSS instance. Commands can deliver data into the local or remote DPU buffer BufSS instance. A buffer command can copy data from a DPU.Host buffer to a DPU.Net buffer, or vice versa.

Figure 28:
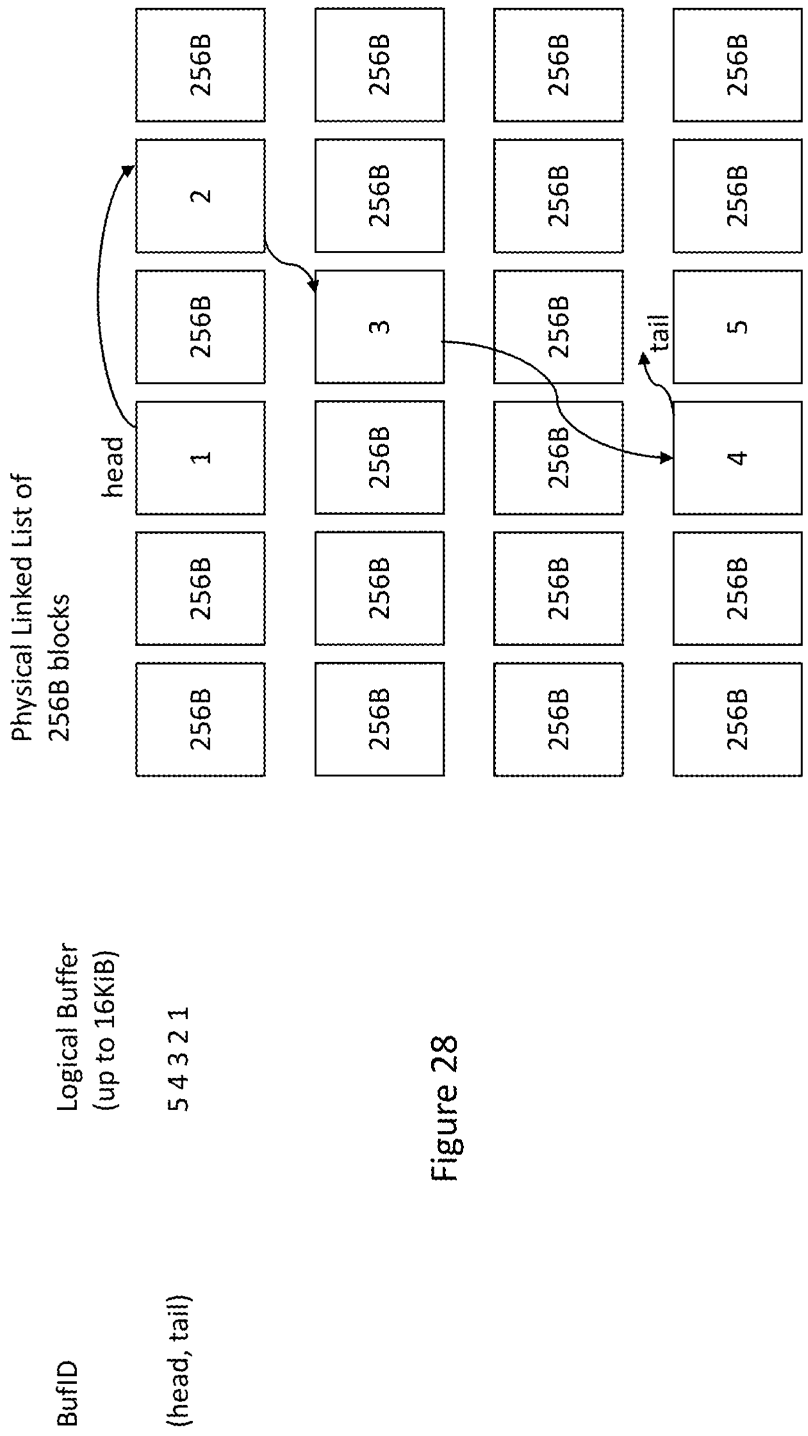
FIG. 28 schematically shows part of a buffer used in the DPU.Net or the DPU.Host in some embodiments.

As illustrated in FIG. 28 each buffer instance is structured as an array of memory blocks. The memory blocks may be 256B blocks in some embodiments. A DPU Buffer is a linked list of blocks identified by a DPU buffer ID. A DPU Buffer ID includes a head pointer and a tail pointer. There may be a maximum buffer size. In some embodiments, this may be 16 KiB. In the example shown in FIG. 28, the logical buffer comprises 5 blocks, numbered 1 to 5 with the head being numbered 1 and the tail being numbered 5. The physical buffer shows that the blocks making up the logical buffer are distributed throughout the buffer and are not necessarily contiguous.

As can be seen from FIG. 26 and FIG. 27, data is received at the BufSS. Logically this may be from a channel, an offload engine pipeline, the network ingress (for DPU.Net), or the DPU conduit.

The DPU buffer operations supported may comprise one or more of:

stream in and allocate;
stream in and append;
stream in and overwrite;
stream out;
free; and
allocate.

With stream in and allocate, blocks are allocated, the inbound data is stored in the allocated buffer. A DPU buffer ID is returned. If insufficient blocks are available, the data is dropped and an error is returned.

With stream in and append-given the tail pointer and a byte offset within the tail block, append data to an existing buffer. If the byte offset is zero, the existing tail buffer is not modified and the data is written starting at a new block. A new tail pointer is returned. The head pointer remains the same. If insufficient blocks are available, the data is dropped and an error is returned. If a new tail block is allocated, any old data in it is completely overwritten.

With stream in and overwrite-given a DPU buffer ID (head pointer) and byte offset, overwrite the buffer with the inbound data, and extend the buffer (if necessary) to accommodate any data written beyond the end of the original tail block. If a new tail block is allocated, any old data in it is completely overwritten. While it is possible to overwrite at any offset, hardware follows the linked list pointers to the block at which overwriting commences. If the offset is large then linked list resource is consumed, skipping to the first block.

With stream out, data is streamed out from the indicated buffer, given the head pointer and byte offset. Optionally the buffer's blocks are freed. A run time configuration will enable freed data blocks to be written to zero.

If the offset is large then linked list resource is consumed skipping to the first block.

With the free operation, blocks identified by buffer ID (head and tail) are freed. A run time configuration will enable freed data blocks to be written to zero.

With the allocate operation, a given number of blocks are allocated and a DPU buffer ID is returned.

The DPU buffer subsystem also provides buffering for data channels.

The scheduling of offload commands will now be described. The offload commands may be one or more of: host read, host write, network receive, and network transmit.

Command processing may proceed with the following steps:

submission (by fabric to command channel);

reserve DMA buffering (DMA read and write only);

issue DMA read requests (DMA read only);

wait for input data;

execute offloads (pass through offload engine pipeline or bypass path);

deliver output data; and deliver completion event.

Host write scheduling will now be described. Before host write commands are eligible to be executed, the DPU will reserve buffer space in the DMA subsystem—this may be in the cDM 824. This ensures that the DMA subsystem does not back-pressure the offload pipelines, and so prevents head-of-line blocking between command channels. DMA buffers are provisioned for sets of DMA targets, known as destination-sets. The DMA target may be a PCIe interface, a DDR DRAM, the application processors 111 and/or the like.

Each DPU.Host command channel maps (by way of runtime N:1 mapping configuration) to a destination-set. Space is reserved in the mapped destination-set buffer for each host write command prior to the command being forwarded to the "fetch input" stage. When a destination-set is contended (i.e. a DMA target is back-pressuring) a DPU DMA scheduler 613 arbitrates amongst the command channels contending for the resource. The DPU DMA write scheduling is controlled by the scheduler 613 which controls a write command controller 611, both of which are provided by the command/event processing block 610, as shown in FIG. 30. The DPU DMA scheduler is a configurable scheduler, supporting the following policy components:

bandwidth limiting; priority; and deficit round-robin bandwidth sharing.

Figure 29:
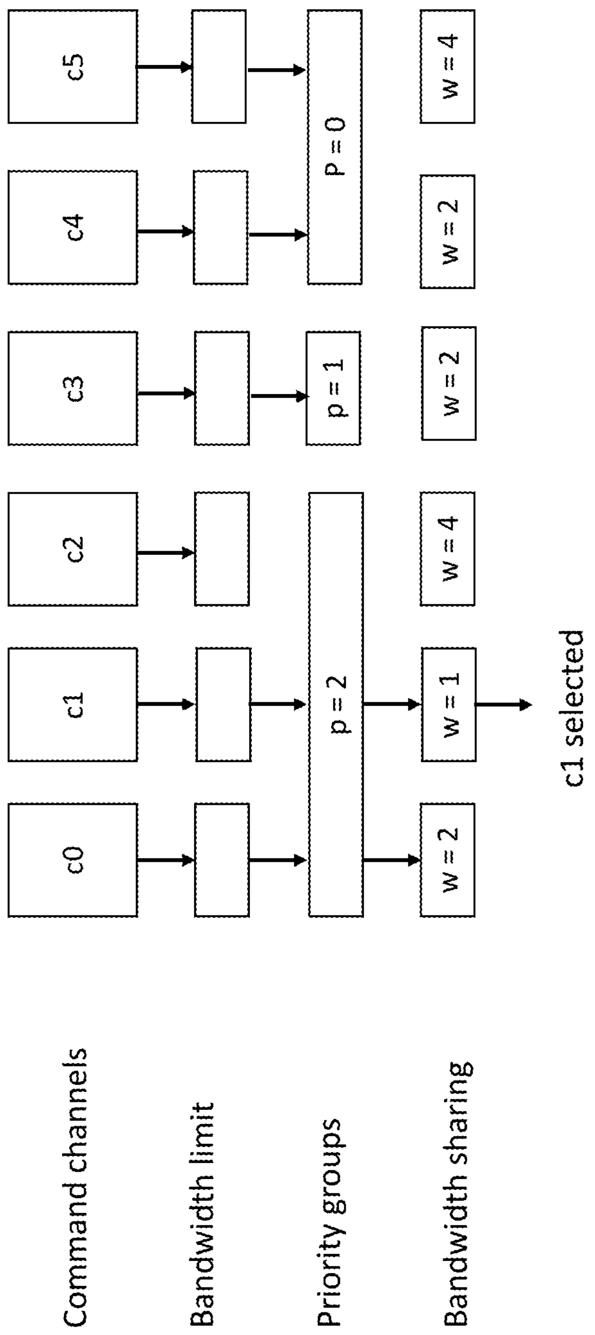
FIG. 29 schematically illustrates DMA bandwidth being shared between command channels, in some embodiments.

Reference is made to FIG. 29 which schematically shows how DMA bandwidth is shared amongst six command channels c0, c1, c2, c3, c4, c5 and c6. The bandwidth achieved by each command channel is compared with the channel's bandwidth limit. Those command channels that have reached their limit are not considered further. In the example of FIG. 29, this removes command channel c2. The priority component selects, from the channels that remain, the subset with the highest priority. Channels c0, c1 and c2 have priority 2, channel c3 has priority 1 and channels c4 and c4 have priority 0. This means that in the example of FIG. 29, channels c0 and c1 are selected. The deficit round-robin component then shares the available bandwidth amongst the channels selected by the priority component, according to configured weights. In the example illustrated, channels c0, c3 and c4 have weights equal to 2, channel c1 has a weight of 1 and the remaining channels have a weight of 4. In this example, c0 with a weight of 2 is allocated twice as much bandwidth as c1 with a weight of 1.

To ensure that offload engine bandwidth is not wasted, commands may not enter an offload pipeline unless there is a destination buffer available. Therefore, while a host write command is held up waiting for DMA buffer space, following commands on the same channel are blocked.

Host read scheduling will now be discussed. A subset of the DPU.Host command channels support DMA reads. Each of these maps (by way of runtime configuration) to a destination-set. The available bandwidth of the DMA targets in each set is shared out amongst command channels by the DPU DMA scheduler. The DPU DMA read scheduling is controlled by the scheduler 613 which controls the read command controller 609, both of which are provided by the command/event processing block 610, as shown in FIG. 30.

Commands proceed to the execute stage only once their input data is available. This is done to ensure that offload pipelines bandwidth is not wasted.

When the source is a DPU Buffer, input data is available immediately.

When the source is a U2D data channel, input data is available once the whole message has been received by the DPU.

When the source is DMA read data, input data is available once the whole message has been fetched from the DMA targets.

While a command is waiting for its input data, following commands on the same command channel are blocked within the DPU command processor.

One or more of the following rules may constrain the order in which commands are processed through offload engines:

Commands on the same channel taking the same offload engine path (or bypass) execute offloads in submission order;

Commands on the same channel fetch their input data in submission order;

Commands submitted to one command channel may perform the processing steps in arbitrary order relative to commands on a different command channel if no U2D input data is fetched;

Commands submitted to different command channels fetching input data from the same U2D channel fetch data in command submission order;

For a given command, offloads are executed in the order given by the offload engine pipelines;

Commands delivering output through the same destination deliver that output in offload execution order. The destinations are: local DPU buffers are a single destination; remote DPU Buffers are a single destination; each D2U data channel is a separate destination; DMA write is a single destination; and each network transmit priority channel is a separate destination.

Completion event order matches output delivery order when the same event channel is used.

Host write commands are completed once the DMA write has been committed to the DMA subsystem. The DPU command completion event is ordered after data has been written into the cSI. Once the completion event is received:

Data written to DMA by subsequent commands may be ordered after the completed command's writes;

Data written to DMA via the message store interface may be ordered after the completed command's writes, where the message store uses the same cSI VC as DPU writes;

DMA reads by subsequent commands may be ordered after the completed command's writes; and Message load reads may be ordered after the completed command's writes where the same CSI VC is used.

Network transmit commands may be completed once the packet has started to egress the network port.

The scheduler 613 may be configured to ensure that the offload paths are kept as full as possible with as few gaps as possible. This may be to ensure that data throughput is maximised and/or that the data rate is maximised and/or that the number of offload paths is kept to a minimum.

The scheduler will synchronise data with respective tasks. For example a task may be to write data from one location to another location. The write command may be provided separately from the data which needs to be read out of one location and then written to another location.

The scheduler monitors available tasks, determines which tasks are eligible (i.e. will not cause head of line blocking and/or satisfy other criteria), and arbitrates between the eligible tasks.

In the above examples, a command may be made up of a single command or a set of sub commands. The previously described commands are examples of a single command or a set of sub commands or steps. These examples of commands may use one of the offload pipelines where different sub commands may be performed. In some embodiments, the completion of a command or all of the set of sub commands will cause a completion event to be delivered. Generally a command or set of sub commands may be associated with particular data (if applicable) and the completion of the command or set of commands with a completion event. A command or set of sub commands, such as previously described may be scheduled as a single task by the scheduler.

In some embodiments, two or more commands and/or sets of subcommands may be provided in a single control capsule of the command channel. Each command or set of subcommands needs to be scheduled separately. Completion of each command or set of subcommands causes a completion event to be provided. In some embodiments, the next command or set of subcommands can only be performed if the previous command or set of subcommands has been completed. In some embodiments, the next command or set of subcommands is only scheduled when for example the source and/or destination is ready. For example, the source may need to be eligible to be scheduled, and the destination set has space to accept a batch of packets.

Different commands in a capsule may be associated with different offload pipelines and may be independently scheduled and execute in parallel. Ordering between commands may be defined by the structure of the offload pipelines and the scheduler policies.

Barrier commands may be used to ensure serialisation of otherwise un-ordered command execution. For example, one or more commands after the barrier command will be executed or performed only after the command or commands before the barrier command.

In some embodiments, alternatively or additionally, a program or a reference to a program stored on the network interface device may be provided in the command channel instead of the single command or set of subcommands as discussed previously. This may be provided in single control capsule in some embodiments. A program may allow a series of commands (and/or one or more sets of subcommands) to be carried out.

A program may support conditional operations. In other words, an operation is performed and depending on the outcome of the operation another operation may be performed or the outcome may determine which of two or more operations are performed. A simple example of a program providing a conditional operation might be to encrypt some data and if the encryption is successful then, decrypt the data and check if the CRC data matches.

Alternatively or additionally a program may support loops. A loop can be repeated until a condition is satisfied, such as discussed previously. Alternatively, the loop can be repeated a set number of times.

A program may comprise one or more barrier commands.

A program may support function calls. The program may call a function. This will cause the one or more actions associated with that function to be run or executed.

The program may treated, from a scheduling perspective as two or more separate commands (and/or sets of subcommands) each of which needs to be separately scheduled. Completion of a scheduled command (and/or set of subcommands) causes a completion event. Thus a program may cause one, two or more completions events to be generated.

One or another command sequence may be scheduled depending on the event output or other local program state. This may enable conditional execution loops to be supported. The expression of the command programs can be regarded as a VLIW (very long instruction word) processor instruction set architecture (and therefore may support comparable features such as: function call; sub routine; and/or the like)

In some embodiments, the next command or set of subcommands is only scheduled when for example the source and/or destination is ready. For example, the source may need to be eligible to be scheduled, and the destination set has space to accept a batch of packets.

A program may cause two or more different offload pipelines to be used when performing that program. Where a reference to a program is provided, the program is stored on the network interface device. In some embodiments, the program may be stored in a memory which is local or readily accessible to the command and event processing function of the DPU.

In some embodiments, the DPU.Net may have a data classifier function. This may for example be provided by the receive data hub 550 in some embodiments. This data classifier function may be to determine the priority of the received data or where it comes from and/or the like. Based on the classification, the receive data hub may provide command capsules for the received data with a reference to a program such as described previously. This may for example control the routing and/or processing of the received data. For example, in the example shown in FIG. 34, the program may cause the received data to be routed to the match/action engine. Without the reference to the program, the data may be routed directly to the Net BufSS.

Figure 31:
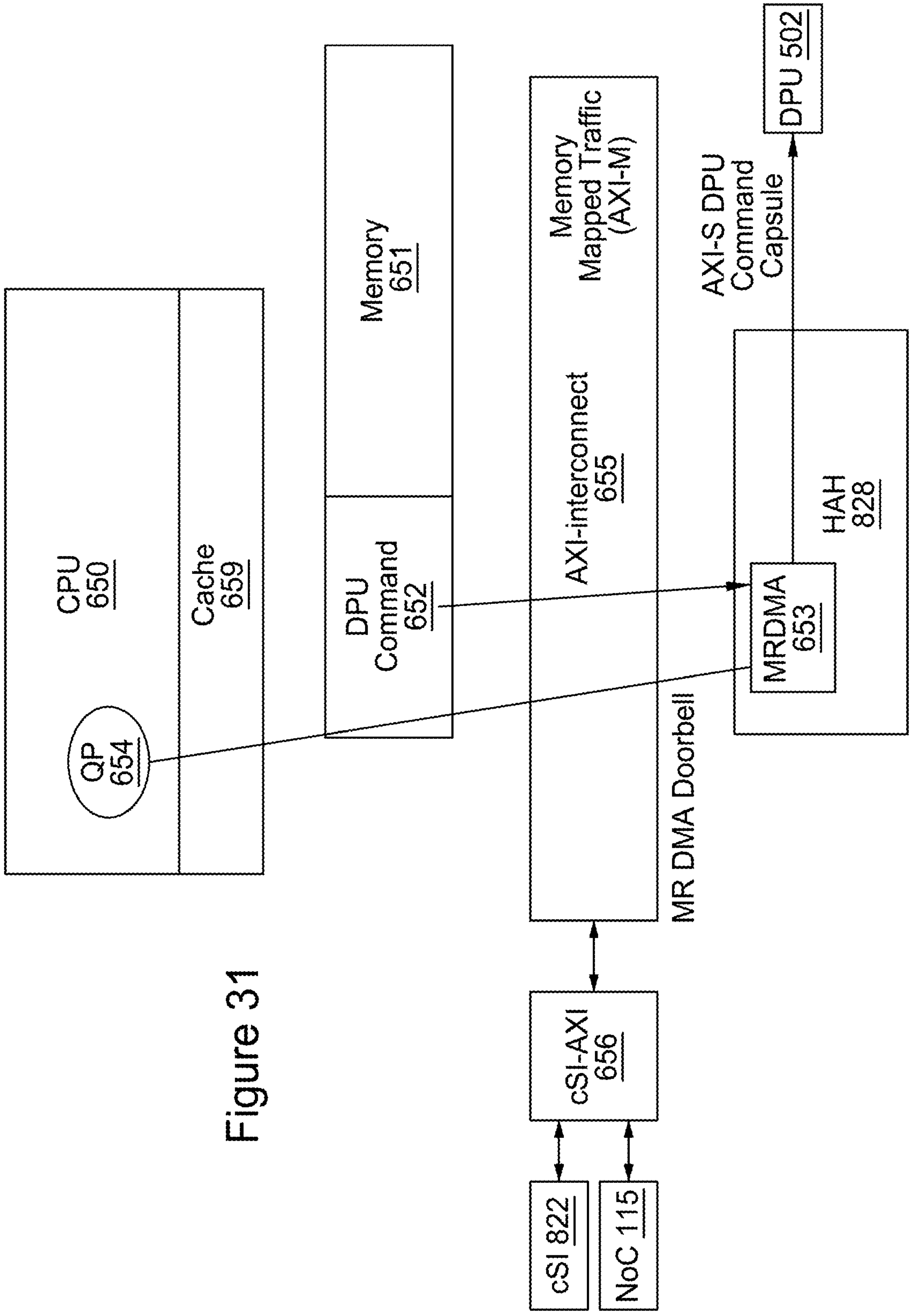
FIG. 31 schematically shows a network interface device where a CPU of the network interface device issues a DPU command of some embodiments.

Reference is made to FIG. 31 which shows schematically various components of the NIC to show an example where a CPU 650 on the NIC issues a DPU command. This may be a read command or a write command. In this example, the DPU command may be a DPU.Host command. The CPU may be any suitable CPU such as application processors 111 shown in FIG. 2. The CPU supports memory mapped input output. The CPU may have a cache memory 659.

The DPU command 652 is stored in memory 651. This memory is accessible (shared memory) to the CPU and to a MR DMA (message request DMA) function 653 of the HAH 828 (see FIG. 6). In response to a MR DMA doorbell from a queue pair QP 654 in the CPU, the MR DMA (message request DMA) function fetches the DPU command stored in memory. The memory mapped traffic between the memory 651 and MR-DMA function is via an AXI-Interconnect 655 for memory mapped traffic (AXI-M). The MR-DMA function 653 outputs the command in a DPU command capsule onto an AXI-S (AXI streaming) bus. This is provided to the command and event processing block of the DPU.Host. This may be via the fabric or the NoC or via a direct connection.

For completeness, the AXI-Interconnect 655 has a connection with the cSI-AXI bridge 656 (mentioned previously). The cSI-AXI bridge has a connection with the cSI 822 and the NoC 115.

Figure 32:
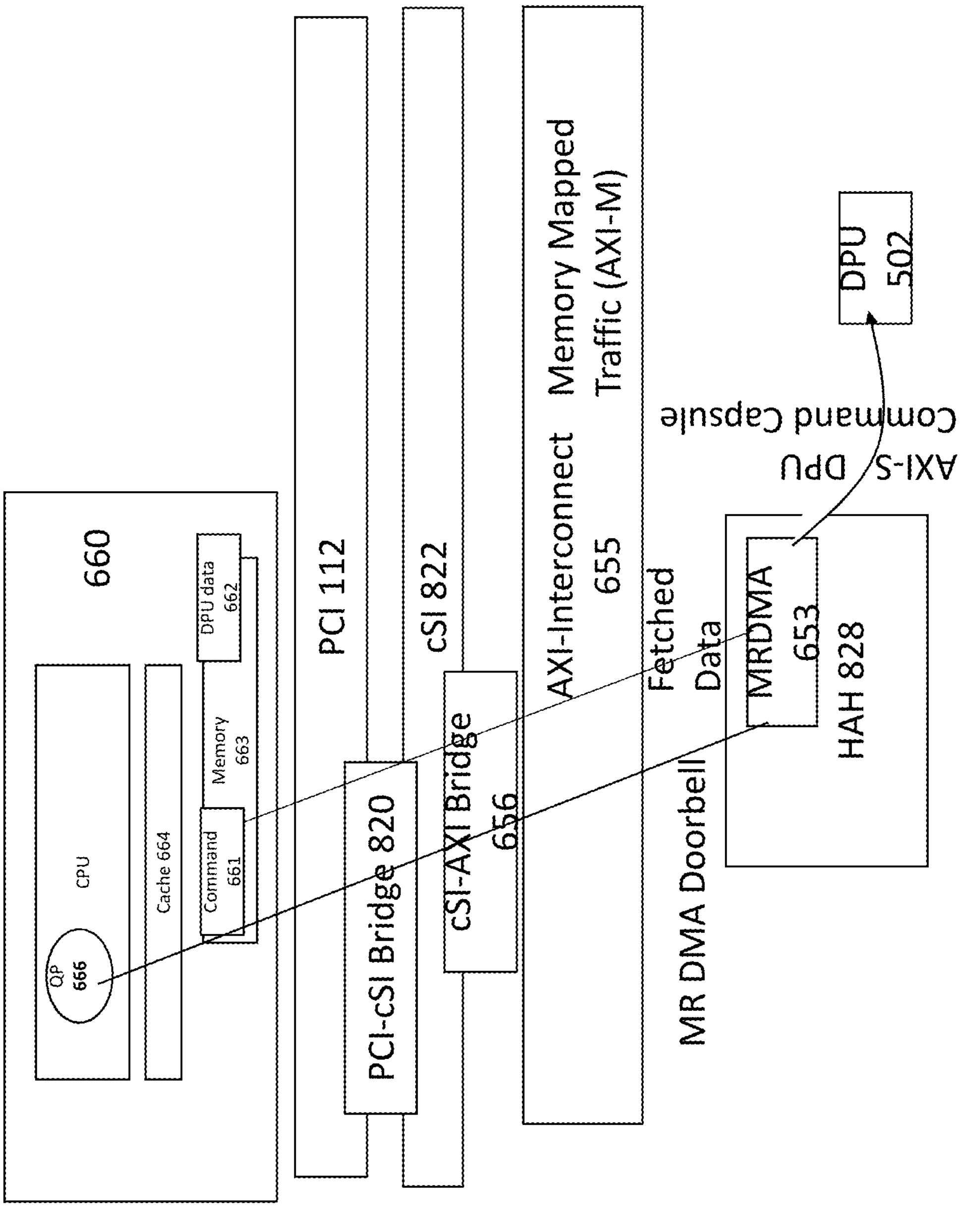
FIG. 32 schematically shows a network interface device where a CPU external to the network interface device issues a DPU command of some embodiments.

Reference is made to FIG. 32 which shows schematically various components of the NIC to show an example where an external CPU 660 (that is external to the NIC) issues a DPU command. This may be a read command or a write command. In this example, the DPU command 661 may be a DPU.Host command. The external CPU may have a cache memory 664.

The DPU command 661 is stored in memory 663. This memory is accessible (shared memory) to the CPU and to the MR DMA (message request DMA) function 653 of the HAH 828 (see FIG. 6). In this example, the shared memory resides in the external CPU as does the DPU data associated with the command. For example the DPU command may be a write command and the DPU data may be the data to be written.

In response to a MR DMA doorbell from a queue pair QP 666 in the CPU, the MR DMA function fetches the DPU command stored in memory. The memory mapped traffic between the memory 663 and MR-DMA function is via the host PCIe interface 112, the PCI-cSI bridge 820, the cSI 822, the cSI-AXI bridge 656 and the AXI-Interconnect 655 for memory mapped traffic (AXI-M). The MR-DMA function 653 outputs the command in a DPU command capsule onto an AXI-S (AXI streaming) bus. This is provided to the command and event processing block of the DPU.Host as discussed in relation to FIG. 30.

The data associated with a DPU write command may be provided to the DPU using the same path as for the command. The data may be provided in the same capsule as the command or a different capsule.

In one modification to the arrangement described in relation to FIGS. 31 and 32, the MR-DMA function may alternatively or additionally be provided in the DPU.Host itself.

In some embodiments, a SoC interface may be provided between the DPU and the SoC. The DMA interface to support this interface may be provided by the cSI, the fabric or by a dedicated DMA interface in the DPU.

In some embodiments, the DPU and/or the vSwitch may be regarded as data streaming hardware. The cSI may support memory mapping (MMIO) and data streaming. The HAH may provide a conversion from memory mapping to data streaming. One or more of the CPUs and the PCI interface may be memory mapped. One or more of the interfaces with the DDR, the NoC and the fabric may be memory mapped. The AXI-M interconnect is memory mapped.

Some embodiments may support the handover of DPU processing to a CPU. This may allow reprogramming (or programming) of at least a part of the programmable logic while keeping the NIC online. This handover may be used when the fabric hardware has failed, for example a bug has been detected. Alternatively or additionally, the handover may be used when the fabric needs to be reprogrammed. Alternatively or additionally, where there is no fabric implementation of an algorithm (for example there is only a software prototype). In this latter case, the DPU processing is not “handed over” from the fabric to the CPU but is instead just provided by the CPU.

Some embodiments may effectively move one or more DPU processing functions carried out by the fabric (programmable logic) to the CPU. This may be a CPU in the host computing device (such as discussed in relation to FIG. 31) or the CPU associated with the network interface device (such as discussed in relation to FIG. 32). This may be on a temporary basis while the programmable logic is being reprogrammed or may be on a more permanent basis. The DPU processing may be passed back to the programmable logic after the reprogramming/programming is completed.

In some embodiments an application providing DPU processing may be provided by the CPU rather than the programmable logic. The programmable logic is a finite resource and providing one or more DPU processing functions to the CPU may conserve the programmable logic. This may allow one or more applications providing DPU processing to be run on the CPU rather than the fabric.

Alternatively or additionally, this may allow testing of a DPU processing function running in the software of the CPU before reprogramming of the programmable logic is performed to provide that DPU processing function. This may allow one or more applications providing DPU processing to be run on the CPU rather that the DPU.

Thus in some embodiments, commands can be issued for the same DPU channel interchangeably. For example, there may be a coordinated handover between one data path user instance to another data path user instance to change the source of commands. Thus one data path user instance may be a CPU and another data path user instance may be provided by the fabric.

Where a DPU processing function is offloaded to the CPU, the AXI-S path between the DPU and the MR DMA may be used to provide data and/or events back to the CPU. The data is directed through the MR DMA which converts AXI bus transactions into a Queue Pair data structure which can be efficiently managed by software running on the CPU 650.

Alternatively or additionally, the data and/or events from the DPU.Host may be provided to the NoC via the multiplexer 508. The NoC can provide the data to the cSI via the cSI-NoC bridge 826. From the cSI, the data can be passed to the cSI-AXI bridge to the AXI-interconnect. The data is then directed through the MR DMA which converts the AXI bus transactions into a Queue Pair data structure which can be efficiently managed by software running on the CPU 650.

Figure 33:
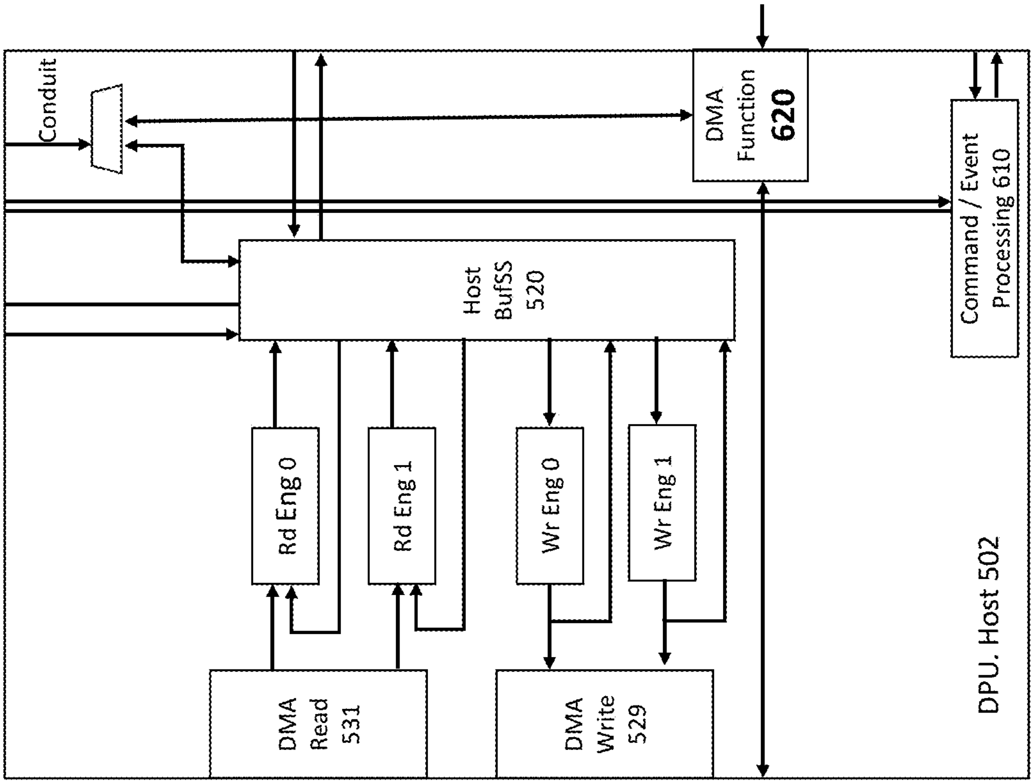
FIG. 33 schematically shows another example of a DPU.Host of some embodiments.

Reference is made to FIG. 33 which shows a modification to the DPU.Host shown in FIG. 12. The DPU.Host comprises all of the DPU blocks shown in FIG. 12 with the addition of a DMA function block 620. The DMA function block 620 provides a DMA device type, queue pair processing and optionally some offloads such as TSO (TCP segmentation offload).

Figure 34:
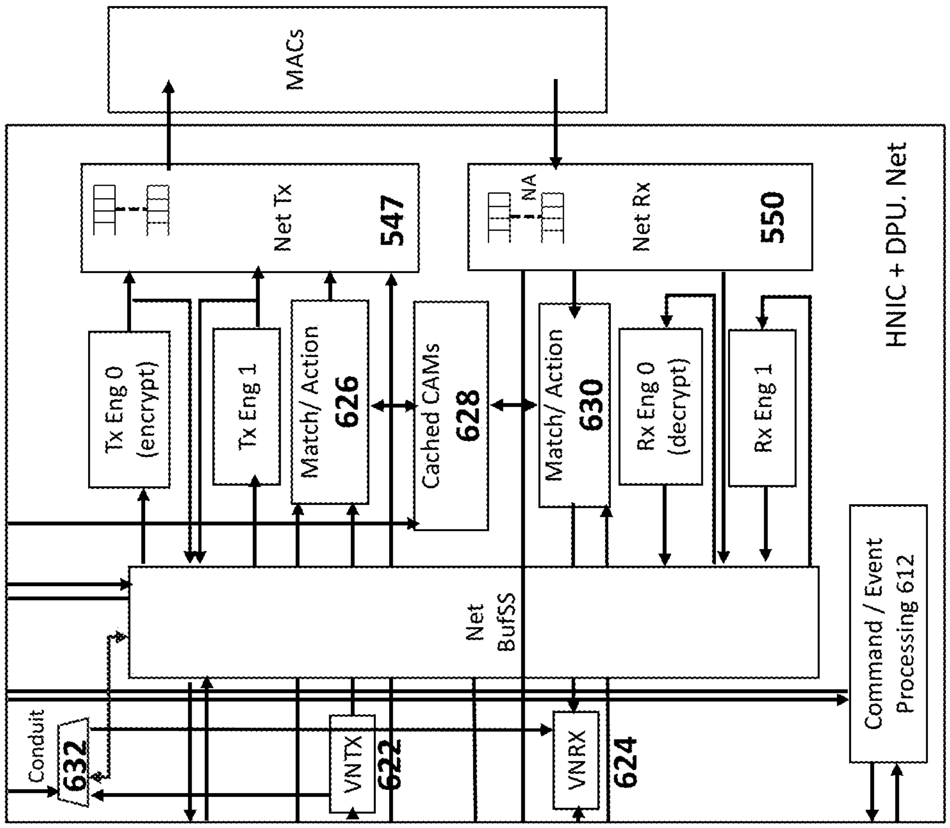
FIG. 34 schematically shows another example of a DPU-.Net of some embodiments.

Reference is made to FIG. 34 which shows a modification to the DPU.Net shown in FIG. 13. The DPU.Host of FIG. 33 is configured to be used in conjunction with the DPU.Net of FIG. 34.

The DPU.Net comprises all of the DPU blocks shown in FIG. 13 with the addition of a one or more blocks. The additional blocks may remove the requirement for some or all of the virtual switch components. A first match action engine MAE 626 and a second match action engine 630 are provided. A caching subsystem 628 is also provided which receives data from the two match action engines MAE and outputs data to the two match action engines MAE. The first match action engine MAE 626 is configured to provide an output to the transmit data hub 547 and to the caching subsystem 628. The first match action engine MAE is configured to receive an input from the buffer streaming subsystem (BufSS) 540 and the caching subsystem 628.

The second match action engine 630 is configured to receive an input from the receive data hub 547 and the caching subsystem 628. The second match action engine is configured to provide an output to the buffer streaming subsystem (BufSS) 540 and the caching subsystem 628.

The DPU.Net also comprises a virtual NIC receive VNRX engine 624 and a virtual transmit VNTX engine 622. The VNRX engine 624 receives an input from the NoC via a multiplexer 632, from a receive plugin or accelerator provided in the fabric and/or from the buffer streaming subsystem (BufSS) 540. The VNRX engine 624 provides an output to the same or different receive plugin or accelerators provided in the fabric.

The VNTX engine 624 receives an input from a transmit plugin or accelerator provided in the fabric. The VNTX engine 624 provides an output to the buffer streaming subsystem (BufSS) 540, the same or different transmit plugin or accelerator provided in the fabric and/the NoC via the multiplexer 632.

In some embodiments, data from the receive data hub 550 can be provided directly to one or more receive plugins or accelerators. In some embodiments, data from the second match action engine may be directly provided to the VNRX engine 624. In some embodiments data may be provided directly to one or more receive plugins or accelerators from the second match action engine. In some embodiments data may be provided directly from one or more receive plugins or accelerators to the second match action engine.

In some embodiments, data may be provided directly to the transmit data hub 547 from one or more transmit plugins or accelerators. In some embodiments, data may be directly provided to the first match action engine from the VNTX engine 622 and/or one or more transmit plugins or accelerators. In some embodiments data may be provided directly from one or more transmit plugins or accelerators to the transmit data hub 547.

The MAE may perform any suitable functions such as a parse-match-action function, an encapsulation function, and/or a decapsulation function.

The MAE may implement virtual switching functions with a rule-driven parse-match-action engine. For example, rules are provided by drivers. Each rule may provide a set of match criteria, and a set of actions to apply to packets that meet those criteria.

The MAE may perform virtual switching functions and other offloads. This may comprise one or more of:

- mapping packets from ingress virtual port to egress virtual port(s);
- replicating packets to two or more egress ports;
- encapsulation and decapsulation;
- connection tracking and NAT (network address translation);
- packet filtering;
- packet labelling;
- ECN (explicit congestion notification marking); and
- packet and byte counting.

The MAE may comprise:

- a match engine (ME), a streaming processor, which parses packets and performs lookups in rule tables in the cache subsystem;
- a replay hub, which performs packet replication when needed, and packet drop; and
- an action engine (AE), a streaming process, which invokes actions indicated by matched rules.

The match engine first parses incoming packets. This may be a three step process:

1. Parse outer headers, which may be part of an encapsulation. Headers parsed include Ethernet, VLANs (virtual local area network), IP (internet protocol) and UDP headers.
2. Lookup header fields and source port in an outer rule table, which is in an STCAM (smart ternary content addressable memory) or BCAM (binary content addressable memory) or any other suitable memory. A key is formed from a subset of the header fields plus some metadata, and rules match an arbitrary subset of the key bits. The lookup result may identify one or more of the encapsulation present (if any), fields relating to connection-tracking (used later) and an outer rule ID.
3. Parse remaining encapsulation headers (if present) and parse the inner (or only) headers. Parsing starts again at the beginning of the frame. If an encapsulation is present, headers already parsed in step (1) and identified as part of the encapsulation are skipped. Typically, a further encapsulation header is then parsed, followed by inner headers. If no encapsulation is present, then the inner frame parsing starts again at the start of the frame.

The VNTX engine 622 may process packets sent by drivers through the host interface and/or received via the ingress interface and perform one or more of the following functions on behalf of the driver:

- Checksum offloads
- VLAN (virtual local area network) insert offload
- Packet validation (e.g. enforce source addresses, firewalling and/or the like).

The VNRX engine or processor may handle packets bound for the host or embedded processors. It may perform one or more of the following functions on behalf of the driver that will receive the packet:

- Packet classification
- Checksum functions, for example calculation and validation
- Flow steering and/or RSS (receive side scaling)
- Packet filtering.

The transmit and receive plugins or accelerators may provide any suitable function. The plugins are implemented in the fabric. The plugins may be hardware accelerators. The use of the plugins may facilitate the customization of the device. This may allow the same device to be customized for different end users or applications. Alternatively or additionally, the use of plugin allows the same device architecture to be used for a number of different applications.

Data may go out at a point in the data path, go to the plugin or accelerator, and be reinjected back into the data path. This reinjection may be via the same or another plugin or accelerator. The data may or may not be reinjected back into the data path.

It should be appreciated that in some embodiments, the buffer streaming subsystem (BufSS) 540 and/or the buffer streaming subsystem (BufSS) 520 may provide a routing function allowing data to be moved between different parts of the DPU and/or different parts of the NIC. In some embodiments, data is provided to and/or from one or more plugins or accelerators via the buffer streaming subsystem (BufSS). Data is provided in capsules as previously discussed. The buffer streaming subsystem (BufSS) uses the capsule headers to route the capsules, which contain the data. The capsule metadata may support encoding a capsule route and/or provide or a reference to a program and state for a control processor.

The DPU command/event API may in some embodiments support a program input/event stream output. The DPU API may be virtualised in some embodiments. In some embodiments, the DPU API may be controlled by the CPU and/or by the fabric.

The data is routed via the NoC and/or the fabric in some embodiments.

Figure 35:
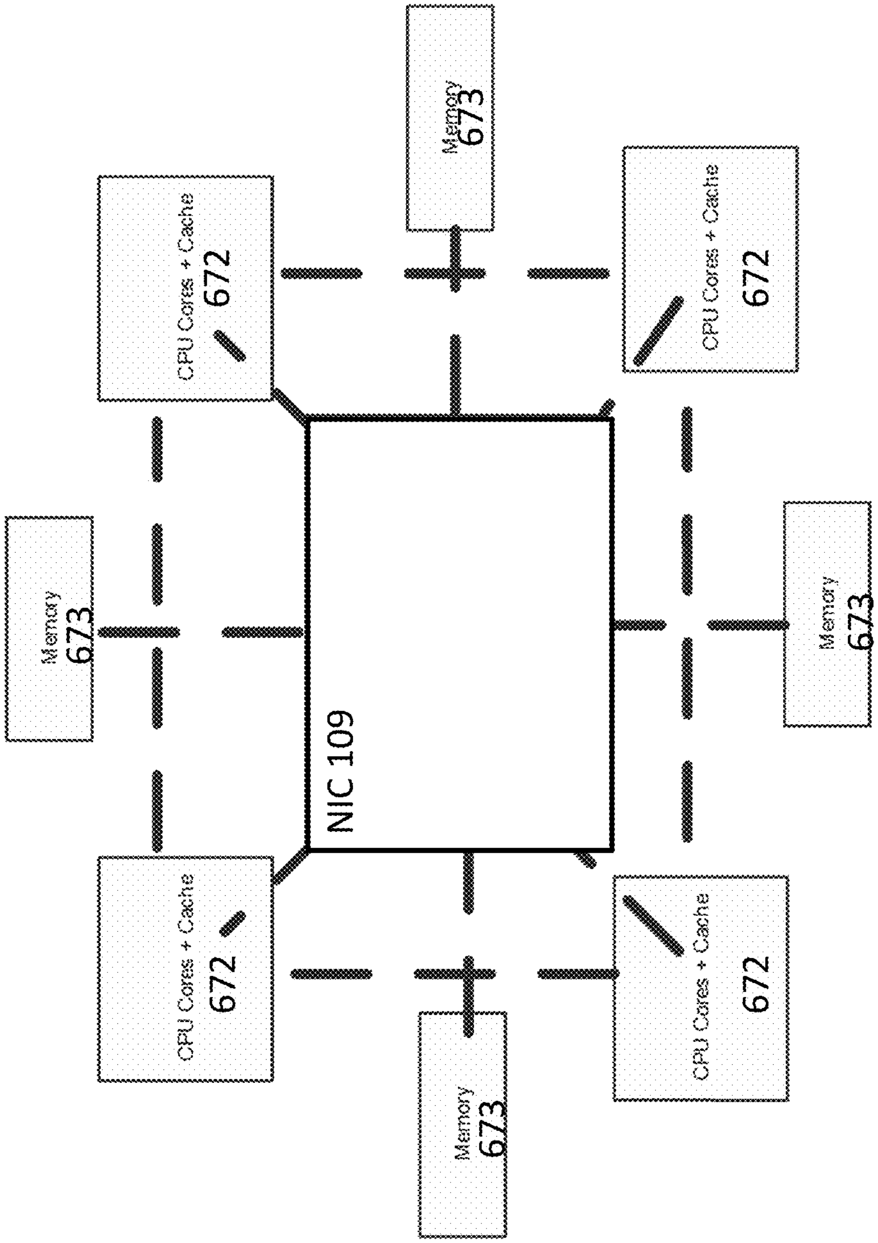
FIG. 35 which shows an example where a network interface device of some embodiments may be deployed.

Reference is made to FIG. 35 which shows an example where a NIC of some embodiments may be deployed. The NIC may be surrounded by CPU cores 672 with respective caches and memory 673. A CPU core 672 (e.g., a CPU core block) and memory block may provide a particular function such as an operating system or a hypervisor. One or more of a CPU core block and respective memory block may be provided as part of the NIC. The NIC may allow data to be moved between the CPU cores via the NIC, using one or more of the previously described mechanisms for moving data.

Where the CPU is external to the NIC, DPU commands may be issued such as described in relation to FIG. 32. Where the CPU is internal to the NIC, DPU commands may be issued such as described in relation to FIG. 31.

Figure 36:
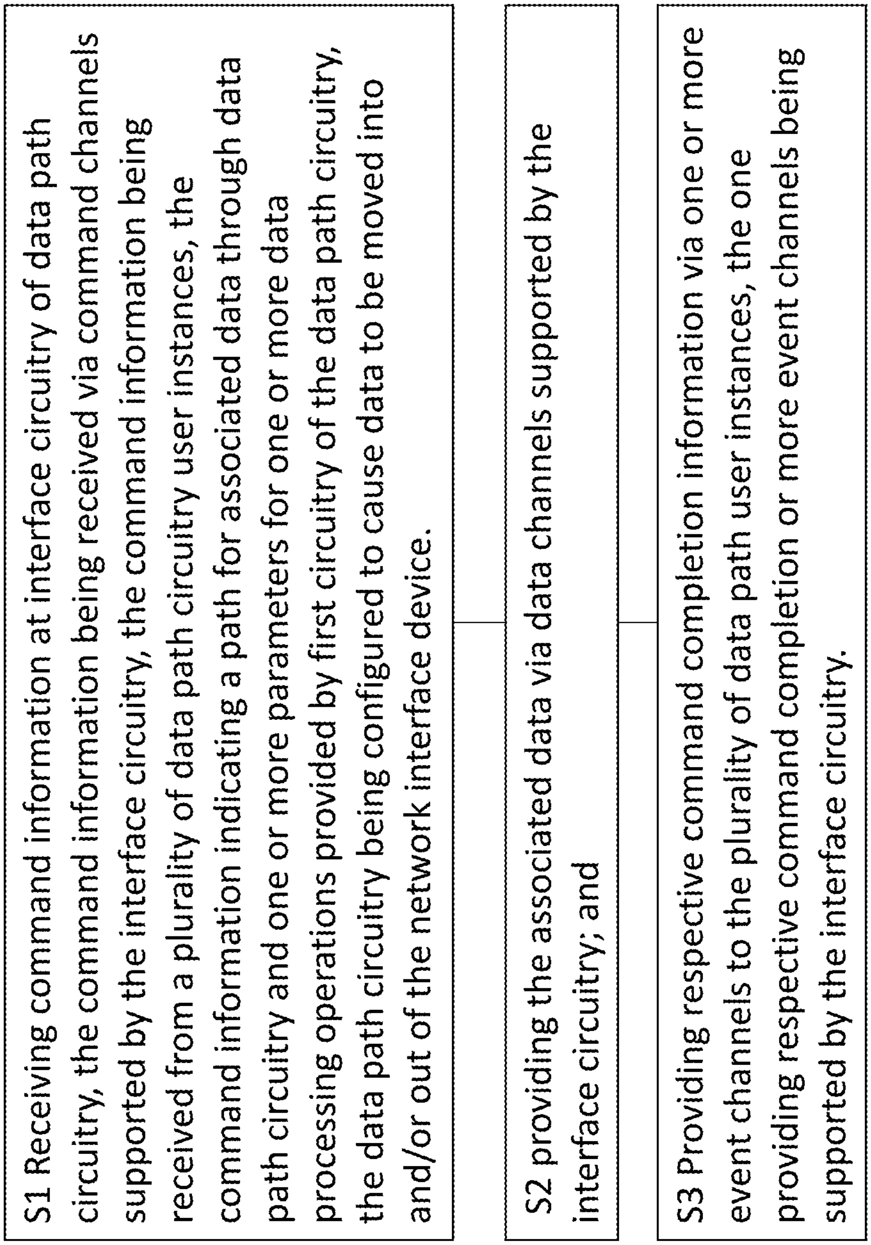
FIG. 36 shows a method of some embodiments.

A method of some embodiments is described with reference to FIG. 36.

As referenced S1, command information is received at interface circuitry of data path circuitry. This may be the DPU. The command information may be received via command channels supported by the interface circuitry. The command information is received from a plurality of data path circuitry user instances. This may be any of the examples described previously. The command information indicates a path for associated data through the data path circuitry and one or more parameters or arguments for one or more data processing operations provided by first circuitry of the data path circuitry. The first circuitry may be one or more of the offload engines. The data path circuitry may be configured to cause data to be moved into and/or out of the network interface device;

As referenced S2, the method comprises providing the associated data via data channels supported by the interface circuitry.

S1 and S2 may take place in any order or even at the same time.

As referenced S3, the method comprises providing respective command completion information via one or more event channels to the plurality of data path user instances. The one or more event channels are supported by the interface circuitry.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements.

Accordingly, reference should be made to the following claims, rather than to the foregoing disclosure, as indicating the scope of such features and implementations.

The invention claimed is:

1. A network interface controller comprising:

a network interface configured to interface with a network, the network interface configured to receive data from the network and transmit to the network;

a host interface configured to interface with a host device, the host interface configured to receive data from the host device and transmit data to the host device; and data path circuitry configured to cause data to be at least one of moved into or out of the network interface controller, the data path circuitry comprising:

a host data path unit (DPU.Host) configured to communicate with the host device;

a network data path unit (DPU.Net) configured to communicate with the network;

first circuitry for providing one or more data processing operations; and interface circuitry supporting a plurality of channels, the plurality of channels comprising:

command channels configured to pass messages from user logic to the DPU.Host and the DPU.Net to receive command information from a plurality of data path circuitry user instances, the command information indicating a path for associated data through the data path circuitry and one or more parameters for the one or more data processing operations provided by the first circuitry;

event channels configured for passing command completion messages from the DPU. Host and the DPU.Net to the user logic; and data channels providing the associated data to the plurality of data path circuitry user instances.

2. The network interface controller as claimed in claim 1, wherein the plurality of data path circuitry user instances is provided by one or more of:

a central processing unit on the network interface controller;

a central processing unit in the host device; and programmable logic circuitry of the network interface controller.

3. The network interface controller as claimed in claim 1, wherein the data path circuitry comprises command scheduling circuitry configured to schedule commands for execution, wherein the commands are associated with the command information, and wherein the command scheduling circuitry schedules one of the commands when at least a part of the associated data is available and a data destination is reserved.

4. The network interface controller as claimed in claim 3, wherein the command scheduling circuitry is configured, when a command has been completed, to cause a command completion event to be provided to one of the event channels, and wherein the event channels are configured to provide command completion information to the plurality of data path circuitry user instances.

5. The network interface controller as claimed in claim 1, wherein a barrier command is provided between a first command and a second command to cause the first command to be executed before the second command, wherein the command information comprises the barrier command.

6. The network interface controller as claimed in claim 1, wherein the data path circuitry comprises a data classifier configured to classify data received by the network interface and to provide, in dependence on classifying of the data, a reference to a program which when run causes one or more commands to be performed, the reference to the program being command information for the data received by the network interface.

7. The network interface controller as claimed in claim 1, wherein the first circuitry for providing the one or more data processing operations comprises one or more data processing offload pipelines, the data processing offload pipelines comprising a sequence of one or more offload engines, each of the one or more offload engines is configured to perform a function with respect to data as it passes through a respective one of the data processing offload pipelines.

8. The network interface controller as claimed in claim 7, comprising one or more direct memory access adaptors providing an input/output subsystem for the data path circuitry, the one or more direct memory access adaptors interfacing with one or more of the data processing offload pipelines to receive data from one or more data processing offload pipelines and/or deliver data to one or more of the data processing offload pipelines.

9. The network interface controller as claimed in claim 1, wherein different data path circuitry user instances are configured, in use, to issue commands to a same command channel of the command channels.

10. The network interface controller as claimed in claim 1, wherein one of the data path circuitry user instances is configured to take over providing a plurality of commands via a same command channel from another of the data path circuitry user instances.

11. The network interface controller as claimed in claim 1, wherein the first circuitry comprises:

a first host data processing part; and a second network data processing part.

12. The network interface controller as claimed in claim 11, comprising a data path between the first host data processing part and the second network data processing part, the data path being configured to transfer data from one of the first host data processing part and the second network data processing part to the other of the first host data processing part and the second network data processing part.

13. The network interface controller as claimed in claim 12, wherein the first host data processing part comprises a first set of buffers and the second network data processing part comprises a second set of buffers, the data path being provided between the first set of buffers and the second set of buffers.

14. The network interface controller as claimed in claim 12, comprising a network on chip (NoC) and one or more virtual switches, wherein the data path is provided by the NoC, and wherein the data channels are provided by the NoC.

15. The network interface controller as claimed in claim 1, wherein the command information comprises one of:

a program, which when run executes multiple commands, or a reference to a program stored on the network interface controller, wherein the program instructs the first circuitry to fetch and process the associated data.

16. The network interface controller as claimed in claim 15, wherein the program is configured, when run, to cause two or more commands to be executed, each of the two or more commands being associated with a respective command completion event.

17. The network interface controller as claimed in claim 15, wherein the program is configured, when run, to cause two or more commands to be executed, wherein the execution of one of the two or more commands depends on an outcome of the execution of another of the two or more commands.

18. The network interface controller as claimed in claim 15, wherein the program is configured, when run, to support a loop, where the loop is repeated until one or more conditions are satisfied.

19. The network interface controller as claimed in claim 15, wherein the program is configured, when run, to call a function to cause one or more actions associated with that function to be executed.

20. A method provided in a network interface controller comprising:

transmitting messages from user logic to a host data path unit (DPU.Host) and a network data path unit (DPU.Net);

receiving command information at interface circuitry of data path circuitry, the command information being received via command channels supported by the interface circuitry, the command information being received from a plurality of data path circuitry user instances, the command information indicating a path for associated data through data path circuitry and one or more parameters for one or more data processing operations provided by first circuitry of the data path circuitry, the data path circuitry being configured to cause data to be at least one of moved into or out of the network interface controller;

transmitting command completion messages from the DPU. Host and the DPU.Net to the user logic;

providing the associated data to the plurality of data path circuitry user instances via data channels supported by the interface circuitry; and providing respective command completion information via one or more event channels to the plurality of data path user circuitry instances, the one or more event channels being supported by the interface circuitry.

* * * * *